United States Patent
Zhou et al.

(10) Patent No.: US 9,388,048 B1
(45) Date of Patent: Jul. 12, 2016

(54) SYNTHESIS OF GRAPHENE BY CHEMICAL VAPOR DEPOSITION

(75) Inventors: Chongwu Zhou, Arcadia, CA (US); Lewis Gomez De Arco, Los Angeles, CA (US); Yi Zhang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 781 days.

(21) Appl. No.: 12/576,234

(22) Filed: Oct. 8, 2009

Related U.S. Application Data

(60) Provisional application No. 61/103,921, filed on Oct. 8, 2008.

(51) Int. Cl.
| | | |
|---|---|---|
| *C01B 31/02* | (2006.01) | |
| *C01B 31/04* | (2006.01) | |
| *B82Y 30/00* | (2011.01) | |
| *B82Y 40/00* | (2011.01) | |
| *B82B 3/00* | (2006.01) | |

(52) U.S. Cl.
CPC .............. *C01B 31/04* (2013.01); *B82B 3/0009* (2013.01); *B82Y 40/00* (2013.01)

(58) Field of Classification Search
CPC ........ C01B 31/02; C01B 31/04; B82Y 30/00; B82Y 40/00
USPC ............... 252/500–518.3; 427/58–255.7; 423/445 B–445 R, 448; 977/890, 891, 977/900
See application file for complete search history.

(56) References Cited

U.S. PATENT DOCUMENTS

| | | | | |
|---|---|---|---|---|
| 4,968,527 | A * | 11/1990 | Yoshimoto et al. | 427/122 |
| 5,558,903 | A * | 9/1996 | Bhushan et al. | 427/11 |
| 2004/0126307 | A1* | 7/2004 | Ikeda et al. | 423/448 |
| 2005/0153619 | A1* | 7/2005 | Oyama et al. | 445/50 |
| 2005/0260453 | A1* | 11/2005 | Jiao et al. | 428/698 |
| 2006/0198949 | A1* | 9/2006 | Phillips et al. | 427/122 |
| 2009/0011204 | A1* | 1/2009 | Wang et al. | 428/215 |
| 2009/0071533 | A1* | 3/2009 | Choi et al. | 136/252 |
| 2009/0110627 | A1* | 4/2009 | Choi et al. | 423/447.1 |
| 2009/0325071 | A1* | 12/2009 | Verbrugge | C01B 31/04 429/219 |
| 2010/0021708 | A1* | 1/2010 | Kong et al. | 428/220 |
| 2010/0143726 | A1* | 6/2010 | Golzhauser et al. | 428/446 |

FOREIGN PATENT DOCUMENTS

DE     102007016995 A1 *  10/2008  ............... B82B 3/00

OTHER PUBLICATIONS

Treier et al. ("Living on the edge: A nanographene molecule adsorbed across gold step edges." Surface Science, 602, L84-L88, online May 6, 2008).*

Gamo et al. ("Atomic structure of monolayer graphite formed on Ni(111)." Surface Sc, 374, pp. 61-64, 1997.).*

Yu et al. ("Graphene segregated on Ni surfaces and transferred to insulators." Applied Phys Letters, 93 (113103), pp. 1-3, pub online Sep. 15, 2008).*

(Continued)

*Primary Examiner* — Tri V Nguyen
(74) *Attorney, Agent, or Firm* — Fish & Richardson P.C.

(57) ABSTRACT

Methods, materials and apparatus are described for synthesizing a monolayer or few-layers of graphene. Depositing the graphene can include, in some implementations, flowing hydrogen and carbon feedstock over a catalytic layer formed on a substrate.

19 Claims, 45 Drawing Sheets

(56) References Cited

OTHER PUBLICATIONS

Wei et al. ("The assembly of single-layer graphene oxide and graphene using molecular templates." NanoLetters, 8(10), pp. 3141-3145, online Aug. 29, 2008).*
Reina et al. ("Transferring and Identification of Single- and Few-Layer Graphene on Arbitrary Substrates." Phys Chem Let C, 112, pp. 17741-17744, pub online Oct. 24, 2008).*
Jiao et al. ("Creation of Nanostructures with Poly(methyl methacrylate)-Mediated Nanotransfer Printing." JACS, 130, pp. 12612-12613, pub online Sep. 3, 2008).*
Obraztsov et al. ("Chemical vapor deposition of thin graphite films of nanometer thickness." Carbon, 45, pp. 2017-2021, online Jun. 24, 2007).*
Ferrari et al., "Raman spectrum of graphene and graphene layers," *Phys. Rev. Lett.*, 97:187401-1-187401-4 (2006).
Forbeaux et al., "Heteroepitaxial graphite on 6H-SiC(0001):Interface formation through conduction-band electronic structure," *Phys. Rev. B.*, 58:16396-16406 (1998).
Gilje et al., "A chemical route to graphene for device applications," *Nano Lett.*, 7:3394-3398 (2007).
Gupta et al., "Raman scattering from high-frequency phonons in supported n-graphene layer films," *Nano Lett.*, 6:2667-2673 (2006).
Hwang et al., "Carrier transport in two-dimensional graphene layers," *Phys. Rev. Lett.*, 98:186806-1-186806-4 (2007).
Li et al., "Highly conducting graphene sheets and Langmuir-Blodgett films," *Nat. Nanotechnol.*, 3:538-542 (2008).
Novoselov et al., "Electric field effect in atomically thin carbon films," *Science*, 306:666-669 (2004).
Somani et al., "Planer nano-graphenes from camphor by CVD," *Chem. Phys. Lett.*, 430:56-59 (2006).
Viculis et al., "A chemical route to carbon nanoscrolls," *Science*, 299(5611):1361 (2003).
Wu et al., "Organic solar cells with solution-processed graphene transparent electrodes," *Appl. Phys. Lett.*, 92:263302-1-263302-3 (2008).
Zhang et al., "Experimental observation of the quantum Hall effect and Berry's phase in graphene," *Nature*, 438:201-204 (2005).

\* cited by examiner

SYNTHESIS OF GRAPHENE BY CHEMICAL VAPOR DEPOSITION

CLAIM OF PRIORITY

This application claims priority under 35 USC §119(e) to U.S. Patent Application Ser. No. 61/103,921 entitled "Wafer Scale Synthesis of Graphene by Chemical Vapor Deposition" and filed on Oct. 8, 2008, the entire contents of which are hereby incorporated by reference.

GOVERNMENT SUPPORT

This invention was made with government support under grant number CCF0702204 awarded by the National Science Foundation. The government has certain rights in the invention.

BACKGROUND

This application relates to chemical vapor deposition techniques and materials fabricated thereby.

Graphene is an allotropic form of carbon that consists of a two-dimensional hexagonal arrangement of carbon atoms, with a quasi-linear dispersion relation, for which the carrier effective mass is relatively low. Each layer of graphene is essentially one-atom-thick planar layer of carbon atoms that are bonded in a honeycomb crystal lattice. Graphene can be in forms with hundreds or thousands of grapheme layers. Graphene has a predicted mobility at room temperatures in the order of $10^6$ cm$^2$/V·s and an experimentally measured mobility of 15,000 cm$^2$/V·s that opens the possibility of ballistic transport at submicron scales. Exemplary fabrication methods for obtaining single or few layers of graphene (FLG) include: i) Epitaxial growth of graphene obtained on 6H oriented SiC by vacuum annealing at 1400° C.,[4] ii) micromechanical exfoliation of small mesas of highly oriented pyrolytic graphite (HOPG), and iii) chemically-assisted exfoliation of intercalated graphite compounds.

SUMMARY

Techniques, systems and apparatus are disclosed for preparing a single graphene film and or a thin stack of graphene films by chemical vapour deposition (CVD) on a metallic catalyst layer, e.g., a polycrystalline Ni layer, by using a low molar-mass hydrocarbon, such as methane, as the carbon feedstock.

In one aspect, a method for synthesis of graphene can include forming a catalytic film on a substrate, or use standalone materials such as foils and plates with catalytic functions. Also, using chemical vapor deposition, a single graphene layer or a thin stack of no more than twenty graphene layers are deposited on the catalytic film formed on the substrate. Depositing the graphene includes flowing hydrogen and a carbon feedstock over the catalytic film formed on the substrate.

Implementations can optionally include one or more of the following features. Forming the catalytic film on the substrate can include depositing a metal material on the substrate; and annealing the deposited metal material. Annealing the deposited metal material can be performed with the substrate in a mixture of argon and hydrogen. Annealing the deposited metal material can include heating and cooling at a predetermined rate to form the catalytic film comprising a polycrystalline metal surface on the substrate. The method can include using the chemical vapor deposition at ambient pressure or lower pressure by varying at least one of temperature, gas composition, gas flow rate or deposition time. The carbon feedstock can include a low molar hydrocarbon. The carbon feedstock can include at least one of diluted methane, ethylene, acetylene, propane, butane, ethanol, methanol, isopropanol, butanol, acetone, and aldehydes. Alternatively the carbon may also come from carbon that exist as alloy component or impurity in the catalytic material already, such as nickel foil or plates with a small amount of carbon. The catalytic film can include a metal material. The metal material can include at least one of nickel, iron, cobalt, manganese, molybdenum, iridium, gold, copper, silver, palladium, platinum, and lead. They can also be single crystalline Ni (111) or single crystalline gold on mica. The catalytic materials can also be metal oxides such as aluminum oxide, silicon oxide, sapphire, or quartz. Doping of the graphene films can be achieved by adding ammonia, phosphine, or diborane, or heating solid phosphorous or boron powder at upper stream during the CVD process. After the synthesis, etching of graphene can be achieved by heating up graphene in hydrogen or oxygen atmosphere.

The method can include transferring the single graphene layer or a thin stack of no more than twenty graphene layers grown on the catalytic film to a target substrate. Transferring the graphene can include immersing the substrate into an etchant solution to remove the catalytic film. Transferring the graphene can include depositing a polymer material on top of the single graphene layer or a thin stack of no more than twenty graphene layers grown on the catalytic film before immersing the substrate into the etchant solution to remove the metal and rendering a free-standing polymer film with the single graphene layer or a thin stack of no more than twenty graphene layers adhered to the polymer film. The polymer film can be transferred to the target substrate; and the polymer film can be dissolved to leave the single graphene layer or a thin stack of no more than twenty graphene layers on the target surface. The polymer material can include poly (methyl methacrylate) (PMMA).

In another aspect, a method can include using chemical vapor deposition to synthesize a single graphene layer or a thin stack of no more than twenty graphene layers on a catalytic film formed a substrate. The method can include fabricating a graphene-based electrode for a photovoltaic cell. Fabricating the graphene-based electrode can include depositing a layer of polymer material on top of the synthesized single graphene layer or a thin stack of no more than twenty graphene layers. The catalytic film can be removed using an etchant solution to leave a free-standing polymer material with the synthesized graphene adhered to the free-standing polymer material. The free-standing polymer material with the synthesized graphene can be transferred to the transparent substrate using direct graphene contact. Also, the polymer material can be removed to render the single graphene layer or a thin stack of no more than twenty graphene layers on the transparent substrate.

Implementations can optionally include one or more of the following features. The polymer material can include poly (methyl methacrylate) (PMMA). The transparent substrate can include glass or polyethylene terephthalate (PET). Using chemical vapor deposition to synthesize a single graphene layer or a thin stack of no more than twenty graphene layers on a catalytic film formed a substrate can include flowing hydrogen and a carbon feedstock over the catalytic film. The carbon feedstock can include at least one of diluted methane, ethylene, acetylene, ethanol, or isopropanol. The carbon feedstock can include a low molar hydrocarbon. The catalytic film can include a metal material. The metal material can include at least one of nickel, iron or cobalt.

An apparatus can include a substrate and a single graphene layer or a thin stack of no more than twenty graphene layers deposited over the substrate.

Implementations can optionally include one or more of the following features. The substrate can include a catalytic film formed on a surface of the substrate and the graphene can be deposited over the catalytic film. The catalytic film can include a metal material. The metal material can include at least one of nickel, iron or cobalt. The substrate can include a Si/SiO$_2$ wafer. The substrate can include a transparent substrate. The transparent substrate can include glass or polyethylene terephthalate (PET). The substrate and the single graphene layer or a thin stack of no more than twenty graphene layers in combination can form an electrode in a photovoltaic cell.

The subject matter described in this specification potentially can provide one or more of the following advantages. Graphene can be useful for a range of applications, from making faster, smaller electrical devices to studying physics at a fundamental level. The techniques described in this specification can provide a simple, scalable and cost-efficient method to prepare single and few-layer graphene films by CVD on polycrystalline Ni over wafer scale areas by using a low molar-mass hydrocarbon, such as methane, as carbon feedstock. The synthesized graphene films can be recovered on Si/SiO$_2$ substrates and transferred to glass substrates for device applications.

For example, continuous, highly flexible, and transparent graphene films can be obtained by chemical vapor deposition (CVD) as transparent conductive electrodes (TCE) in organic photovoltaic cells. Solar energy harvesting using organic photovoltaic (OPV) cells can be used to achieve low-cost energy due to their ease of manufacture, light weight and compatibility with flexible substrates. One aspect of this type of optoelectronic device can include the transparent conductive electrode through which light couples into the device.

Also, graphene films can be implemented to avoid significant shunt losses. Graphene is a one-atom thick, two-dimensional crystalline arrangement of carbon atoms with a quasi-linear dispersion relation, and predicted mobility on the order of $10^6$ cm$^2$/V·s. An ideal graphene monolayer has a transparency of 97-98% and a sheet resistance ($R_{sheet}$) of ~4 k$\Omega\cdot\square^{-1}$. Graphene films are suitable for applications as transparent conductive electrodes, where low $R_{Sheet}$ and high optical transparency are essential. The described continuous, highly flexible, and transparent CVD graphene films can have sheet resistance and transparency controlled in the range of 230$\Omega\cdot\square^{-1}$ at 72% transparency and 8.3 k$\Omega\cdot\square^{-1}$ at 91% transparency. Flexible organic photovoltaics based on CVD graphene films can reveal a power conversion efficiency of 1.18% and operation under bending conditions up to 138°.

In applications, a graphene film or structure described in this document can be used for organic photovoltaics, transistors, radio frequency transistors, amplifiers, and circuits.

BRIEF DESCRIPTION OF THE DRAWINGS

FIGS. 42a through 45e show measurements and images of exemplary graphene structures fabricated based on techniques described in this document.

Like reference symbols and designations in the various drawings indicate like elements.

DETAILED DESCRIPTION

Techniques, systems and apparatus are disclosed for preparing single and few-layer graphene films by chemical vapour deposition (CVD) on a metallic catalyst layer over wafer scale areas by using a low molar-mass hydrocarbon, such as methane, as carbon feedstock. Certain metallic catalyst layers, e.g., Ni films, can provide an excellent geometrical fit of the ordered graphene/graphite phase of carbon to the crystalline metal surface, as well as convenient interactions that favor bond formation between carbon atoms under specific conditions. For example, when Ni is used, carbon atoms can dissolve into the Ni crystalline surface, and at certain temperatures, the carbon atoms can arrange epitaxially on the Ni (1 1 1) surface to form graphene. Using the techniques described in this specification, synthesized graphene films on Ni or other metallic catalyst layers were recovered on Si/SiO$_2$ substrates for device fabrication. In addition, the as-synthesized films can be transferred to different target substrates, such as Si/SiO$_2$ and glass, which can enable wafer-scale silicon-compatible fabrication of hybrid silicon/graphene electronics and transparent conductive film applications.

Micro Raman spectroscopy analysis of the synthesized films revealed the presence of single and few-layer graphene domains throughout the substrate. Synthesized graphene films were recovered on Si/SiO$_2$ substrates where back-gated FETs could be fabricated at wafer scale. Four-probe measurements revealed sheet resistance of ~68 kΩ/sq for the recovered films. $I_{DS}$-$V_{DS}$ and transfer characteristics indicate a weak p-type behavior in the films and weak modulation of the drain current by the gate bias, consistent with a 2D semimetal. In addition, the graphene films were transferred to a glass substrate, which allowed the characterization of graphene layers as transparent conductive films. Transmittance of the transferred films, in the visible wavelength range was ~80%. This approach constitutes a significant advance towards the production of thin films of graphene at large scales and has great implications for future graphene-related electronic devices.

Single-Layer and Few-Layer Graphene Synthesis

Figure 1:
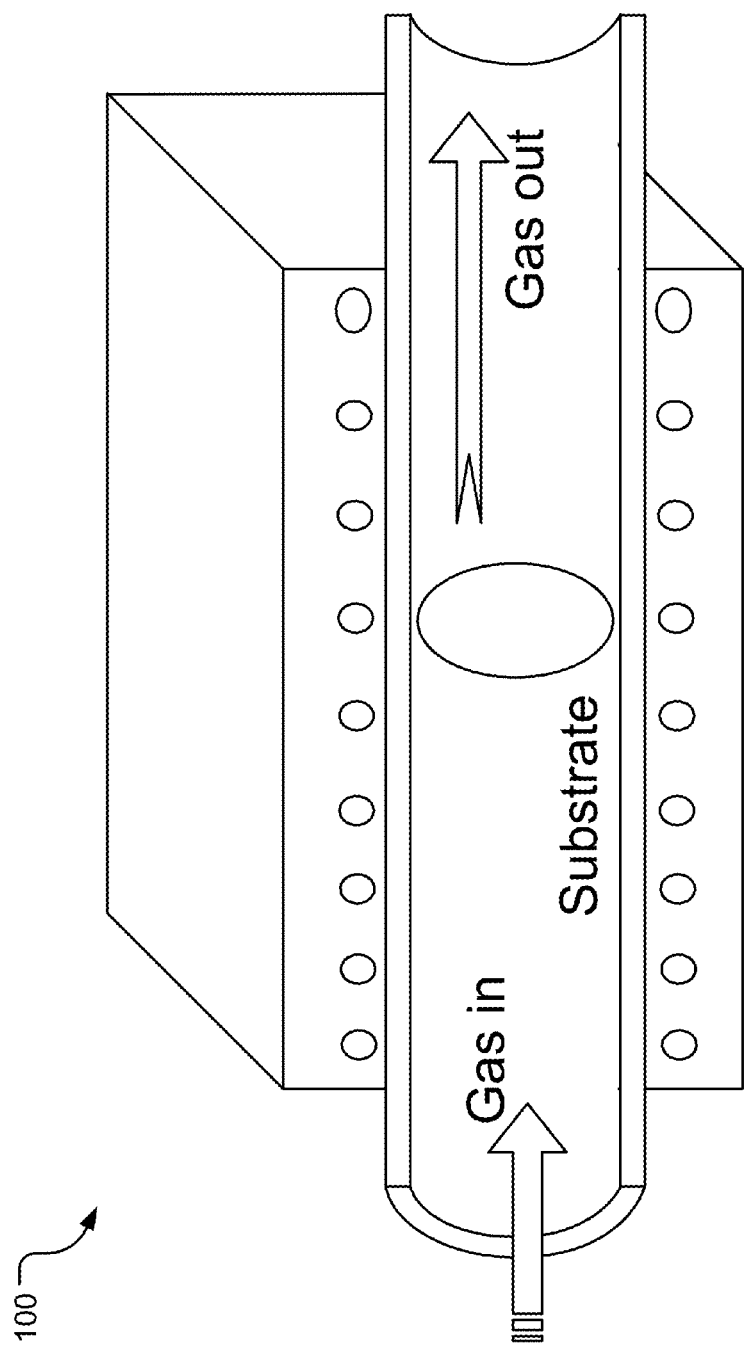
FIG. 1 shows a schematic of an exemplary system for performing full-wafer scale deposition of graphene layers on polycrystalline nickel by CVD.
Figure 2:
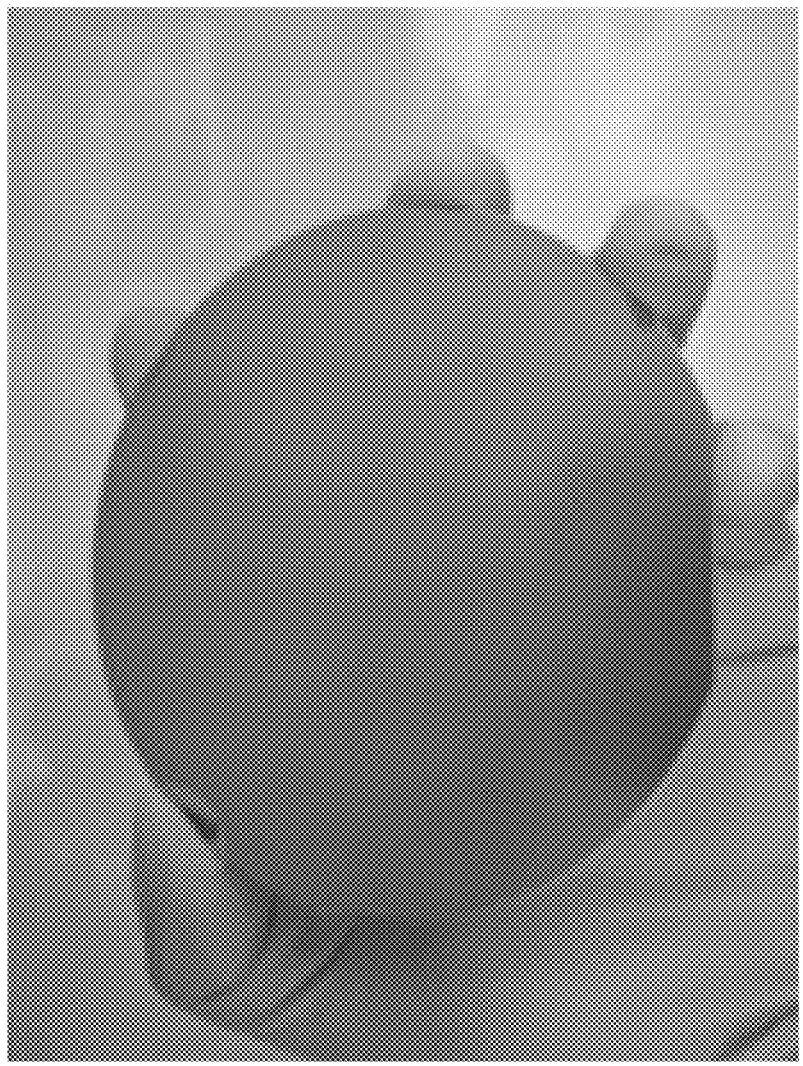
FIG. 2 shows an exemplary image of an E-beam evaporated nickel film on a substrate.

FIG. 1 shows a schematic of a system (100) for performing full-wafer scale deposition of graphene layers on polycrystalline nickel by CVD. FIG. 2 shows an image (200) of an E-beam evaporated nickel film on a substrate. Si/SiO$_2$ wafers of fl-inch in diameter can be used as substrates to deposit 100 nm films of elemental Ni by e-beam evaporation. In order to obtain polycrystalline Ni, the evaporated films can be annealed at 300 or 800° C. in a 10:1 Ar:H$_2$ mixture, for example. Heating and cooling rates of 0.15° C. min$^{-1}$ allows the formation of polycrystalline Ni domains throughout the substrate. CVD synthesis of graphene can be carried out at ambient pressure by systematically varying parameters such as temperature, gas composition, gas flow rate and deposition time. Described below are results obtained by heating the substrates under a flow of 600 sccm of H$_2$ up to 800° C. After the target temperature is reached, methane gas at a flow rate of 100 sccm can be added to the hydrogen flow over the substrate, which is lying horizontally inside the tube. The deposition process can be conducted for 8 minutes. Diluted methane can be used for the growth of single and few-layer graphene (1-15 layers, for example), while concentrated methane can lead to the growth of multilayer graphene that resembled bulk graphite. The number of layers of graphene can vary based on different applications of graphene but can be controlled to avoid bulk graphite. The described graphene growth method can be extended to other carbon feedstocks such as ethylene, acetylene, ethanol, and isopropanol, and other catalytic films such as Fe and Co.

Figure 3:
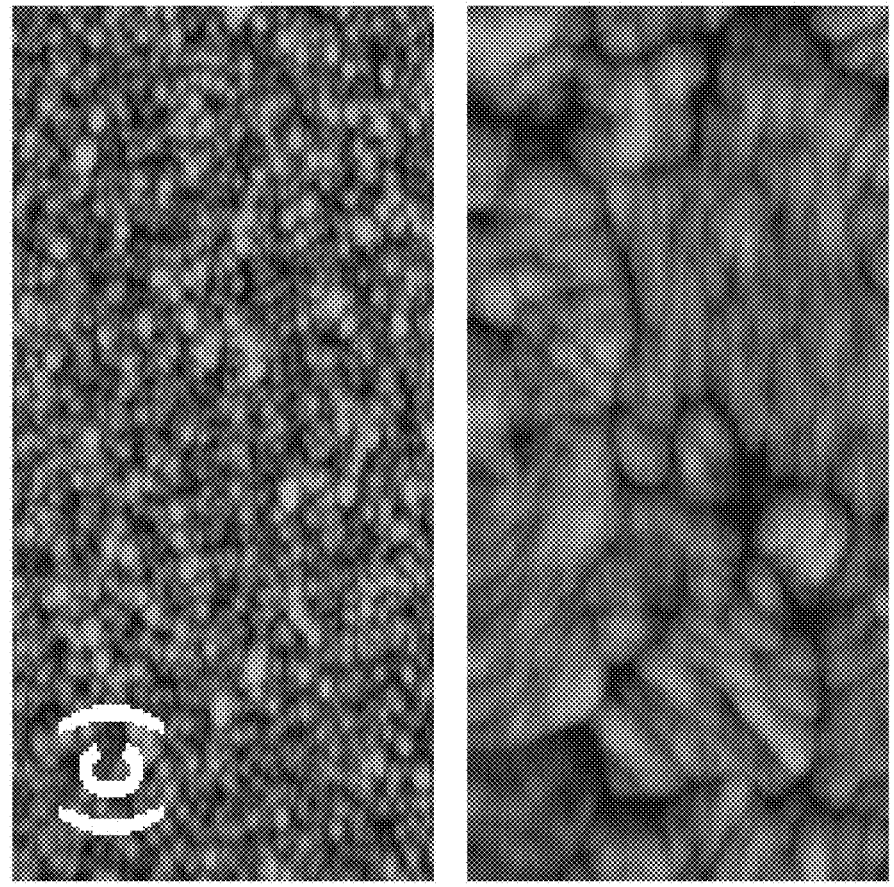
FIG. 3 shows an exemplary AFM image of Ni film before and after thermal annealing.

FIG. 3 shows an AFM image of Ni film before (300) and after (302) thermal annealing. Analysis of AFM images (300 and 302) in FIG. 3 reveals the formation of 1-2 μm$^2$ domains of polycrystalline Ni after thermal annealing for 15 minutes, for example. CVD synthesis of graphene can be carried out by systematically varying parameters such as temperature, gas composition, gas flow rate and deposition time. Below we present results obtained by flowing diluted CH$_4$ gas in Hydrogen with a concentration of 5×10$^{-3}$ M over the annealed wafers at 800° C. for 8 minutes.

Graphene Synthesis

Figure 4:
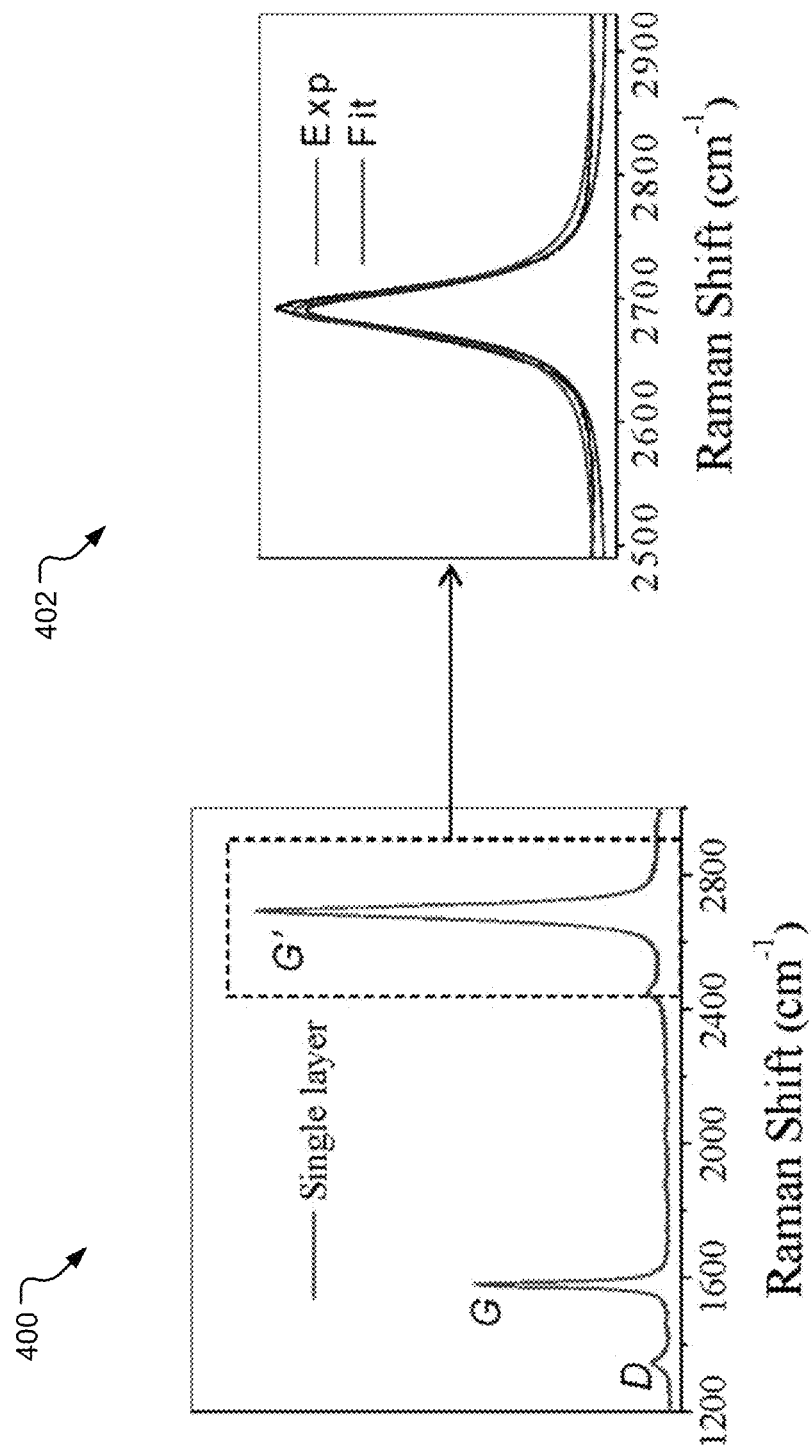
FIGS. 4 and 5 are graphs that show Raman spectra of single-layer graphene in the synthesized films.
Figure 5:
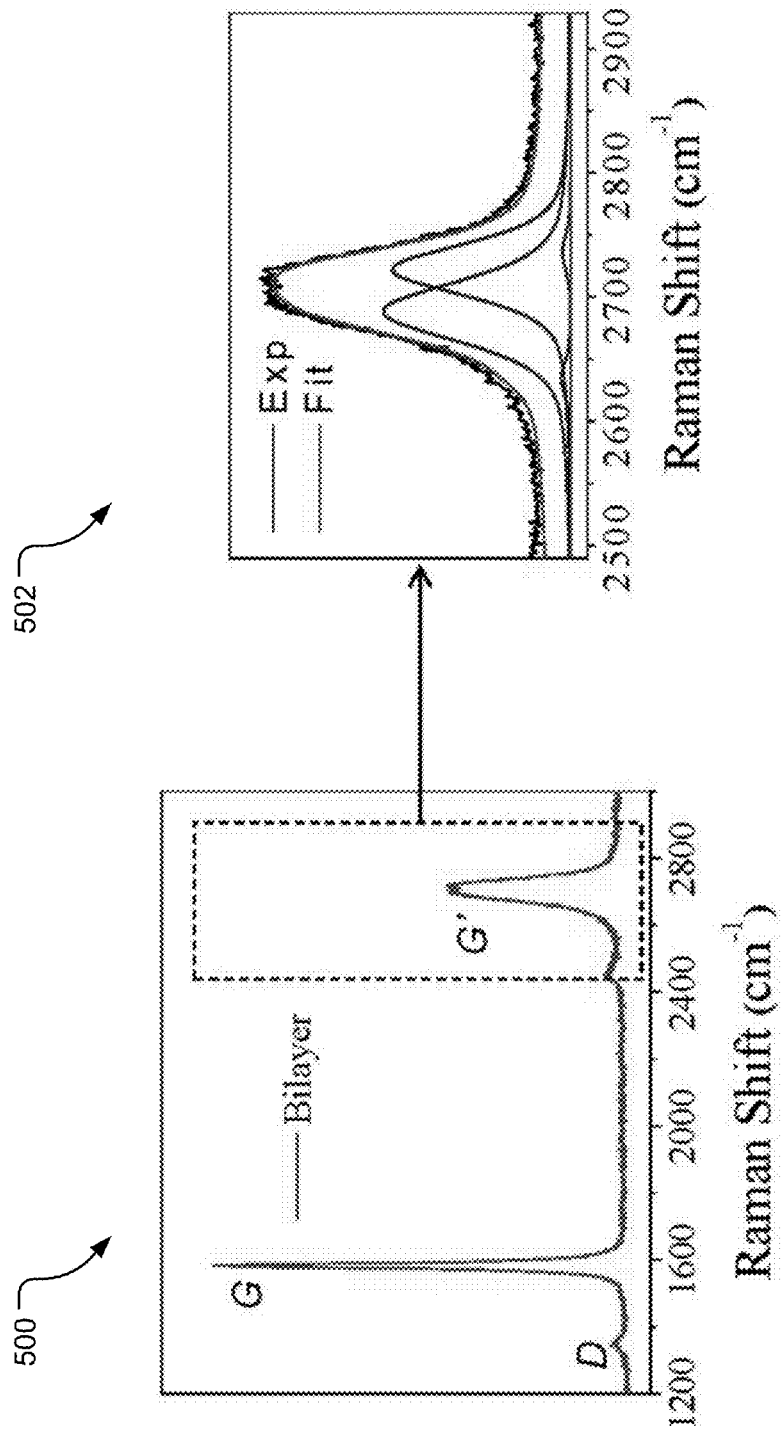

FIGS. 4 and 5 are graphs (400, 402, 500 and 502) that show Raman spectra of single-layer graphene in the synthesized films. Micro Raman analysis can be conducted throughout the wafer to confirm the deposition of graphene layers and to obtain information about the quality and the number of layers deposited. For example, a micro-Raman system can be used to take spectra at different locations on the synthesized films over Si/SiO$_2$/Ni substrates by using an excitation wavelength of 532 nm, with a power density of 2.0 mW cm$^{-2}$. Strong peaks at 1580 cm$^{-1}$ and 2690 cm$^{-1}$ correspond to G and G' bands, respectively, which agrees with the spectroscopic signature of graphene layers. The peak located at 1345 cm$^{-1}$ corresponds to the D band of graphitic carbon species, which is associated with the amount of defects in the crystalline structure of the graphene layers. The low cross section of the D band confirms that synthesized films are largely defect-free.

Interlayer interactions can affect the Raman fingerprints for single-layer, bilayer, and few-layer graphene, allowing unambiguous identification of graphene layers. FIG. 4 shows the Raman spectrum of single-layer graphene in the synthesized films. Single Lorentzian fit of the G' band is characteristic of monolayer graphene.

On the other hand, a subtle splitting, up-shift of nearly 15 wavenumbers and broadening observed in the G' band that can be fit with four Lorentzian peaks, as shown in FIG. 5, which constitute the spectroscopic signature of bilayer grapheme. The domain size for the single-layer, bilayer, and few-layer graphene is typically around 1-2 um, which is likely due to the grain size of the polycrystalline nickel film. Extensive Raman characterization over as-synthesized samples consistently showed the presence of graphene with less than five graphene layers. No signature of multi-layer or bulk graphite was found in the films deposited.

Electrical Measurements and Transparency

Figure 6:
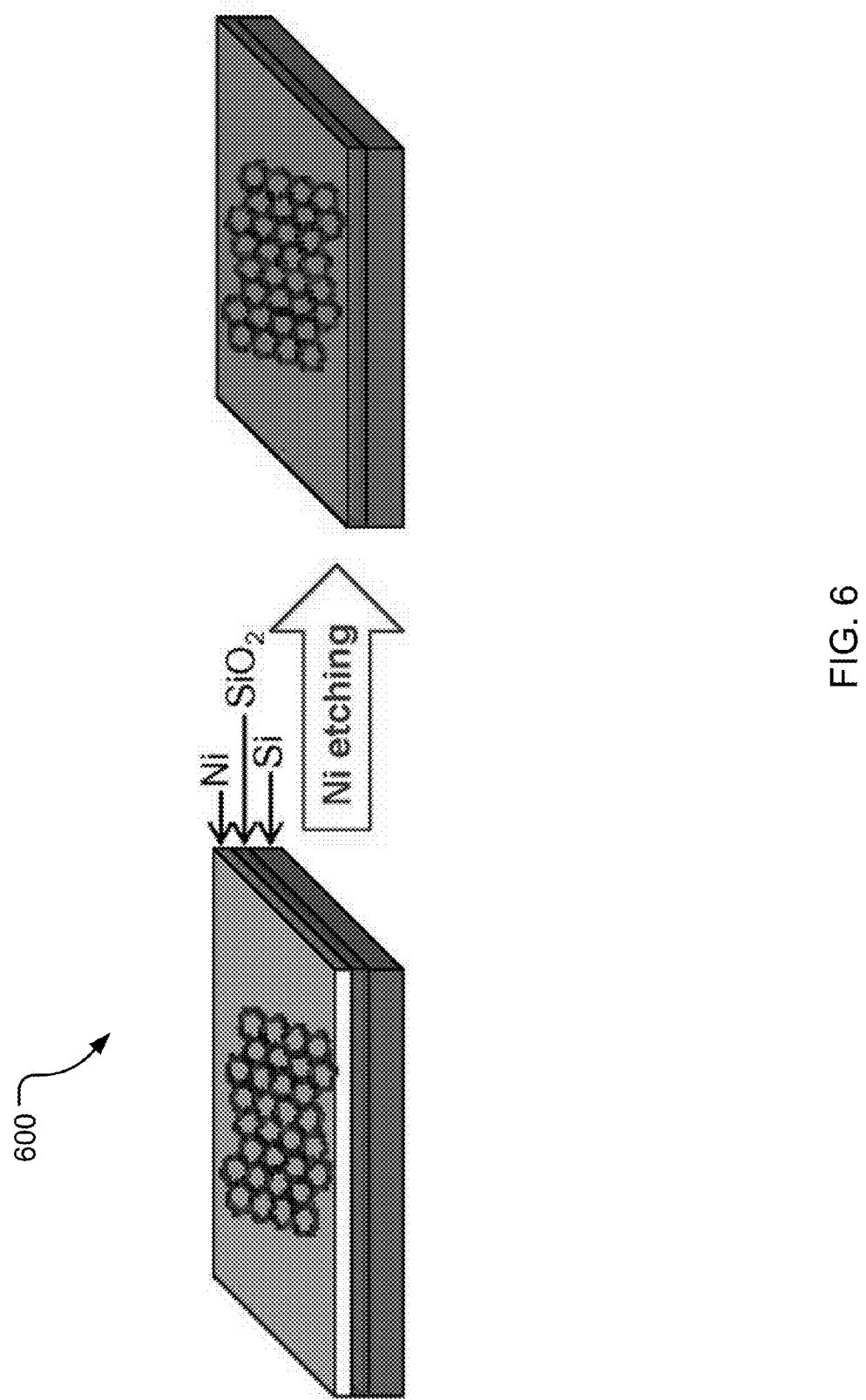
FIG. 6 is a diagram showing an exemplary process of transferring an as-synthesized graphene film to target substrates.

FIG. 6 is a diagram (600) showing a process of transferring an as-synthesized graphene film to target substrates. For example, a graphene-on-nickel sample can be immersed into a nickel etchant solution. This process can remove nickel and leave graphene films deposited on the underlying $Si/SiO_2$ substrate.

Figure 7:
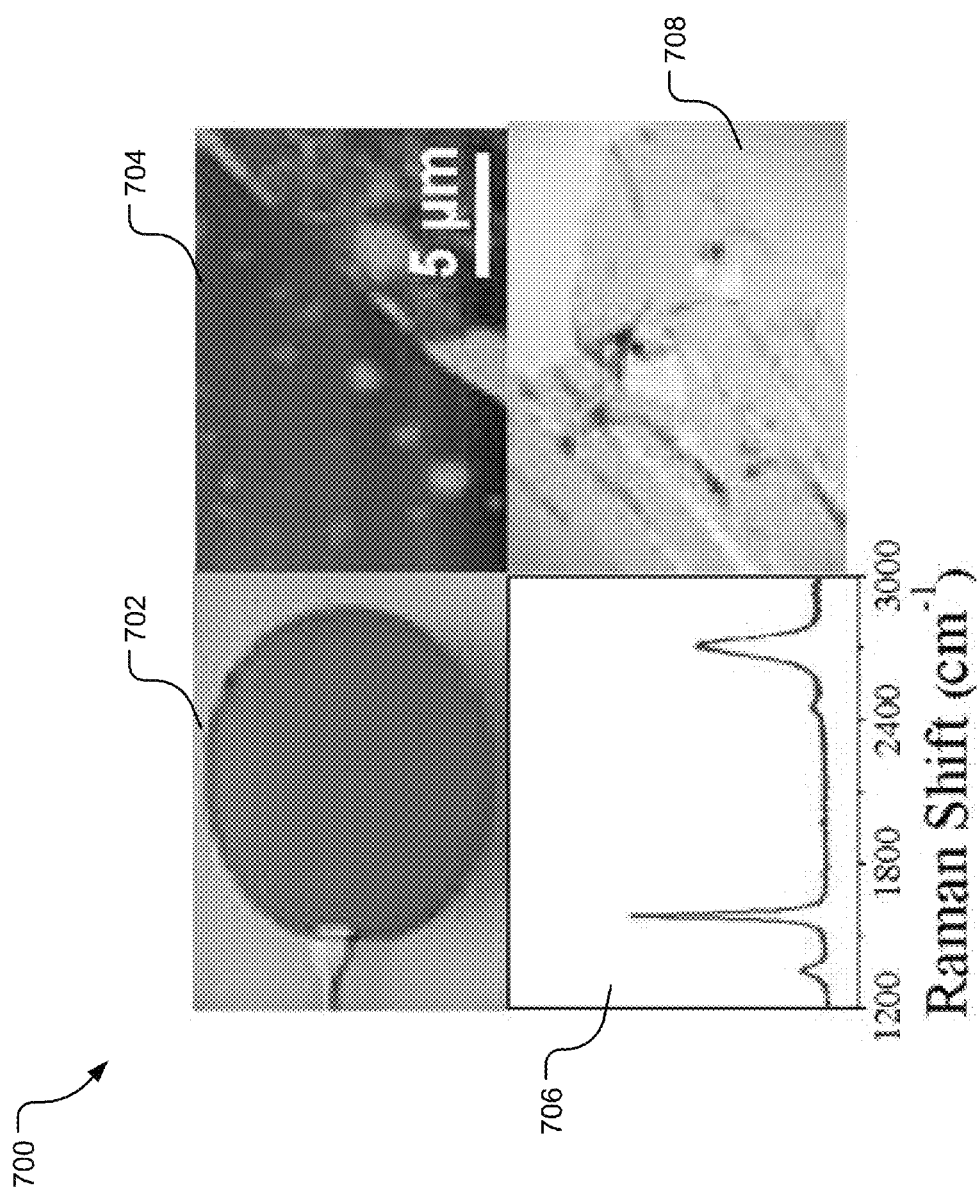
FIG. 7 shows four panels associated with a Si/SiO2/Ni/Graphene wafer.

FIG. 7 shows four panels (700) associated with a $Si/SiO_2$/Ni/Graphene wafer. The top left panel (702) is a photograph of a $Si/SiO_2$/Ni/Graphene wafer right after CVD synthesis (upper left). Micro Raman spectrum taken on the films after transfer is shown in lower left panel (706) of FIG. 7, clearly showing very low D band intensity. This confirms that graphene is largely defect-free after transfer. The upper right panel (704) shows an AFM image of the graphene films on $Si/SiO_2$ substrate after etching the Ni film. The lower right panel (708) shows a white-light microscopy image of the graphene films on $Si/SiO_2$ substrate after etching the Ni film.

Figure 8:
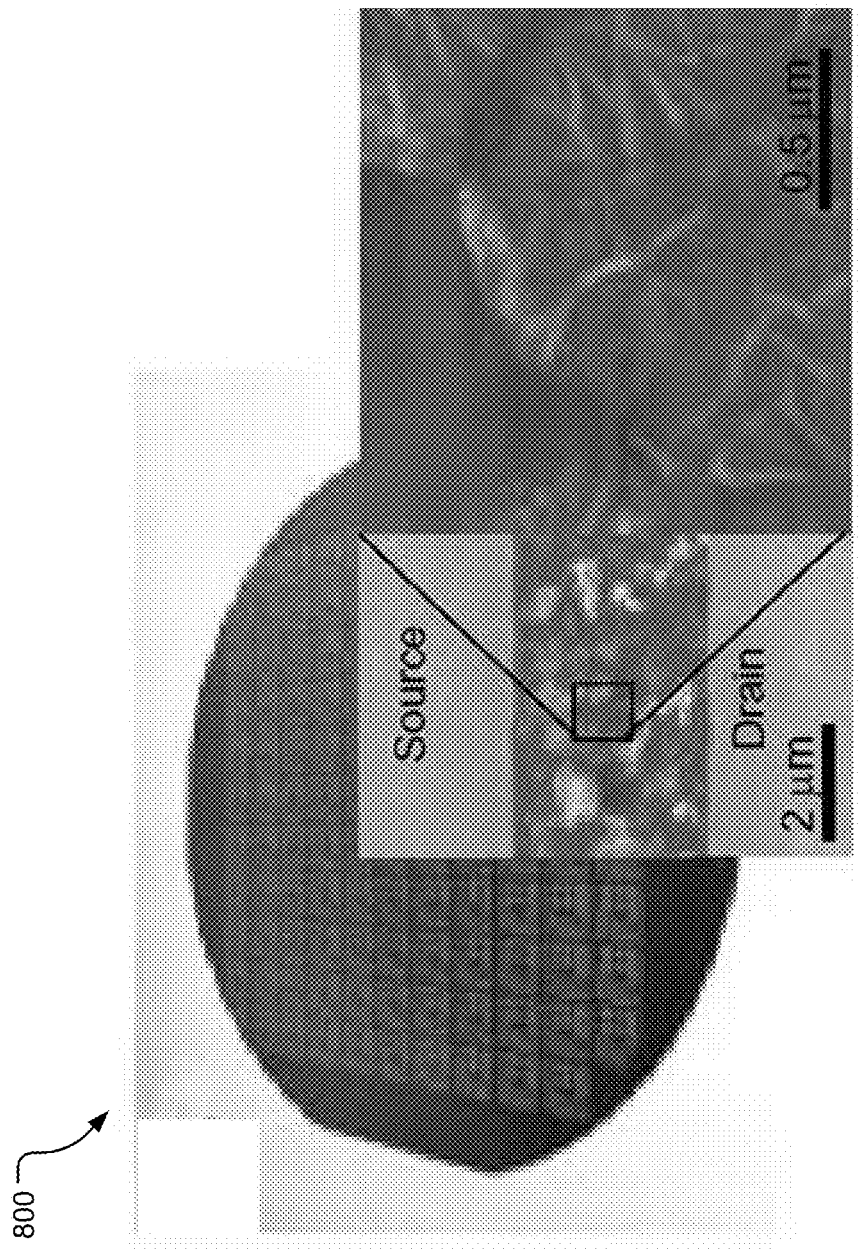
FIG. 8 shows an exemplary image of a large arrangement of chips with few-layer graphene devices built on a complete Si/SiO$_2$ wafer.

FIG. 8 shows an image (800) of a large arrangement of chips with few-layer graphene devices built on a complete $Si/SiO_2$ wafer. FLG were composed of micron-scale domains of single-, bi- and few-layers of graphene with a maximum thickness of 5 layers, as confirmed by micro Raman spectroscopy. This allowed the fabrication of back-gated FETs at large scale as shown in FIG. 8. Micro-Raman measurements performed on the device channel were consistent with a maximum of five graphene layers comprising the films. Four-probe measurements performed on the FLG films revealed a sheet resistance of ~68 kΩ/sq.

Figure 9:
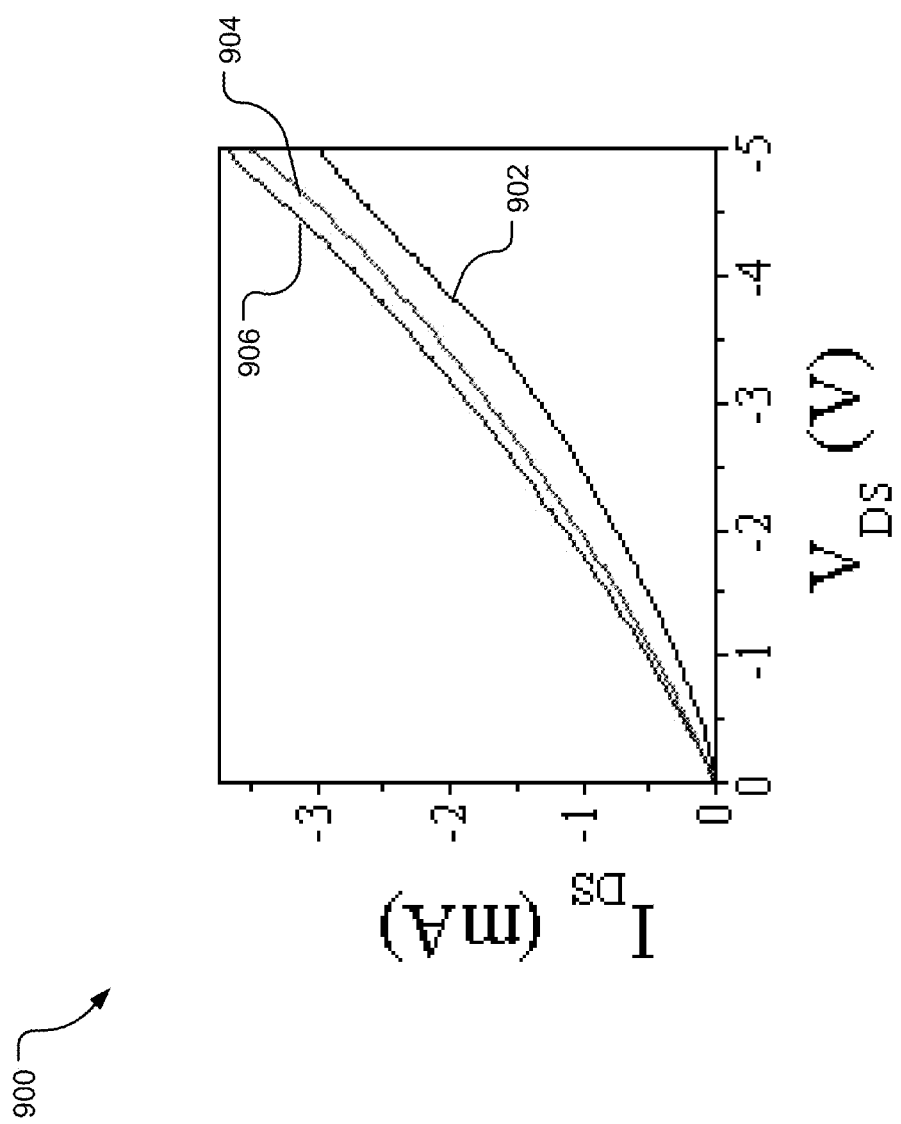
FIG. 9 is an exemplary graph showing $I_{DS}$-$V_{DS}$ measurements for different gate voltages, $V_G$=2.5 V, 1.5 V and −1.5 V.

FIG. 9 is a graph (900) showing $I_{DS}$-$V_{DS}$ measurements for different gate voltages, $V_G$=2.5 V (902), 1.5 V (904) and −1.5 V (906). The $I_{DS}$-$V_{DS}$ characteristics depicted in FIG. 9 shows that the drain current increases with the increase of negative gate voltage, indicating a weak p-type behavior in the films.

Figure 10:
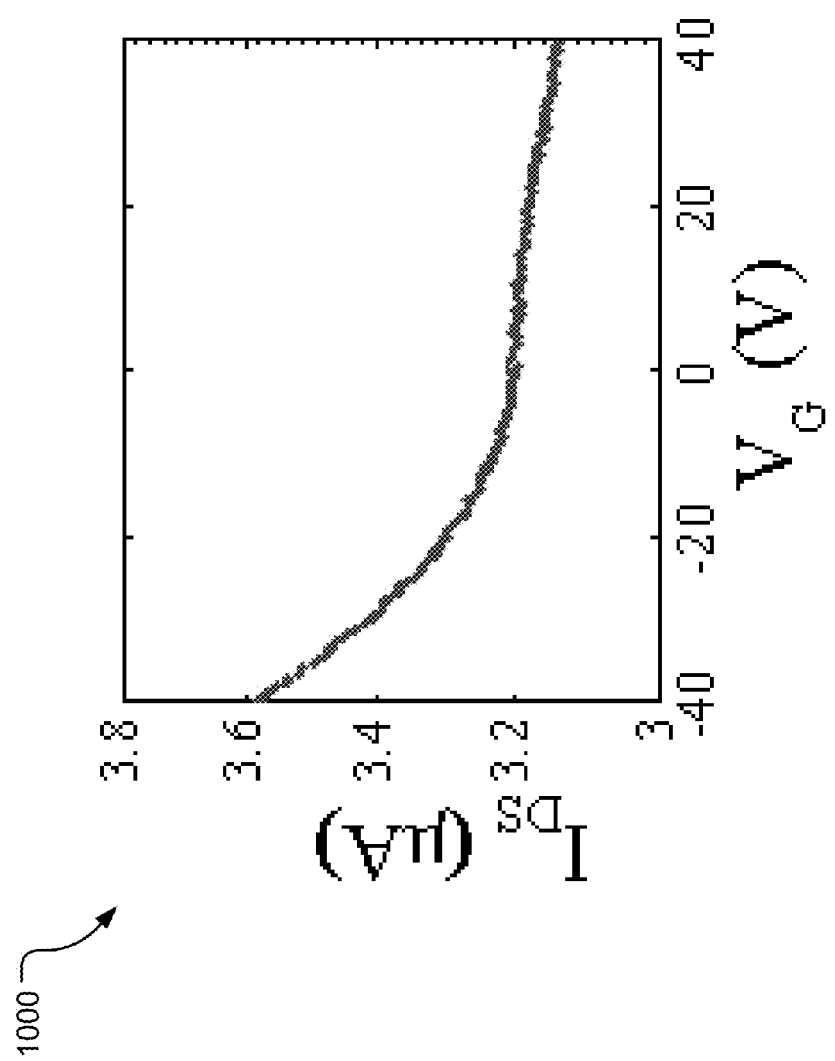
FIG. 10 is an exemplary graph showing $I_{DS}$-$V_G$ curve of one of the FET devices for $V_{DS}$=0.01 V.

FIG. 10 is a graph (1000) showing $I_{DS}$-$V_G$ curve of one of the FET devices for $V_{DS}$=0.01 V. FIG. 10 shows the transfer characteristics for a device with channel width of 20 µm and channel length of 4 µm. Most devices were highly conductive and exhibited a weak modulation of the drain current by the gate bias, which is consistent with a 2D semimetal. Compared to nanotubes, graphene FETs typically exhibit low on/off ratios, which can be improved significantly by patterning graphene into nanoribbons. Single graphene layer is a zero-gap semiconductor, but interlayer interactions bring in a semimetal behavior in FLG. Therefore, the transfer characteristics observed in FIG. 10 can be attributed to a screened gating effect due to irregularities of the film and the presence of more than two graphene layers in the films.

In another implementation, the as-synthesized graphene film can be transferred to target substrates by using poly (methyl metacrylate) (PMMA) which was spin-coated on top of the synthesized graphene films lying on $Si/SiO_2$/Ni substrates. The wafer can be dipped into a nickel etchant solution (Transene Company Inc.) at 90° C. for 2 hours to etch away the nickel film and render a free-standing PMMA film with the synthesized graphene adhered to it. PMMA/graphene film can be transferred to other substrates ($Si/SiO_2$, glass, etc.), and then acetone can be used to dissolve the PMMA residues and leave clean graphene films on the target substrate surface.

Figure 11:
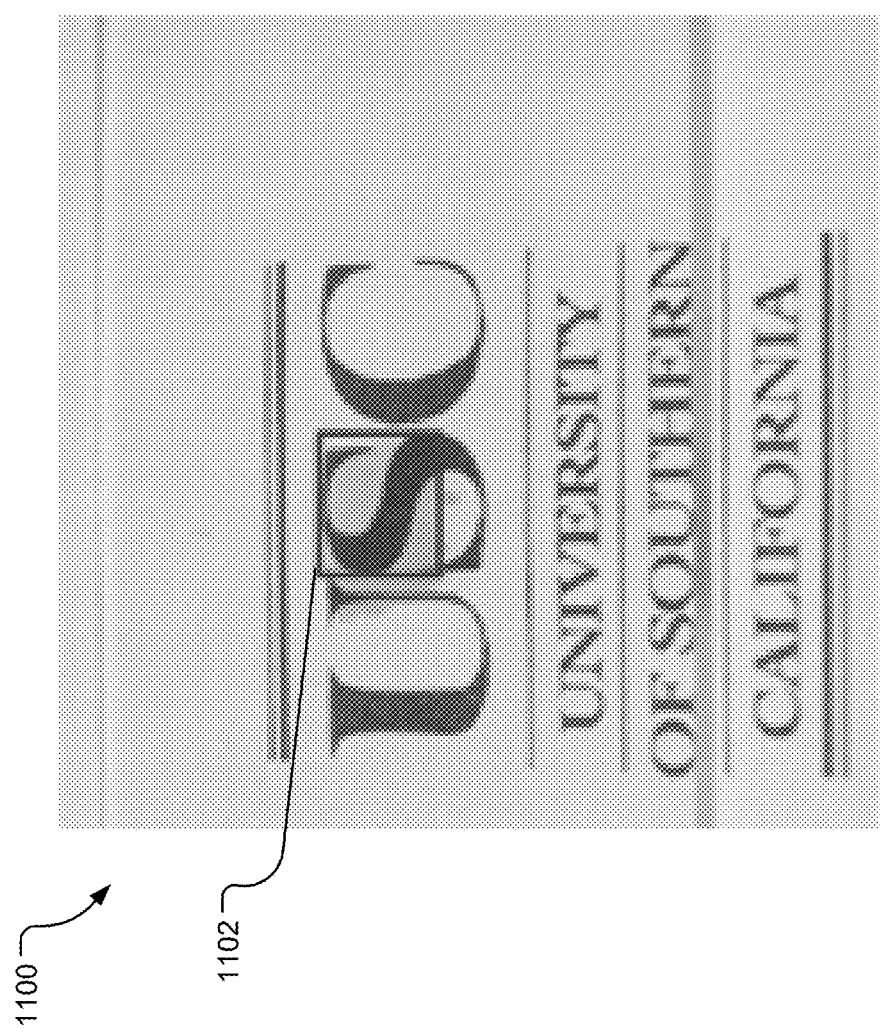
FIG. 11 shows a photograph of the FLG film transferred on glass.

FIG. 11 shows a photograph (1100) of the FLG film transferred on glass. For example, a ~1 cm² FLG film can be transferred to a glass substrate (inside the box 1102) exhibiting high transparency to naked eyes. The graphene films can be transferred on a 1 cm² $Si/SiO_2$/Ni substrate, to a glass substrate via Ni etching, which can allow the characterization of graphene layers as transparent conductive films. In brief, polymethylmethacrylate (PMMA) can be spin-coated on the synthesized graphene films on $Si/SiO_2$/Ni substrates. Substrates can be dipped into a nickel etchant solution (Transene Company Inc.) at 90° C. for 2 hours to etch away nickel and render a free-standing PMMA/graphene film. PMMA film with graphene can then be transferred to any other substrate ($Si/SiO_2$, glass, etc.), after which, acetone can be used to dissolve the PMMA residues and to leave clean graphene layers films on the new substrate surface.

Figure 12:
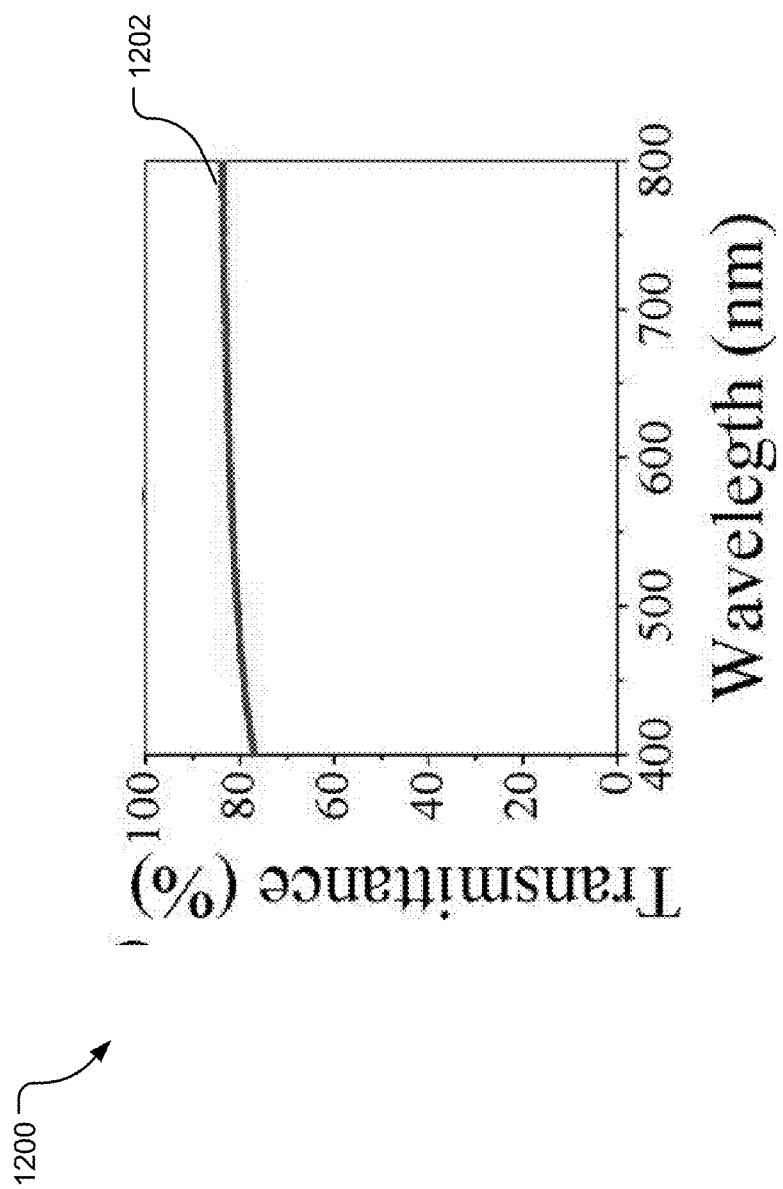
FIG. 12 is a graph showing a transmission spectrum of transferred graphene film shown in FIG. 11.

FIG. 12 is a graph (1200) showing a transmission spectrum of transferred graphene film shown in FIG. 11. The transmittance spectrum (1202) of the transferred FLG film in the visible wavelength range is shown to be ~80%, which is consistent with the visible-light transmittance reported for 2-3 graphene layer films. Due to the simultaneous good electrical conductivity and high transparency of the synthesized graphene films, they are likely to find application as transparent conductors.

Synthesis and Characterization of Graphene Layers with Camphor

Graphene layers can be synthesized from camphor and transferred from the original $Si/SiO_2$/Ni substrates to target $Si/Si/O_2$ glass substrate. For example, 1,7,7-trimethylbicyclohepan-2-one (Camphor) can be vaporized at 180° C. in an enclosed container. 300 sccm of 5% $H_2$ can be diluted in Ar and used as a carrier gas to bring camphor inside a 1 inch quartz tube where the $Si/Si/O_2$/Ni substrate is kept at 800° C. Growth of graphene layers can be carried out for 20 minutes, for example.

Figure 13:
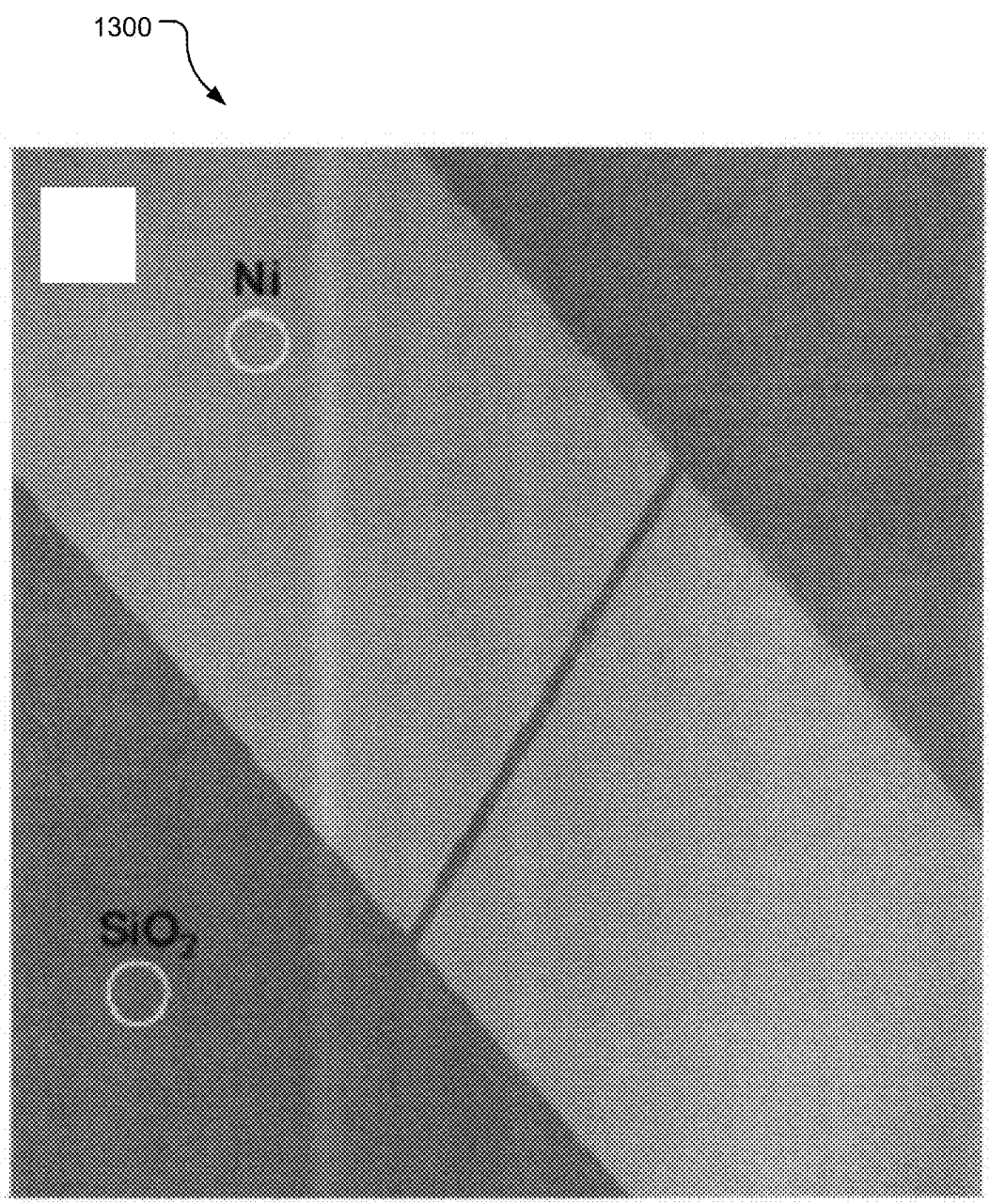
FIG. 13 is an optical photograph of Ni films on Si/SiO$_2$ after graphene synthesis.
Figure 14:
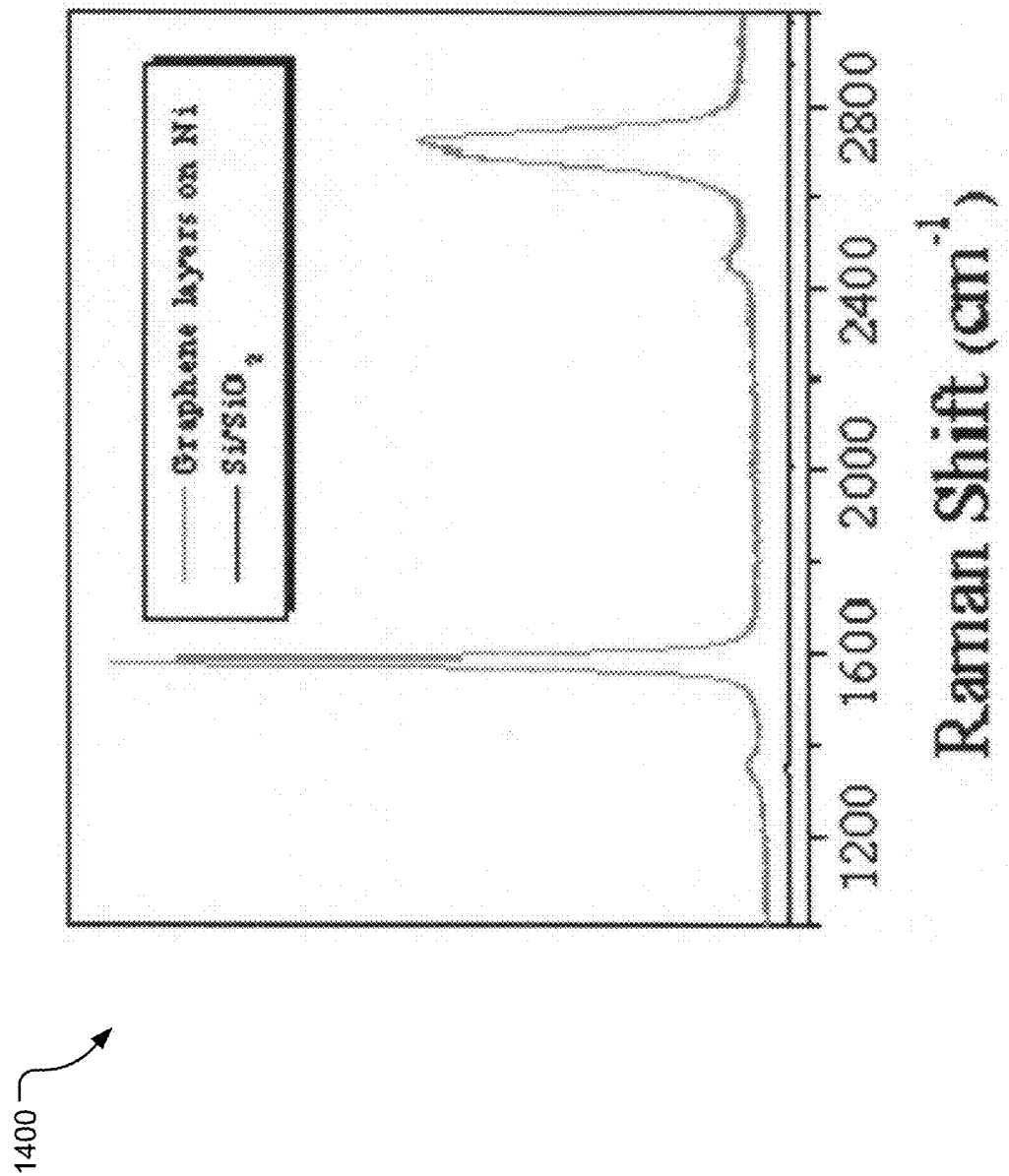
FIG. 14 is a graph showing Micro Raman spectra of graphene layers on Ni after growth and on Si/SiO$_2$ substrate.

FIG. 13 is an optical photograph (1300) of Ni films on $Si/SiO_2$ after graphene synthesis. FIG. 14 is a graph (1400) showing Micro Raman spectra of graphene layers on Ni after growth and on $Si/SiO_2$ substrate. A Renishaw InVia Raman microscope with a 532 nm solid state laser can be used to collect spectroscopic information of the deposited material. The $Si/SiO_2$ substrate is shown with patterned Ni regions after the CVD process is completed. The Raman spectra in FIG. 14 are taken at specific locations on the sample shown in FIG. 13. Spectrum taken on the Ni patterned area shows strong Raman peaks at 1581.3 cm$^{-1}$ and 2704.8 cm$^{-1}$, corresponding to the G and G' graphene bands respectively. Analysis of this spectrum shows the presence of dense stacks of graphene layers, with a G' band inhomogeneous broadening similar to that observed in graphite (FIG. 14). No growth of graphene was found in $Si/SiO_2$.

AFM imaging was performed on the synthesized samples, under tapping mode, on a Dimensions 3100 AFM system from Digital Instruments Inc. AFM cross section analysis of the deposited graphene layers from camphor confirms a much larger average thickness of graphene films (~30 nm) than that typically obtained when low molar-mass hydrocarbons, such as methane, are used as carbon feedstock (~5 nm).

Transfer of FLG Films to a Target Substrate

Polymethylmetacrylate (PMMA) can be spin-coated on the synthesized graphene films on $Si/SiO_2$/Ni substrates. Substrates can be dipped into a nickel etchant solution (Transene Company Inc.) at 90° C. for 2 hours to etch away nickel and render a free-standing PMMA/graphene film. PMMA film with graphene can then be transferred to any other substrate ($Si/SiO_2$, glass, etc.), after which, acetone can be used to dissolve the PMMA residues and to leave clean graphene layers films on the new substrate surface.

Continuous, Highly Flexible, and Transparent Graphene Films by Chemical Vapor Deposition for Organic Photovoltaics In some implementations, the techniques, systems, apparatus and materials described in this specification can be implemented to develop organic photovoltaic cells. For example, continuous, highly flexible, and transparent graphene films can be obtained by chemical vapor deposition (CVD) as transparent conductive electrodes (TCE) in organic photovoltaic cells. Graphene films can be synthesized by chemical vapor deposition, transferred to transparent substrates, and evaluated in organic solar cell heterojunctions (TCE/PEDOT/copper-phthalocyanine/fullerene/bathocuproine/aluminum). The continuous nature of the CVD graphene films can lead to minimal surface roughness (~0.9 nm), and offer sheet resistance down to $230\Omega \cdot \square^{-1}$ (at 72% transparency), much lower than stacked graphene flakes at similar transparency. In addition, solar cells with CVD graphene and ITO electrodes can be fabricated side by side on flexible polyethylene terephthalate (PET) substrates, and confirmed to offer as good performance, with power conversion efficiencies ($\eta$) of 1.18 and 1.27%), respectively. Furthermore, CVD graphene solar cells can demonstrate outstanding capability to operate under bending conditions up to 138°, whereas the ITO-based devices displayed cracks and irreversible failure under bending of 60°. Thus, the CVD graphene films can be implemented for flexible photovoltaic applications.

Solar energy harvesting using organic photovoltaic (OPV) cells can be used to achieve low-cost energy due to their ease of manufacture, light weight and compatibility with flexible substrates. One aspect of this type of optoelectronic device can include the transparent conductive electrode through which light couples into the device. Various other OPVs use transparent indium tin oxide (ITO) or fluorine doped tin oxide (FTO) as such electrodes. Also, carbon nanotubes and nanowires can be used as materials for electrodes in OPVs.

In implementations described here, graphene can be used as the electrode materials in the OPVs. Graphene is a one-atom thick, two-dimensional crystalline arrangement of carbon atoms with a quasi-linear dispersion relation, and predicted mobility on the order of $10^6$ cm$^2$/V·s. An ideal graphene monolayer has a transparency of 97-98% and a sheet resistance ($R_{sheet}$) of ~4 k$\Omega \cdot \square^{-1}$. Graphene films are suitable for applications as transparent conductive electrodes, where low $R_{sheet}$ and high optical transparency are essential. For example, continuous, highly flexible, and transparent CVD graphene films can be implemented with sheet resistance and transparency controlled in the range of $230\Omega \cdot \square^{-1}$ at 72% transparency and 8.3 k$\Omega \cdot \square^{-1}$ at 91% transparency. Flexible organic photovoltaics based on CVD graphene films can achieve a power conversion efficiency of 1.18% and operation under bending conditions up to 138°.

As described above, chemical vapor deposition (CVD) can be used to obtain high quality graphene films. For example, wafer-scale synthesis of single- and few-layer graphene can be achieved using CVD. Described below is an implementation of large area, nearly defect-free and highly smooth few-layer graphene films, synthesized from CVD, as the anode material in flexible and rigid OPV cells.

Figure 15:
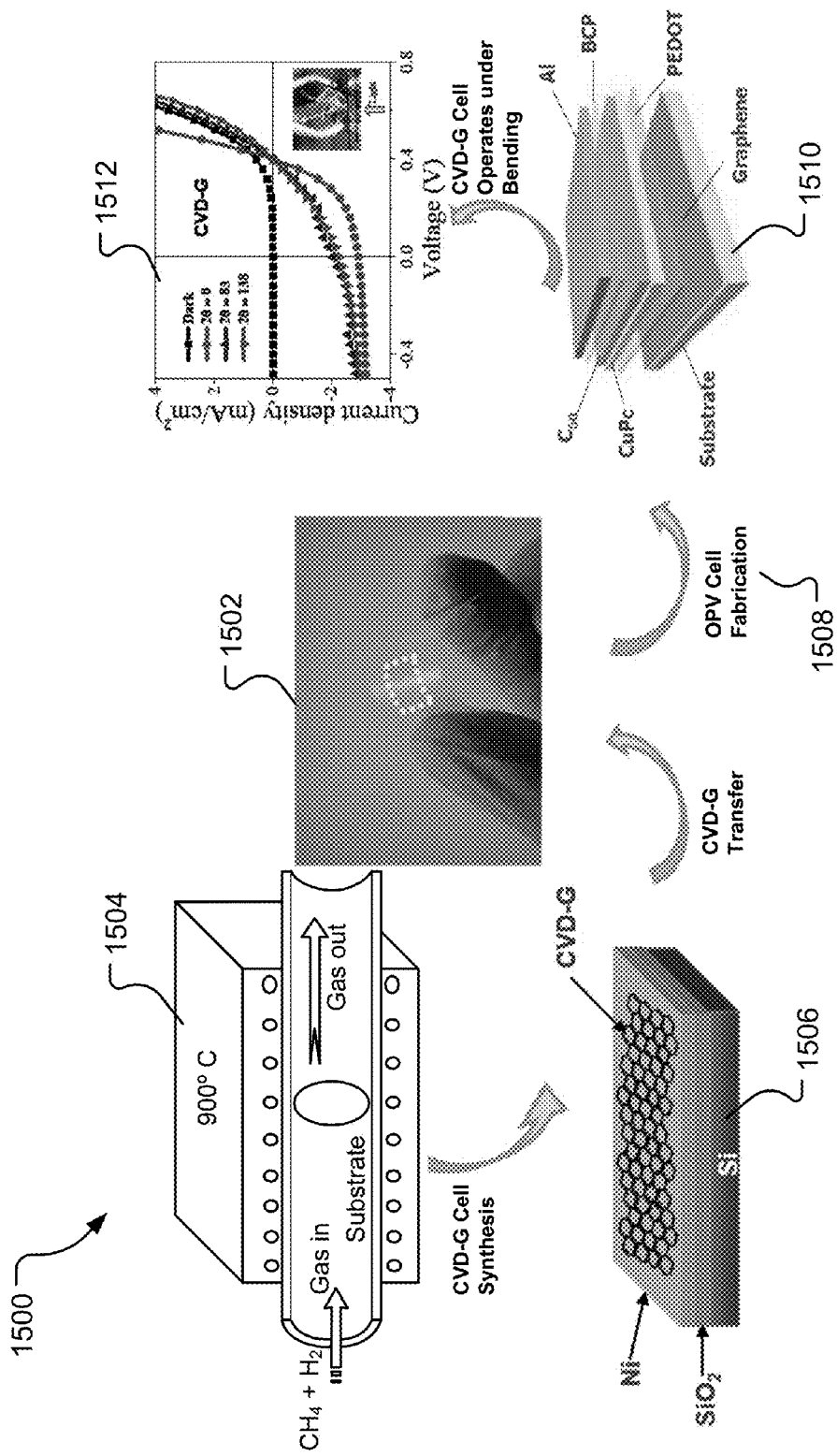
FIG. 15 is a diagram showing a process for fabricating an organic solar cell with graphene as anode electrode.

FIG. 15 is a diagram (1500) showing a process for fabricating an organic solar cell with graphene as anode electrode. A system setup (1504) shown on the top left side of the diagram can be used in the CVD deposition of graphene layers. On the lower left side of the diagram, a schematic (1506) shows a process of transferring the graphene film from the CVD deposition to a Si/SiO$_2$ substrate via nickel etching. In the middle of the diagram (1500), highly transparent graphene films (1502) transferred onto PET are shown. Using the transparent graphene films transferred onto PET, OPV cells can be fabricated (1508). On the lower right side of the diagram is shown a schematic representation (1510) of the energy level alignment and construction of the heterojunction organic solar cell fabricated with graphene as anodic electrode. The fabricated OPV cells with graphene can operate under bending. The chart (1512) on the upper right side of the diagram shows the current density and power density vs. voltage characteristics of CVD-G.

The use of CVD graphene (CVD-G) is attractive because other graphene films, which are formed by stacked micron-size flakes, tend to suffer from flake-to-flake contact resistance and high roughness. In contrast, grain boundaries of CVD-G films have the advantage of being formed in situ during synthesis; such a process canto minimize contact resistance between neighboring graphene domains and may result in smoother films with better conducting properties. Solar cells made with CVD-G exhibited performance that compares to ITO devices and surpasses that of ITO under bending conditions, with power conversion efficiencies of 1.18% when fabricated on flexible substrates.

Figure 16:
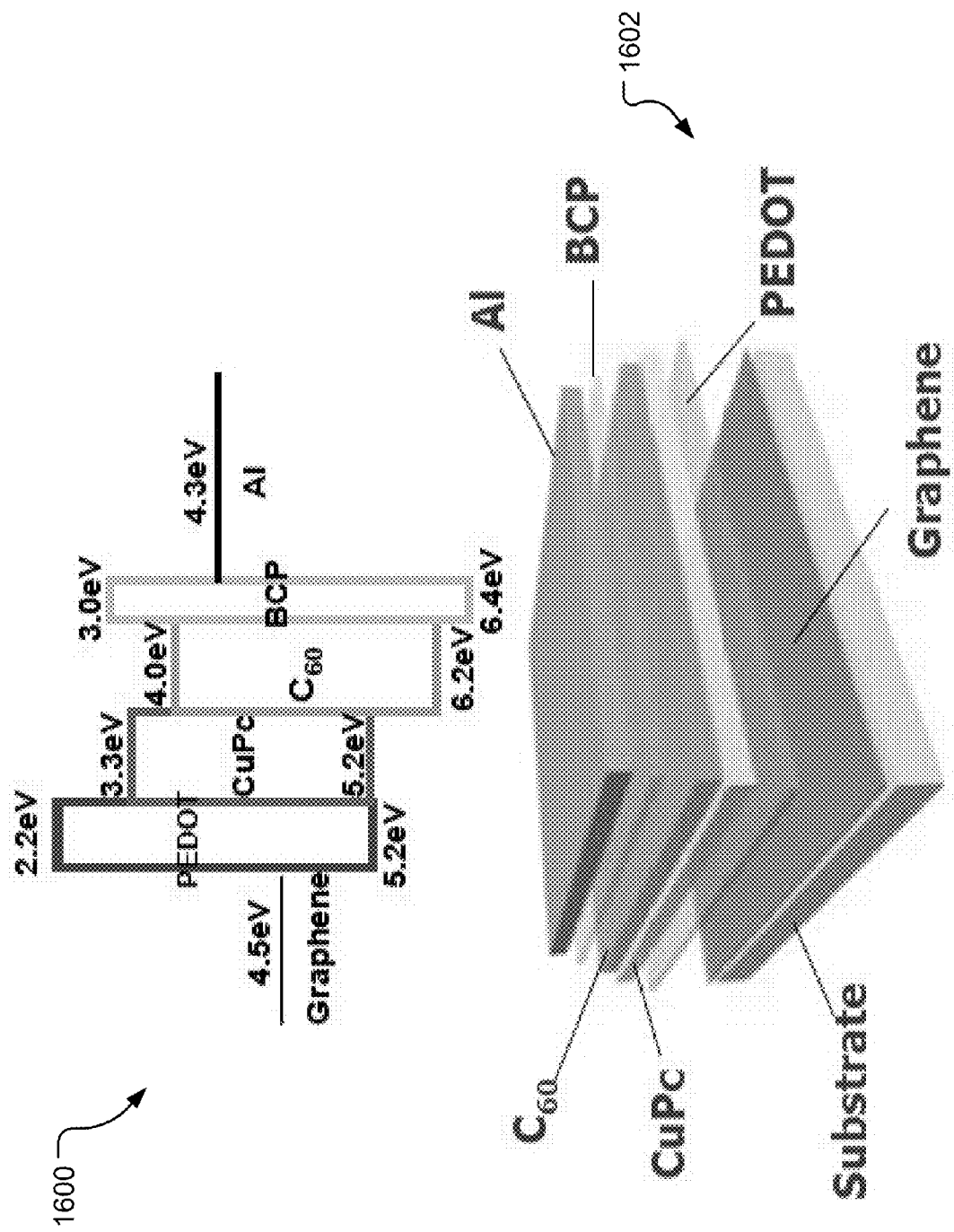
FIG. 16 is a schematic representation of the energy level alignment and construction of the heterojunction organic solar cell fabricated with graphene as anodic electrode: CVD-G/PEDOT:PSS/CuPc/C$_{60}$/BCP/Al.

FIG. 16 is a schematic representation of the energy level alignment (1602) and construction (1602) of the heterojunction organic solar cell fabricated with graphene as anodic electrode: CVD-G/PEDOT:PSS/CuPc/C$_{60}$/BCP/Al. Graphene films can be synthesized by chemical vapor deposition on a thermally annealed polycrystalline nickel surface comprised mostly of the (111) plane (see below for more information). The graphene films can be grown on polycrystalline nickel surfaces. This synthesis can yield a continuous film comprised of monolayer and few-layer graphene with low defect density, as indicated by TEM imaging and diffraction and micro Raman spectroscopy measurements performed on the transferred films (see below for information). After synthesis, graphene films can be transferred to transparent substrates.

Figure 17:
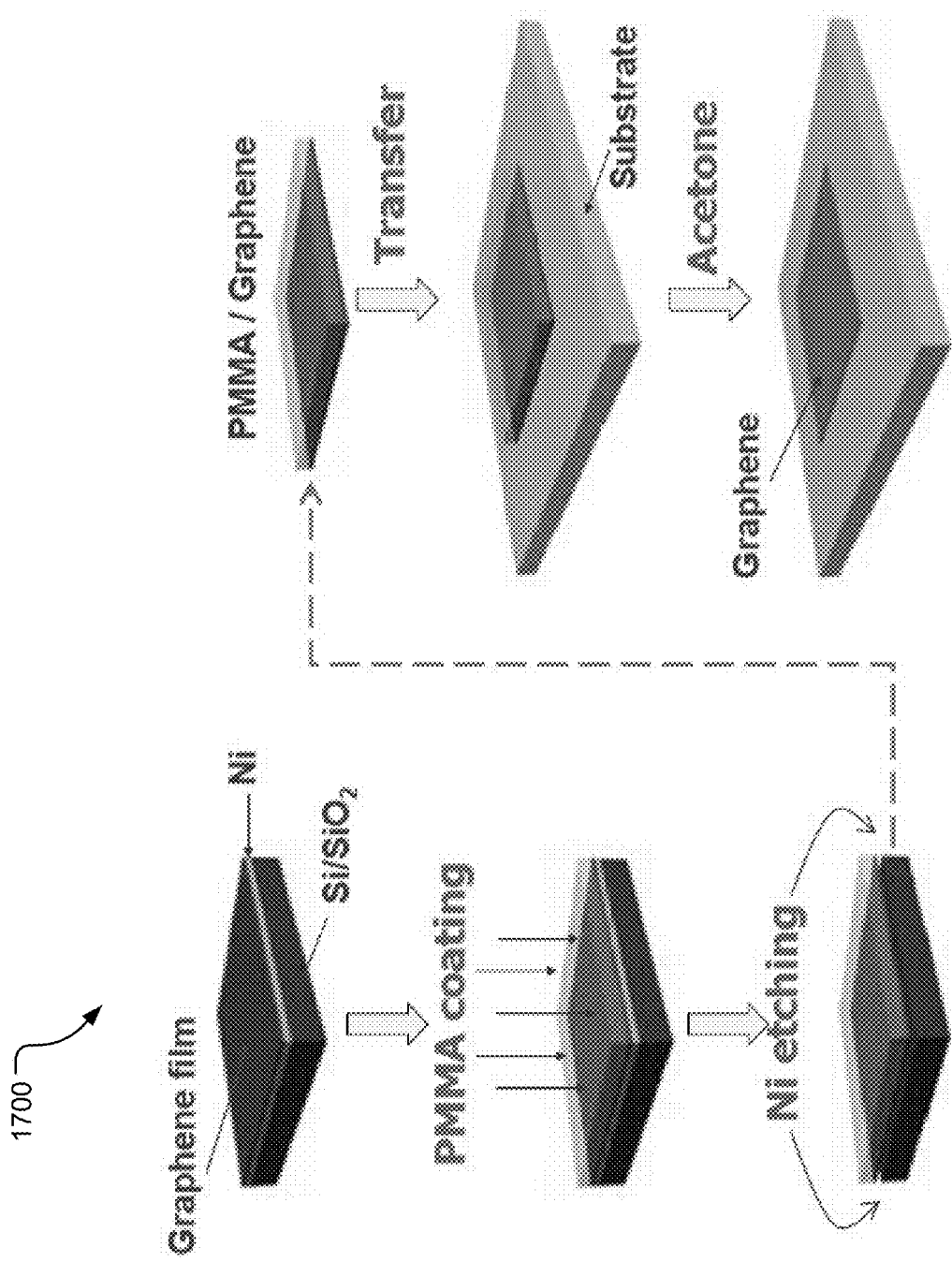
FIG. 17 is a schematic of the CVD-G transfer process (1700) onto transparent substrates.

FIG. 17 is a schematic of the CVD-G transfer process (1700) onto transparent substrates. First, a thin layer (300 nm) of poly-methylmethacrylate (PMMA) can be deposited on top of the as-synthesized graphene on Si/SiO$_2$/Ni substrates by spin coating. Then, the nickel layer underneath the graphene can be dissolved by dipping the substrates in Ni etchant solution for approximately 1 hour at 90° C. Etching of the nickel can render free-standing PMMA with the synthesized graphene adhered to it, with residual nickel below of the limit of detection of an Omicron XPS/UPS system. Subsequently, PMMA/graphene can be transferred by direct graphene contact onto transparent substrates such as glass and polyethylene terephthalate (PET) sheets, after which the PMMA layer can be finally dissolved with acetone leaving the clean graphene film on the target substrate surface.

Figure 18:
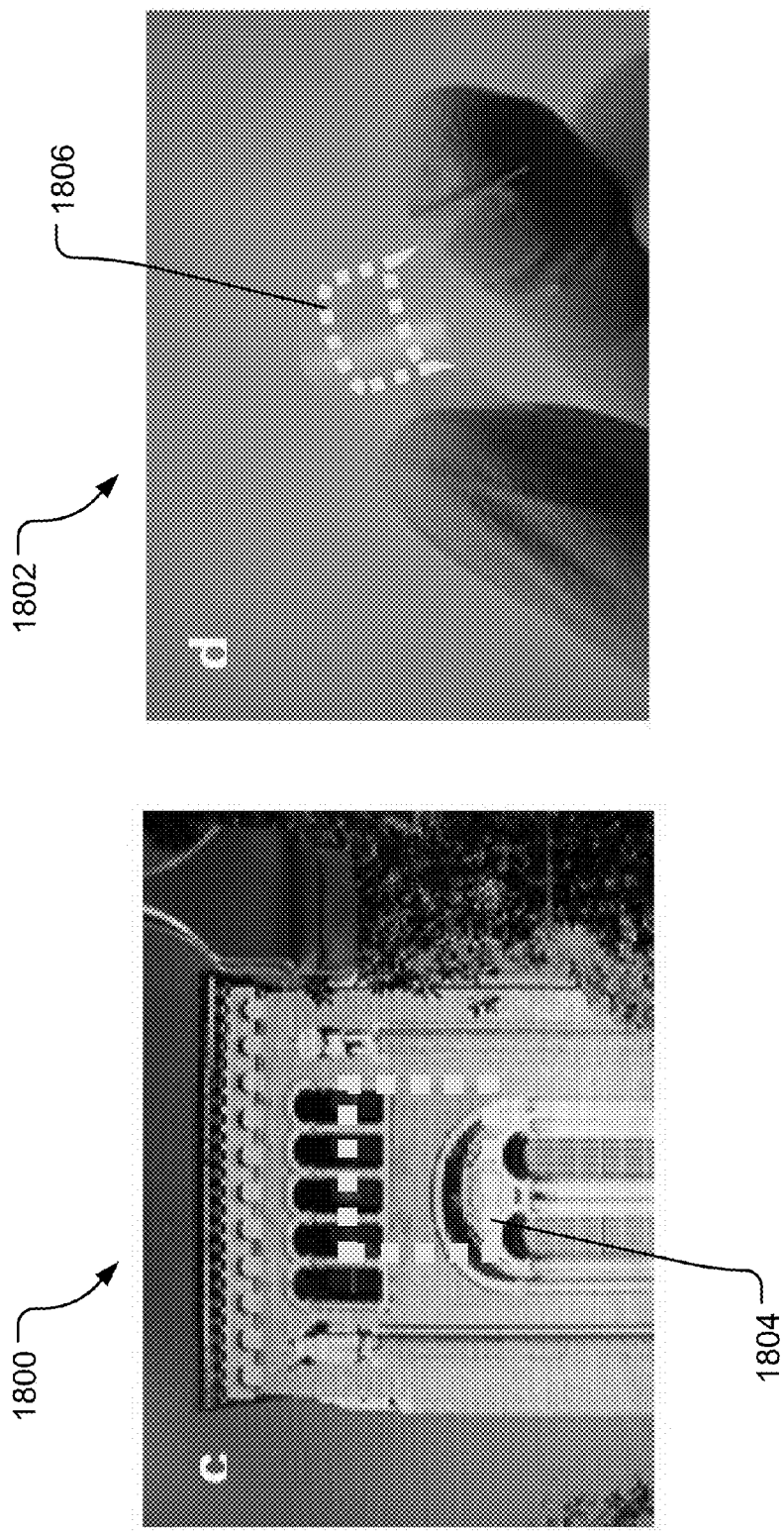
FIG. 18 shows photographs showing highly transparent graphene films transferred onto glass and PET respectively.

FIG. 18 shows photographs showing highly transparent graphene films transferred onto glass (1800) and PET (1802) respectively. The photographs display see-through areas (dotted lines 1804 and 1806) of 2 and 1.3 cm$^2$ of graphene films after being transferred to glass and PET, respectively. Through inspection of the graphene films using scanning electron microscopy confirmed the formation of continuous films without any visible cracks.

The thin film nature of OPV devices may need control of layer thickness and morphology to reduce the possibility of leakage current and shorts. Therefore, thickness and surface smoothness of the transparent electrode in OPVs can be important for good device performance. As a point of reference, the thickness and roughness given by CVD graphene films can be compared against SWNT and ITO films, which are materials that have been amply reported in the literature as transparent electrodes. The thickness of CVD-G obtained at the above-mentioned synthesis conditions is on the order of 1-3 nm (see below for more information).

Figure 19:
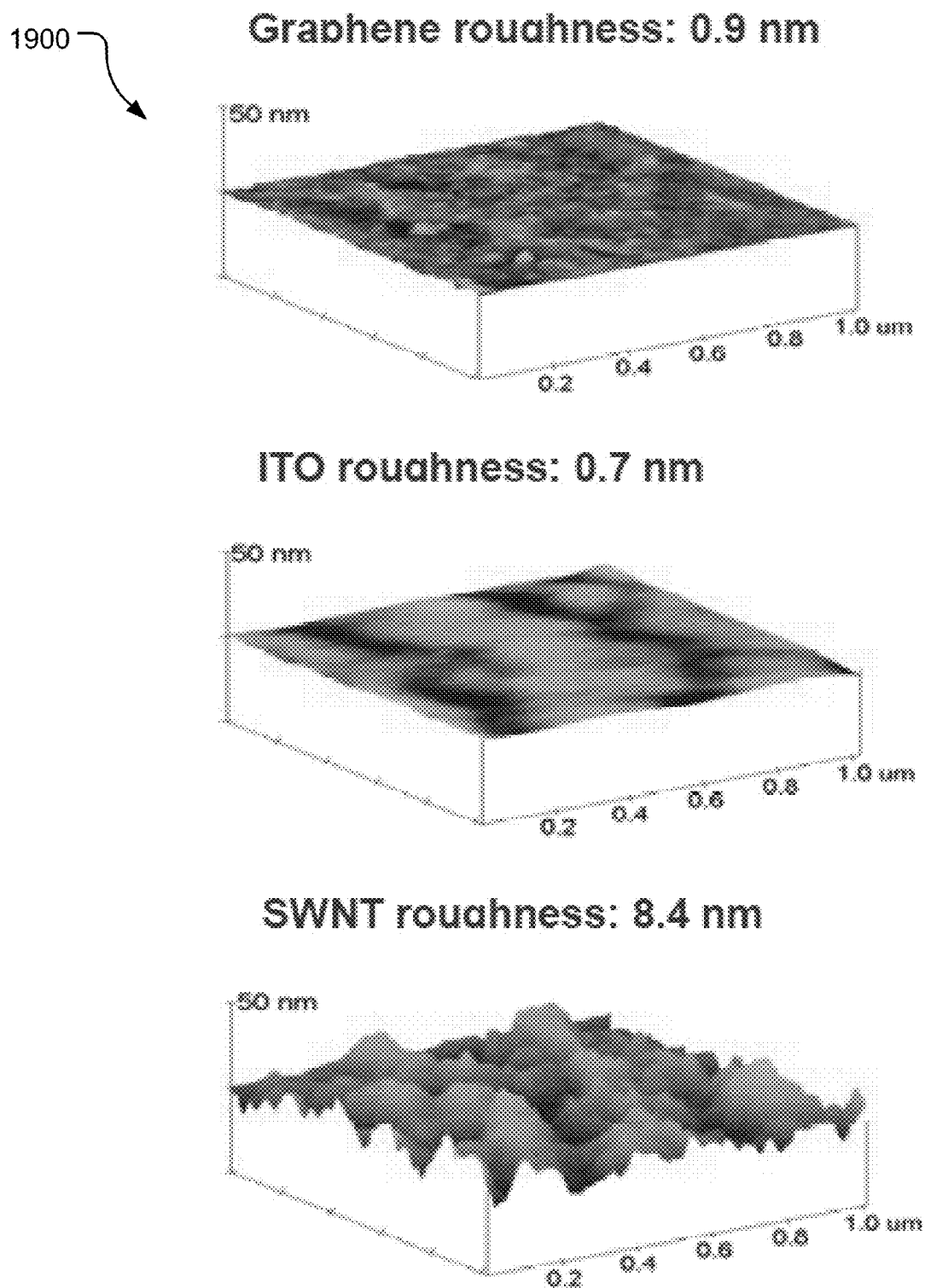
FIG. 19 shows AFM images of the surface of CVD-G, ITO and SWNT films on glass.

FIG. 19 shows AFM images of the surface of CVD-G, ITO and SWNT films on glass. The scale bar in z-direction is 50 nm for all images. The AFM images of the CVD graphene, a commercial 150-nm-thick ITO film ($R_{sheet}=20\Omega\cdot\square^{-1}$) and a 30-nm-thick SWNT film are obtained by the filtration/PDMS transfer method ($R_{sheet}=1.1$ k$\Omega\cdot\square^{-1}$). The r.m.s. surface roughness measured for CVD graphene, ITO and SWNT films was 0.9, 0.7 and 8.4 nm for graphene, ITO and SWNT, respectively. These results indicate that CVD-G was nearly 10 times smoother and thinner than SWNT films, with surface roughness comparable to that of ITO. In addition, CVD-G and SWNT films passivated with poly (3,4-ethylenedioxythiophene)-poly(styrenesulfonate) (PEDOT:PSS) showed r.m.s surface roughness of 0.8 and 5.1, respectively.

Figure 20:
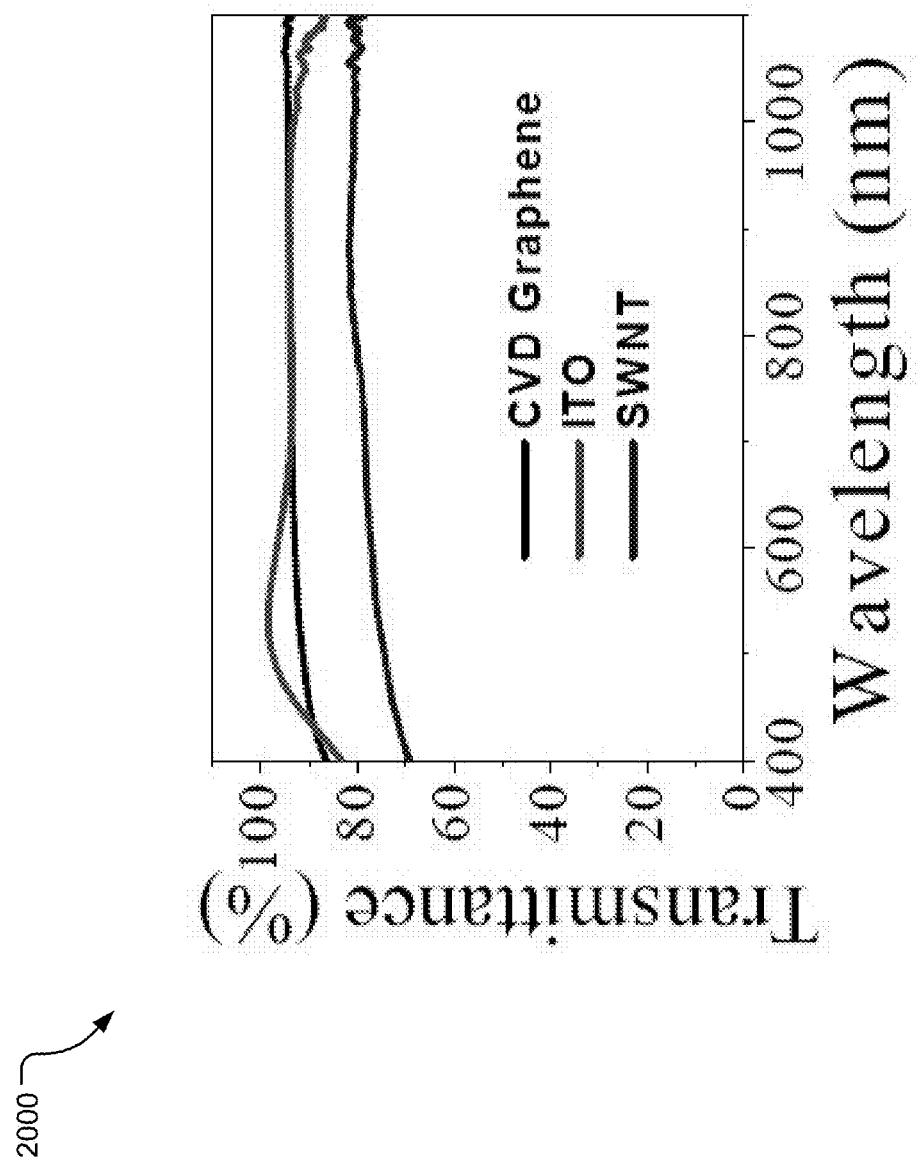
FIG. 20 is a chart showing transmission spectra for CVD-G, ITO and SWNT films on glass.

FIG. 20 is a chart showing transmission spectra for CVD-G, ITO and SWNT films on glass. High transparency may also be needed for the use of CVD-G as a substitute for transparent metal oxide electrodes in OPVs. Optical transmittance of the transferred graphene films in the visible and near infrared range was measured using a Varian50 spectrophotometer in the wavelength range of 400-1100 nm. FIG. 20 depicts the wavelength dependence of the optical transparency of the CVD-G, ITO and SWNT films displayed in FIG. 19. For ITO films, the transmittance peaks at 535 nm, while the transmittance increases monotonically with the increase in wavelength of the incident light from T=86% (at 400 nm) to T=95% (at 1100 nm) and from T=70% (at 400 nm) to T=82% (at 1100) nm, in graphene and SWNT films respectively.

Light transmission in graphene can be dictated by absorption, due to the $sp^2$ conjugated system. As a consequence of this, as CVD-G films become thinner, transparency can substantially increase. Therefore, the conductivity of CVD graphene can be correlated with its transparency. The transparency and conductance of graphene films can be tuned by varying the synthesis conditions.

Figure 21:
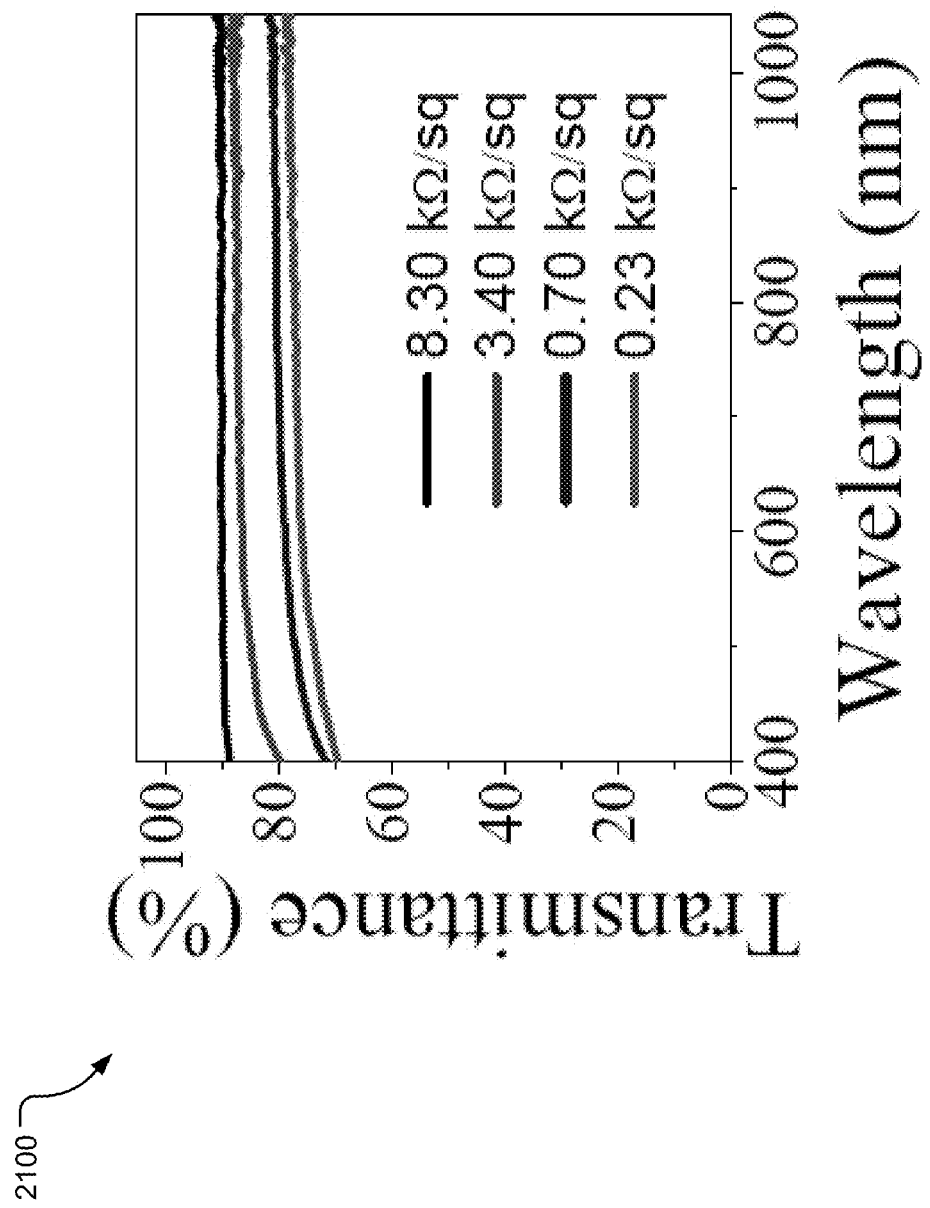
FIG. 21 is a chart showing transmission spectra of CVD-G with different sheet resistance ($R_{sheet}$).

FIG. 21 is a chart showing transmission spectra of CVD-G with different sheet resistance ($R_{sheet}$). FIG. 21 shows that highly transparent CVD-G films can be obtained at the expense of higher resistance. Sheet resistance as low as 230$\Omega\cdot\square^{-1}$ (with T=72%) and optical transparency as high as 91% (with $R_{sheet}=8.3$ k$\Omega\cdot\square^{-1}$) can be achieved, and therefore a compromise between these parameters must be met for specific applications.

Figure 22:
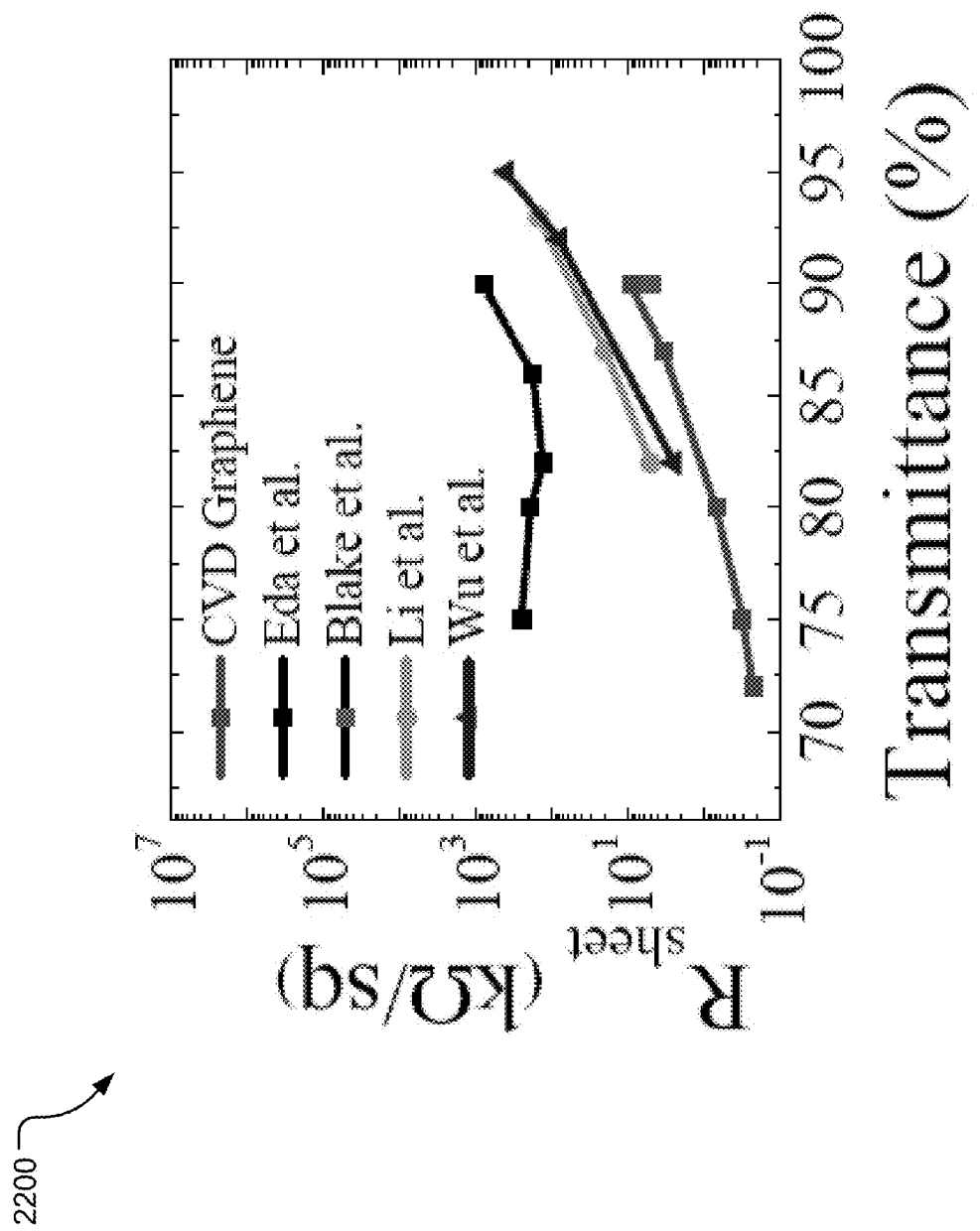
FIG. 22 shows a chart that compares $R_{sheet}$ vs. light transmittance at 550 nm for CVD-G and reduced GO films.

FIG. 22 shows a chart that compares $R_{sheet}$ vs. light transmittance at 550 nm for CVD-G and reduced GO films. Further characterization of the CVD-G films is shown, where the conductance and transparency of CVD-G are compared against reduced GO films reported in the literature. Analysis of FIG. 22 shows that CVD-G exhibits a better transparency/conductance than the reduced graphene oxide films reported so far.

Figure 23:
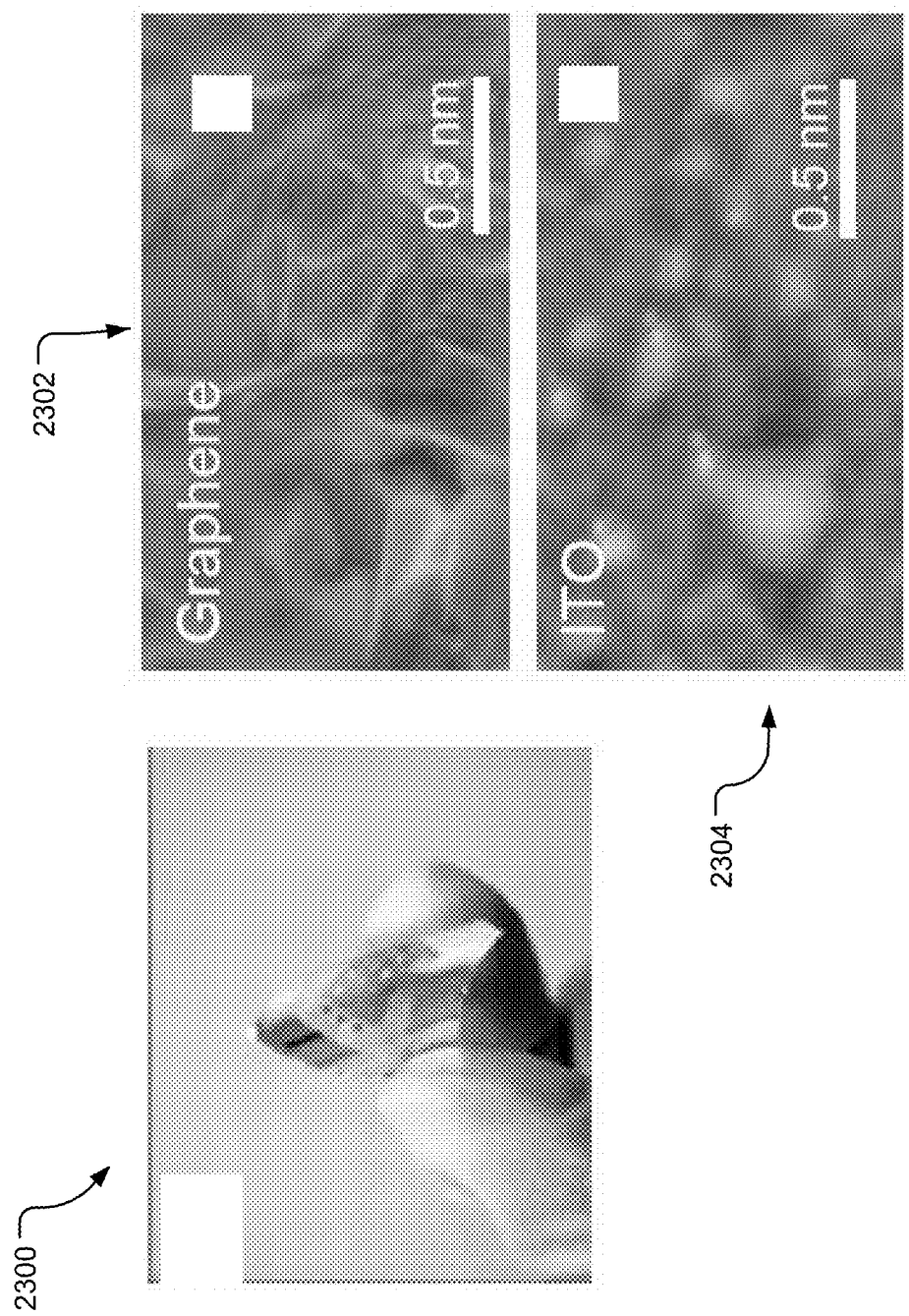
FIG. 23 shows a photograph illustrating high flexibility of CVD-G transferred on a PET flexible substrate and AFM images of the surface of CVD-G and ITO films on PET, respectively.

FIG. 23 shows a photograph illustrating high flexibility of CVD-G transferred on a PET flexible substrate (2300) and AFM images (2302 and 2304) of the surface of CVD-G and ITO films on PET, respectively. To investigate the flexibility of the CVD graphene electrodes and its influence on the performance of flexible OPV cells, CVD graphene films can be transferred onto PET substrates and compared the electrical conductivity of graphene and ITO films under bending conditions. The AFM images (2302 and 2304) are of CVD graphene ($R_{sheet}=500\ \Omega\cdot\square^{-1}$ and T=75%) and ITO ($R_{sheet}=25\ \Omega\cdot\square^{-1}$, T=86%), on PET. The r.m.s. surface roughness of ITO on PET is 1.1 nm, nearly 60% higher than on glass (see supporting information). 100-nm-thick aluminum metal contacts can be thermally deposited through a shadow mask onto the above mentioned films.

Figure 24:
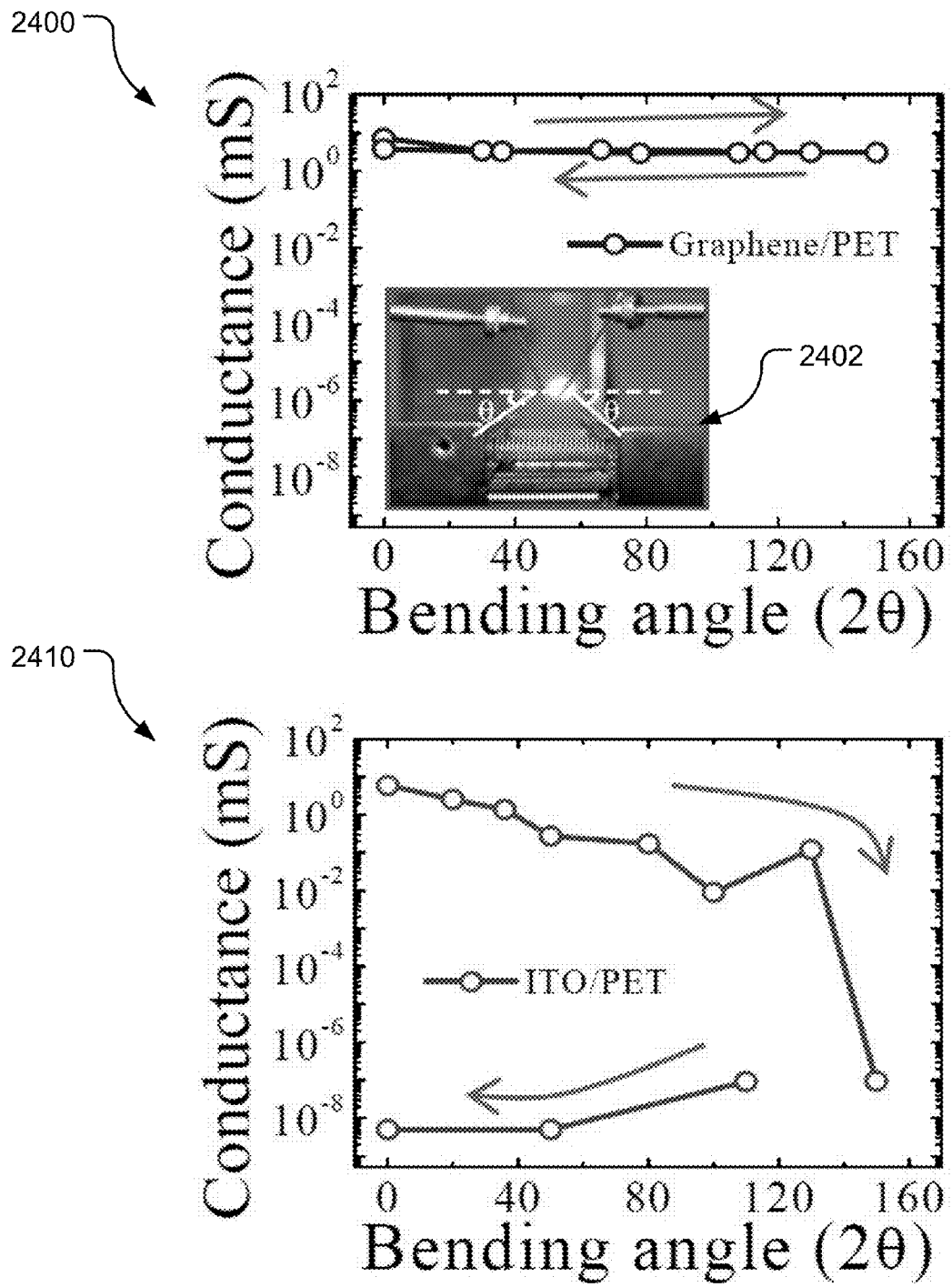
FIG. 24 shows charts of conductance of the CVD-G and ITO films on PET substrates under bending conditions.

FIG. 24 shows charts (2400 and 2410) of conductance of the CVD-G and ITO films on PET substrates under bending conditions. Two-probe electrical measurements can be performed on both films to monitor the change in conductance of the film with the bending angle (inset 2402). The charts (2400) show that the conductance of the graphene/PET film remained virtually unperturbed by bending, even after multiple complete bending cycles. In contrast, chart (2410) shows three clearly defined regions that describe the typical behavior of ITO conductance under bending conditions. For bending angles from 0° to ~130° a steady decrease in the conductance of the ITO film by three orders of magnitude with increased bending angle can be observed. Interestingly, immediately after a critical angle (128°) conductance suddenly fell by six orders of magnitude. Finally, after the critical angle is reached, the conductance of the film continued to decrease even when bending angle decreases; an open circuit ($\sigma \leq 10^{-12}$ S) is obtained after only one bending cycle. The fact that the conductivity of the ITO film did not recover after bending the ITO film back to lower radius of curvature can be associated with the development of multiple discontinuity scattering sites on the brittle ITO film that are generated by tensile strain under bending and may further develop under compressive stress while decreasing the bending angle. Optical microscopy images are collected on the ITO/PET and Graphene/PET films.

Figure 25:
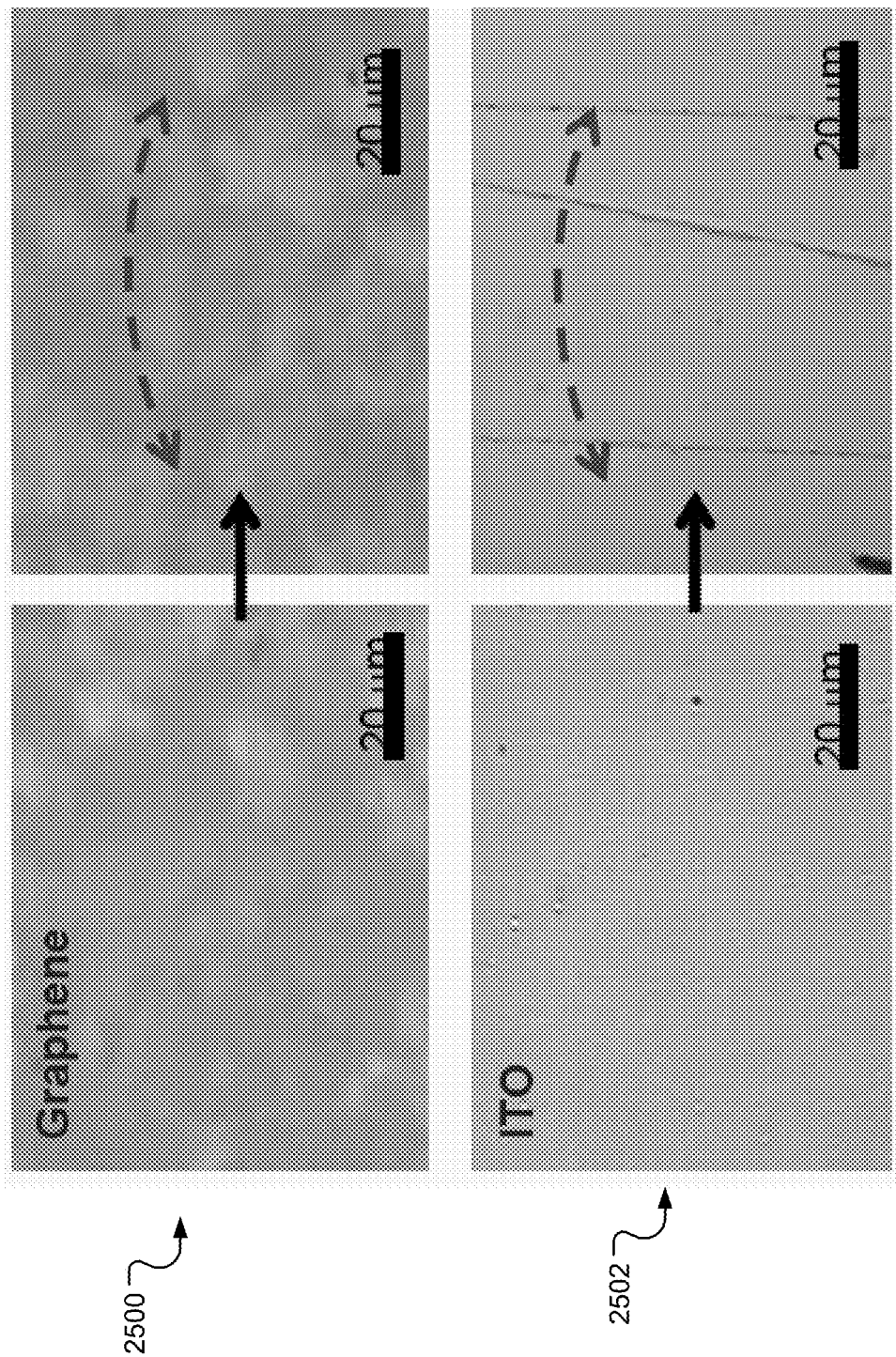
FIG. 25 shows optical images of CVD-G and ITO films on PET before and after a complete bending cycle specified in FIG. 23.

FIG. 25 shows optical images of CVD-G (2500) and ITO (2502) films on PET before and after a complete bending cycle specified in 2302 and 2304 of FIG. 23. Arrows show the direction of the bending. The optical micrographs of graphene and ITO films are shown before and after the first bending cycle (0°→150°→0°). As can be seen, under the microscope resolution, very pronounced cracks developed on the ITO film, while the graphene film remained intact. These results reveal a tremendous advantage of CVD graphene in terms of mechanical flexibility over ITO films, which opens new avenues for robust, flexible, and lightweight transparent CVD-G electrodes in OPVs.

Although CVD graphene films clearly outperform ITO as transparent conductive electrodes on flexible PET substrates under bending conditions, it may be important to implement this material into working OPVs in order to evaluate its performance. Thus, OPV cells can be fabricated on PET substrates using graphene and ITO as transparent electrodes, under identical experimental conditions. Graphene electrodes can be fabricated by transferring as-grown CVD-G films onto pre-cleaned PET substrates. PET substrates coated with ITO can be obtained from Southwall Technologies Inc. for example. Both substrates can be solvent cleaned and passivated by spin coating a thin layer (10 nm) of poly(3,4-ethylenedioxythiophene)-poly(styrenesulfonate) with $R_{sheet}=1$ k$\Omega\cdot\square^{-1}$ (PEDOT:PSS). Conductivity of CVD-G ($R_{Sheet}=2.1$ k$\Omega\cdot\square^{-1}$) film with PEDOT:PSS is found to decrease to $R_{sheet}=2.1$ k$\Omega\cdot\square^{-1}$ after PEDOT:PSS. PEDOT:PSS passivation is found to yield a superior electrical contact in ITO devices. Moreover, PEDOT:PSS can facilitate mitigating the brittle nature of the ITO electrode to enhance its performance under bending conditions. Finally, the planarizing effect afforded by the PEDOT:PSS treatment is desirable to compensate for possible folding or wrinkles that may accompany the CVD-G film transfer process or irregular wetting between the electrode and the cell active layers, which would yield device shorting or shunt losses. Additionally, OPV cells fabricated on PET/PEDOT:PSS substrates without CVD-G or ITO produced open circuit characteristics.

The substrates can be taken into high vacuum conditions where the organic thin films and the aluminum cathode are consecutively deposited by thermal evaporation. The multilayered configuration employed in FIG. 16 is given as: CVD-G [<5 nm] or ITO/PEDOT:PSS/Copper phthalocyanine (CuPc) [40 nm]/Fullerene ($C_{60}$) [40 nm]/Bathocuproine (BCP) [10 nm]/Aluminum (Al). Aluminum cathodes can be deposited through a shadow mask with circular openings of 1 $mm^2$. Optical excitation of the CuPc ($C_{60}$) can lead to the donation of an electron (hole) to $C_{60}$ (CuPc) and the photogenerated charge carriers are swept to the external contacts producing a measurable light-generated current.

Current density vs. voltage or J(V) characteristics can be measured in air at room temperature in the dark and under spectral mismatch corrected 100 mW/$cm^2$ white light illumination from an AM 1.5G filtered 300 W Xenon arc lamp (Newport Co.). Routine spectral mismatch correction for ASTM G173-03 can be performed using a filtered silicon photodiode calibrated by the National Renewable Energy Laboratory (NREL) to reduce measurement errors. Chopped monochromatic light (250 Hz, 10 nm FWHM) and lock-in detection can be used to perform all spectral responsivity and spectral mismatch correction measurements.

Figure 26:
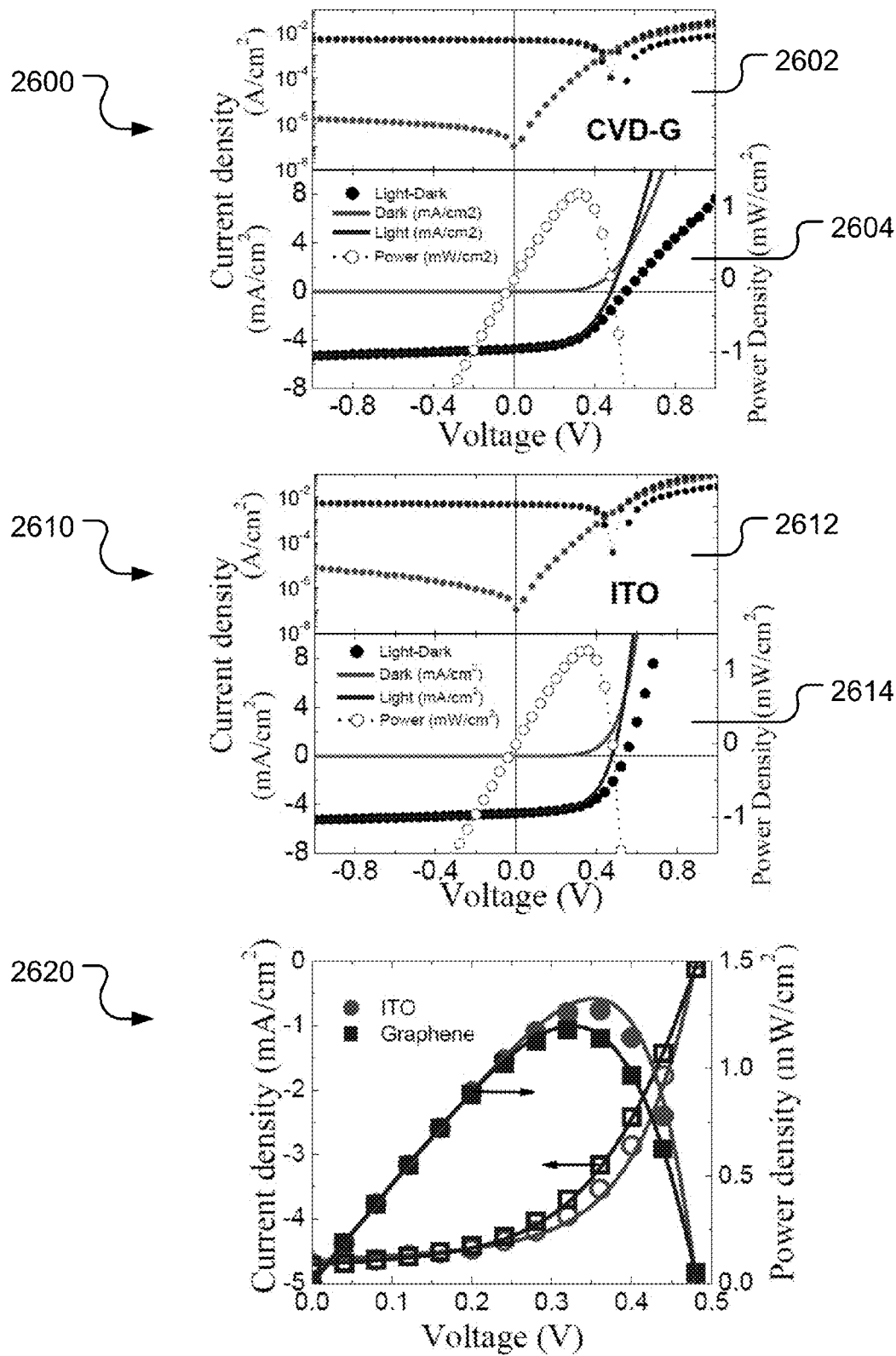
FIG. 26 shows charts of current density and power density vs. voltage characteristics of CVD-G and ITO OPV cells on PET.

FIG. 26 shows charts (2600, 2610, 2620) of current density and power density vs. voltage characteristics of CVD-G and ITO OPV cells on PET. The top chart (2600) shows a logarithmic (2602) and linear (2604) current density and power density vs. voltage characteristics of CVD-G OPV cells on PET under 100 mW/$cm^2$ AM1.5 spectral illumination. The middle chart (2610) shows a logarithmic (2612) and linear (2614) current density and power density vs. voltage characteristics of ITO OPV cells on PET under 100 mW/$cm^2$ AM1.5 spectral illumination. The bottom chart (2620) shows a comparison of the current density and power density curves of the two devices. Structure of the devices is given by [CVD-G/PEDOT/CuPc/$C_{60}$/BCP/Al] and [ITO/CuPc/$C_{60}$/BCP/Al] for CVD-G and ITO OPVs, respectively.

The J(V) characteristics of a typical photovoltaic cell obtained with CVD graphene ($R_{sheet}$: 3.5 k$\Omega \square^{-1}$, T: 89%) can be compared against a typical cell obtained with an ITO anode ($R_{sheet}$: 25 $\Omega \square^{-1}$, T: 96%), that are fabricated under identical experimental conditions. The top and middle charts (2600 and 2620) show semi-log (up) and linear (down) J(V) plots obtained from CVD-G and ITO OPV cells, respectively. It is observed that both devices have nearly identical open circuit voltage of 0.48 V under dark and illumination conditions, which suggests similar recombination behavior in both cells. Furthermore, the bottom chart (2620) shows that unlike OPVs reported for reduced GO anodes, large leakage current-densities are not observed from any of the CVD graphene OPV cells.

Based on conducted measurements, the J(V) characteristics of the CVD-G cell under illumination show a short-circuit photocurrent density ($J_{sc}$) of 4.73 mA/$cm^2$, an open-circuit voltage ($V_{oc}$) of 0.48 V and a maximum power ($P_{max}$) of 1.18 mW/$cm^2$, to yield a fill factor (FF) of 0.52 and overall power conversion efficiency ($\eta$) of 1.18%. The control device, using an ITO anode on PET, gave $J_{SC}$ of 4.69 mA/$cm^2$, $V_{oc}$ of 0.48 V and $P_{max}$ of 1.27 mW/$cm^2$, for a FF of 0.57 and an efficiency of 1.27% (see Table 1 below). The structure of the devices is given by [CVD-G/PEDOT/CuPc/C60/BCP/Al] and ITO/PEDOT/CuPc/C60/BCP/Al] for CVD-G and ITO OPVs, respectively.

TABLE 1

Performance details of OPV cells built on PET.

| Anode | Jsc (mA/$cm^2$) | V (V) | FF | $\eta$ |
|---|---|---|---|---|
| CVD Graphene | 4.73 | 0.48 | 0.52 | 1.18 |
| ITO | 4.69 | 0.48 | 0.57 | 1.27 |

Analysis of FIG. 26 reveals that despite the lower transparency and higher $R_{Sheet}$ of the CVD-G electrode, CVD-G solar cell exhibits an output power density nearly 93% of that shown by the ITO device. The fact that the two cells gave very similar device performance is encouraging, especially considering that the ITO substrate gave ~100-fold lower $R_{sheet}$ and higher transparency than the CVD-G film.

To estimate the impact of resistive losses on device performance the J(V) dependence under illumination was modeled according to a modified form of the Shockley equation given by:

$$J = J_s \left\{ \exp\left(\frac{V - JR_s}{nV_t}\right) - 1 \right\} - \frac{V - JR_s}{R_p} - J_{ph} \quad (1)$$

where $R_s$, $R_p$, $J_s$, $J_{ph}$, n, and $V_t$ are the lumped series resistance, lumped parallel resistance, reverse-bias saturation current-density, photocurrent-density, diode ideality factor, and thermal voltage respectively for a single diode circuit model. As a practical matter, the transcendental nature of Eq. 1 was resolved by expressing it in terms of the Lambert-W function to give $$J = \frac{nV_t}{R_s} W_0 \left\{ \frac{J_s R_s R_p}{nV_t(R_s + R_p)} \exp\left(\frac{R_p}{nV_t} \frac{V + R_s(J_{ph} + J_s)}{(R_s + R_p)}\right) \right\} - \frac{R_p(J_{ph} + J_s) - V}{(R_s + R_p)} \quad (2)$$

where $W_0$, represents Lambert's function of the form W(x) $e^{W(x)}$=x(V). The solid lines in the bottom chart 2620 represent the modeled J(V) and output power density according to Eq. 2. The model ideality factors, parallel resistances and saturation current-densities were all comparable for the ITO and CVD-G devices under illumination having values of n=2.4 and 2.6, $R_p$=1.47 k$\Omega cm^2$ and 1.62 k$\Omega cm^2$, and $J_s$=2.0 µAcm$^{-2}$ and 3.1 µAcm$^{-2}$, respectively. The model series resistance calculated from Eq. 2 for the CVD-G device is 12.6 $\Omega cm^2$, which is roughly 5 times higher than that of the ITO device with $R_{sheet}$=2.6 $\Omega cm^2$. This constitutes a very promising result for CVD-G transparent electrodes, which perform comparably to ITO, despite carrying a relatively higher sheet resistance.

Figure 27:
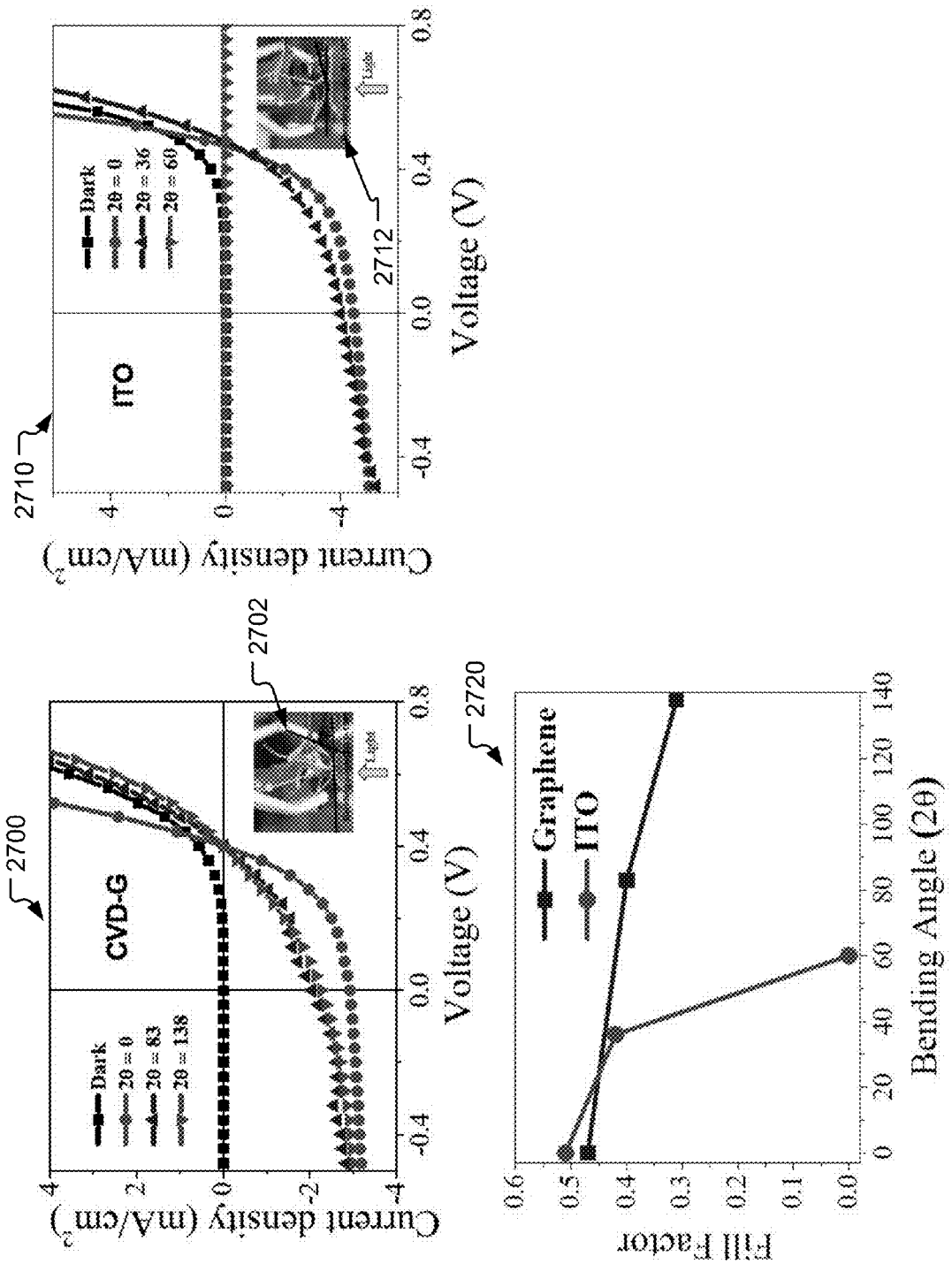
FIG. 27 shows charts that illustrate the performance of CVD-G and ITO devices under various bending conditions.

Given the good performance of OPVs with graphene electrodes, the devices can be tested under strain-stress conditions. FIG. 27 shows charts that illustrate the performance of CVD-G and ITO devices under various bending conditions. The top left chart (2700) shows the current density vs. voltage characteristics of CVD-G photovoltaic cells under 100 mW/$cm^2$ AM1.5 spectral illumination for different bending angles. The top right chart (2710) shows the current density vs. voltage characteristics of CVD-G photovoltaic cells under 100 mW/cm² AM1.5 spectral illumination for different bending angles. Insets (2702 and 2712) show the experimental set up employed in the experiments.

Based on conducted measurements, the performance of both devices degrades slightly upon bending. For instance, solar cells using CVD-G electrodes withstood bending angles up to 138° while exhibiting good solar cell performance. In sharp contrast, ITO cells only withstood bending to 36° while showing poor performance, and failed completely to become an open circuit after being bent to 60°.

It is important to note that, with increased bending angle, the current density dropped for CVD-G and ITO devices, while their open circuit voltage remained virtually unchanged. In some cases this effect can be associated with decreased illumination of the devices during bending. However, as both cells are subjected to similar bending conditions, the marked difference exhibited in the conversion efficiency between them cannot be attributed to irregular illumination induced by bending, but may be related to the presence of micro cracks on the ITO device.

To further investigate this, the fill factor vs. the bending angle of the OPV cells are plotted with CVD-G and ITO electrodes in the lower left chart (2720). The fill factor ($FF=P_{max}/J_{sc}V_{oc}$) depends strongly on the output power of the cell, and is directly related to the cell conversion efficiency ($\eta$) by:

$$\eta = FF \frac{J_{sc}V_{oc}}{E_{total}} \times 100, \qquad (3)$$

where $E_{total}$ is the total irradiance. Gradual degradation of the initial fill factor, and hence, the conversion efficiency was observed on the CVD graphene cell as the bending angle increased; in contrast, the fill factor of the ITO device rapidly decayed to zero when bent at around 60°. Furthermore, SEM measurements can be performed to investigate changes in film morphology that may have been introduced by bending of the devices.

Figure 28:
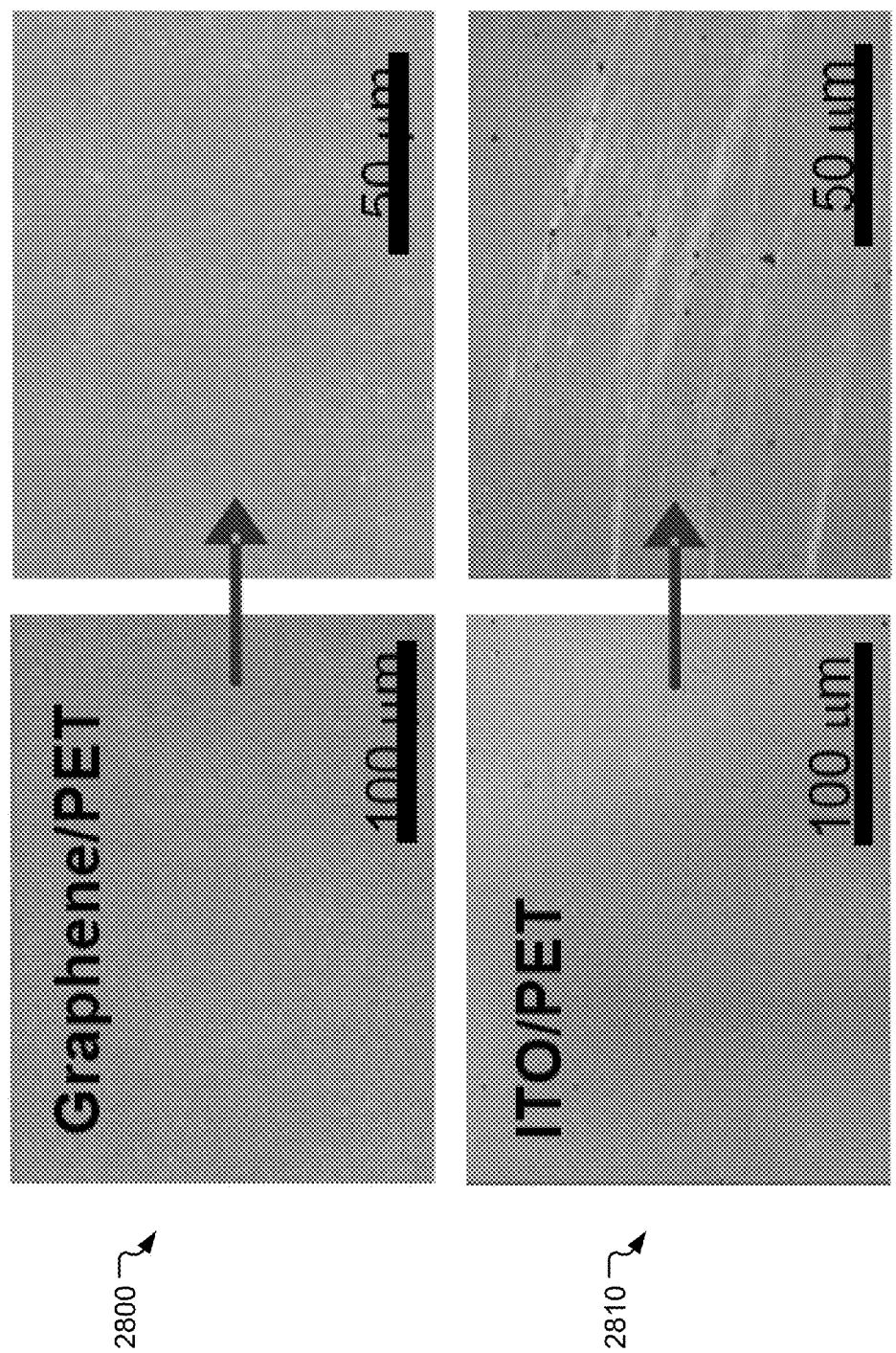
FIG. 28 shows SEM images showing the surface morphology of CVD-G and ITO photovoltaic cells after being subjected to the bending angles described in charts and in FIG. 27, respectively.

FIG. 28 shows SEM images showing the surface morphology of CVD-G (2800) and ITO (2810) photovoltaic cells after being subjected to the bending angles described in charts (2700) and (2710) in FIG. 27, respectively. The SEM images show the appearance of micro-cracks throughout the ITO device, while no signs of micro-cracks or fissures were observed on the graphene device. Development of micro-cracks generated by mechanical stress in ITO, even at small bending angles, can substantially increase the film resistance, which has a key impact in reducing the fill factor. This agrees well with the observed decrease in output current density and power conversion efficiency of the solar cells without observing appreciable change in the $V_{oc}$. Therefore, the brittle nature of ITO can play a major role in the resulting poor performance of ITO-flexible organic solar cells, while the CVD-graphene thin films exhibited good performance as flexible transparent electrodes. In addition, OPVs based on CVD-G transferred to glass were also made, and details can be found in the supplementary information.

X-Ray Diffraction of High-Temperature Annealed Ni Film.

X-ray diffraction spectra can be collected on the annealed Ni substrates over which graphene films are synthesized. To this end, elemental Ni can be thermally evaporated onto pre-cleaned Si/SiO₂ substrates up to a thickness of ~1000 Å. Subsequently, Ni/Si/SiO₂ substrates can be taken into a sealed high-temperature furnace and heated to 900° C. under a hydrogen flow rate of 600 sccm. A Rigaku x-ray diffractometer equipped with a 12 kW rotating anode x-ray generator can be employed to investigate the distribution of crystalline planes on the annealed polycrystalline Ni.

Figure 29:
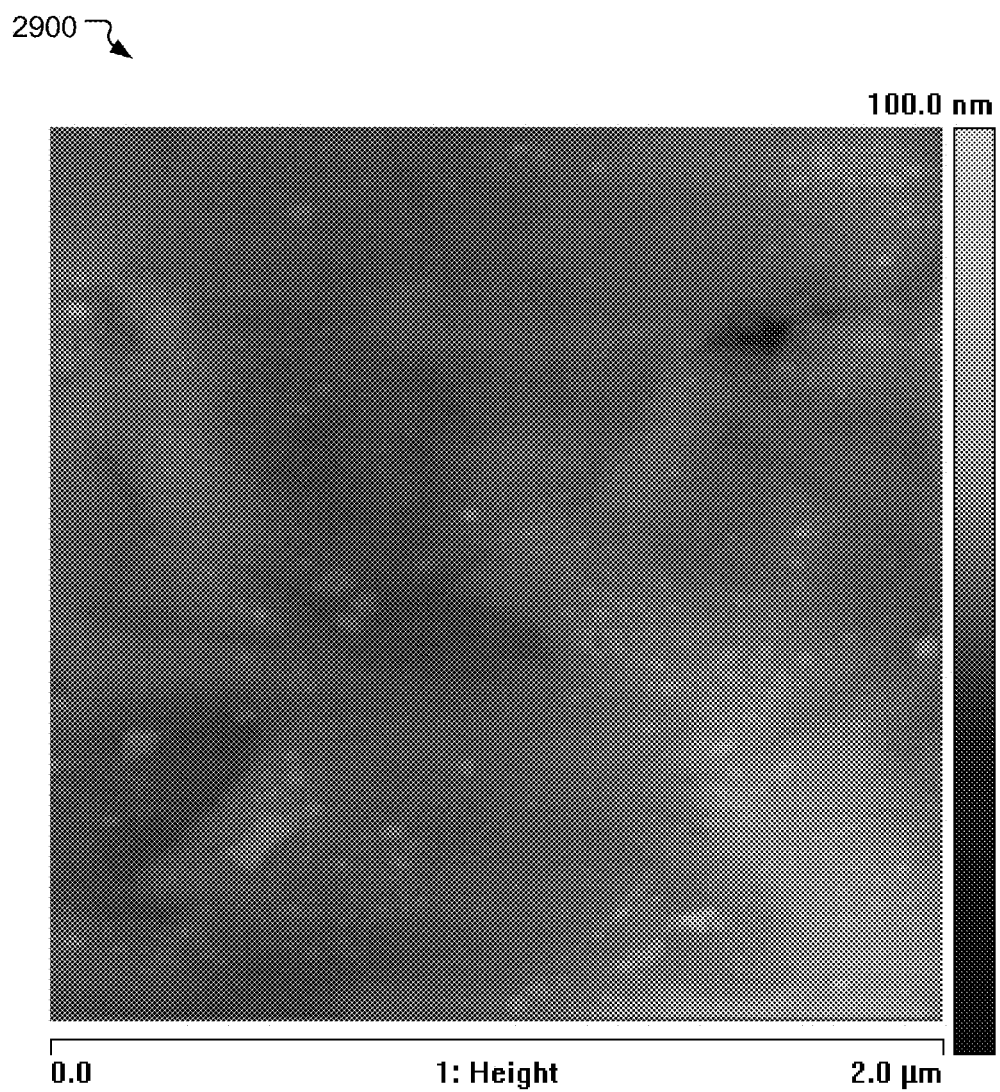
FIG. 29 shows an AFM image of a typical annealed Ni surface.

FIG. 29 shows an AFM image (2900) of a typical annealed Ni surface. The AFM image is of a 300 nm Ni film deposited on Si/SiO₂ substrate after high temperature annealing. Irregular and faceted-shape surface are consistent with polycrystalline formation.

Figure 30:
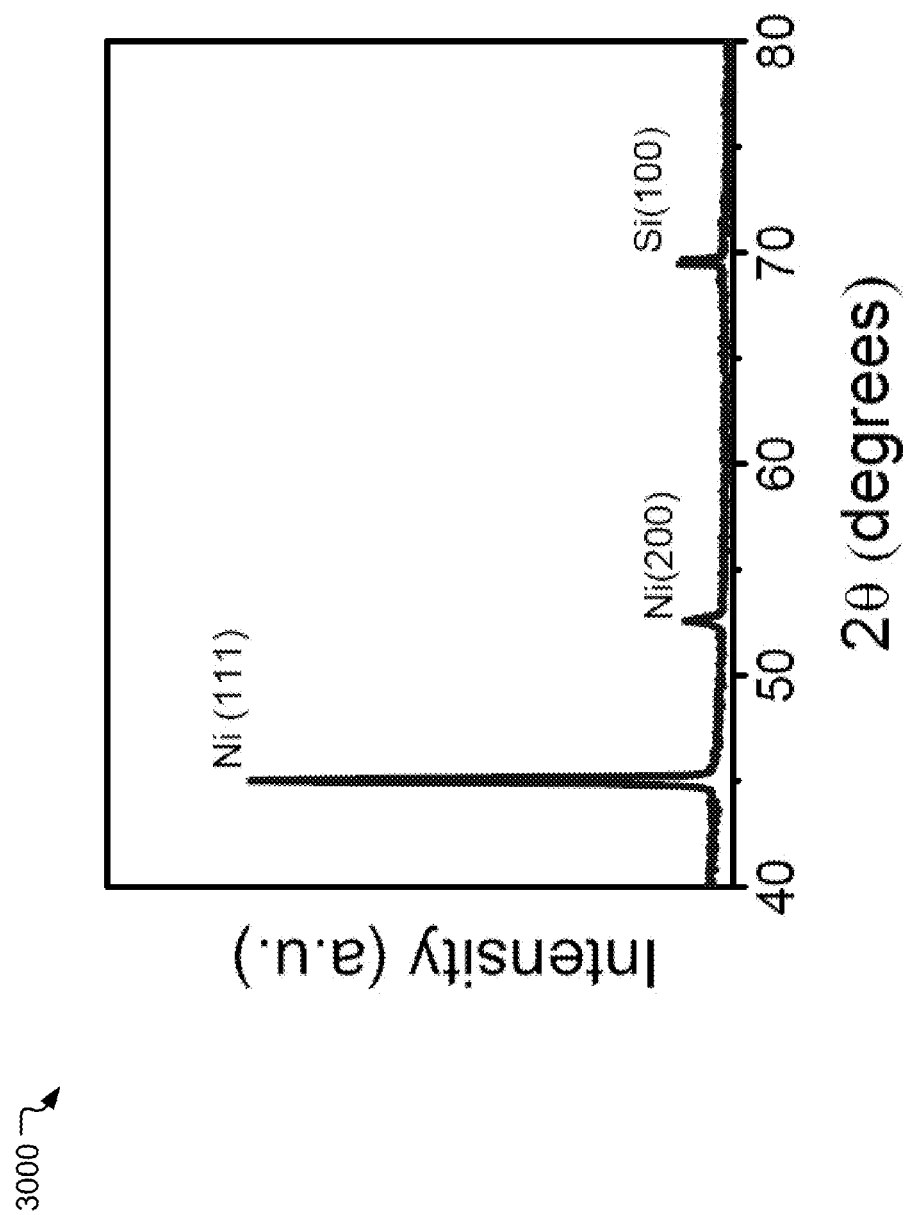
FIG. 30 shows a typical X-ray diffraction spectrum of annealed Ni film.

FIG. 30 shows a typical X-ray diffraction spectrum of annealed Ni film. The X-ray diffraction spectrum shown reveals the presence of (111) and (200) planes. Furthermore, it is clear that the surface of annealed Ni film is comprised predominantly by the (111) plane.

TEM, SAED and Raman of CVD-G.

Figure 31:
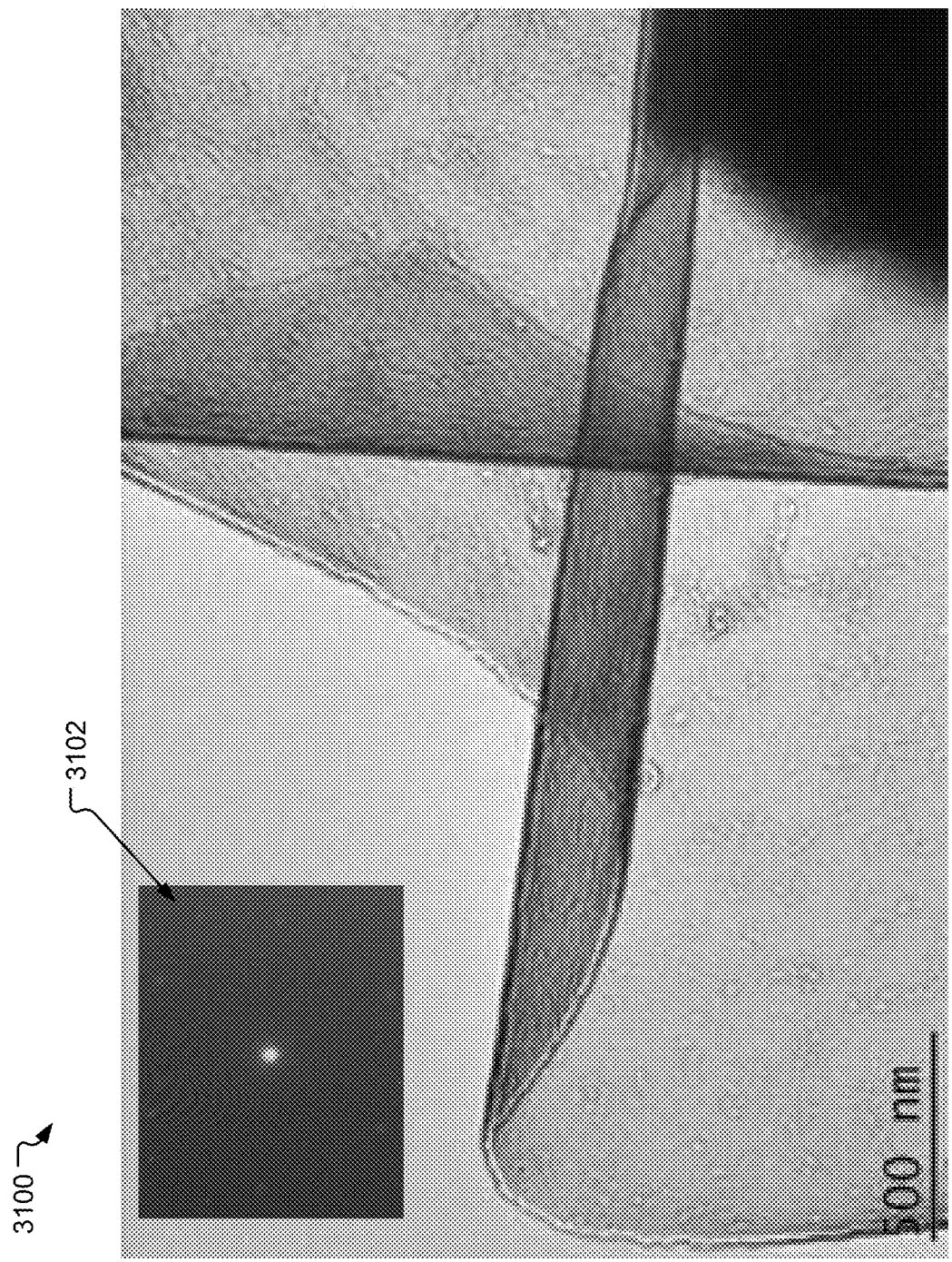
FIG. 31 shows a low magnification TEM image of CVD-G films.
Figure 32:
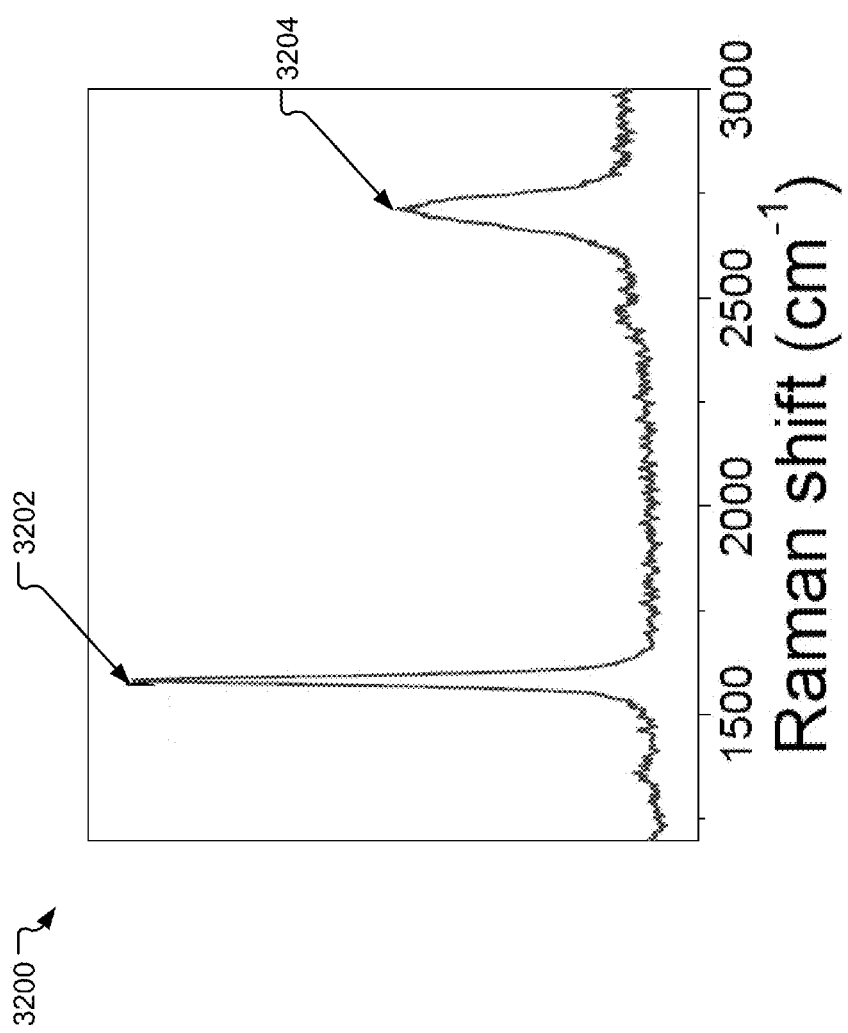
FIG. 32 shows the Raman spectrum corresponding to the sample analyzed in FIG. 31.

Free-standing PMMA/CVD-G can be obtained by etching the underlying polycrystalline Ni surface with aqueous nitric acid solution. Consecutively, acetone can be used to dissolve the PMMA layer and allow the deposition of clean CVD-G films on standard grids for TEM analysis. FIG. 31 shows a low magnification TEM image (3100) of CVD-G films. Inset (3102) shows a selected area electron diffraction (SAED) pattern of the few-layer graphene film. However, the selected area diffraction pattern along the z-direction shows well ordered typical graphite lattice structure. Further spectroscopic evidence can be obtained by micro-Raman FIG. 32 shows the Raman spectrum (3200) corresponding to the sample analyzed in FIG. 31. The observed G-band centered at 1581 cm⁻¹ (3202) is characteristic of the C-C stretching in the sp² structure of graphene. Another band of interest, the G'-band that appears at 2697 cm⁻¹ (3204), presents a fairly symmetric lineshape that suggests the films are comprised of few layers of graphene (1-5 layers). The very low D-band intensity at 1354 cm⁻¹ with respect to the intensity of the G-band, indicates a low defect density in the transferred CVD-G.

Atomic Force Microscopy of CVD-G, ITO and SWNT Films.

In general, CVD-G obtained under the experimental conditions described here contains 1-5 graphene layers. To further test this point, height profile measurements can be performed on the transferred films. Cross section analysis of AFM images taken on transferred CVD-G on glass substrates allows a quantitative estimate of the film thickness.

Figure 33:
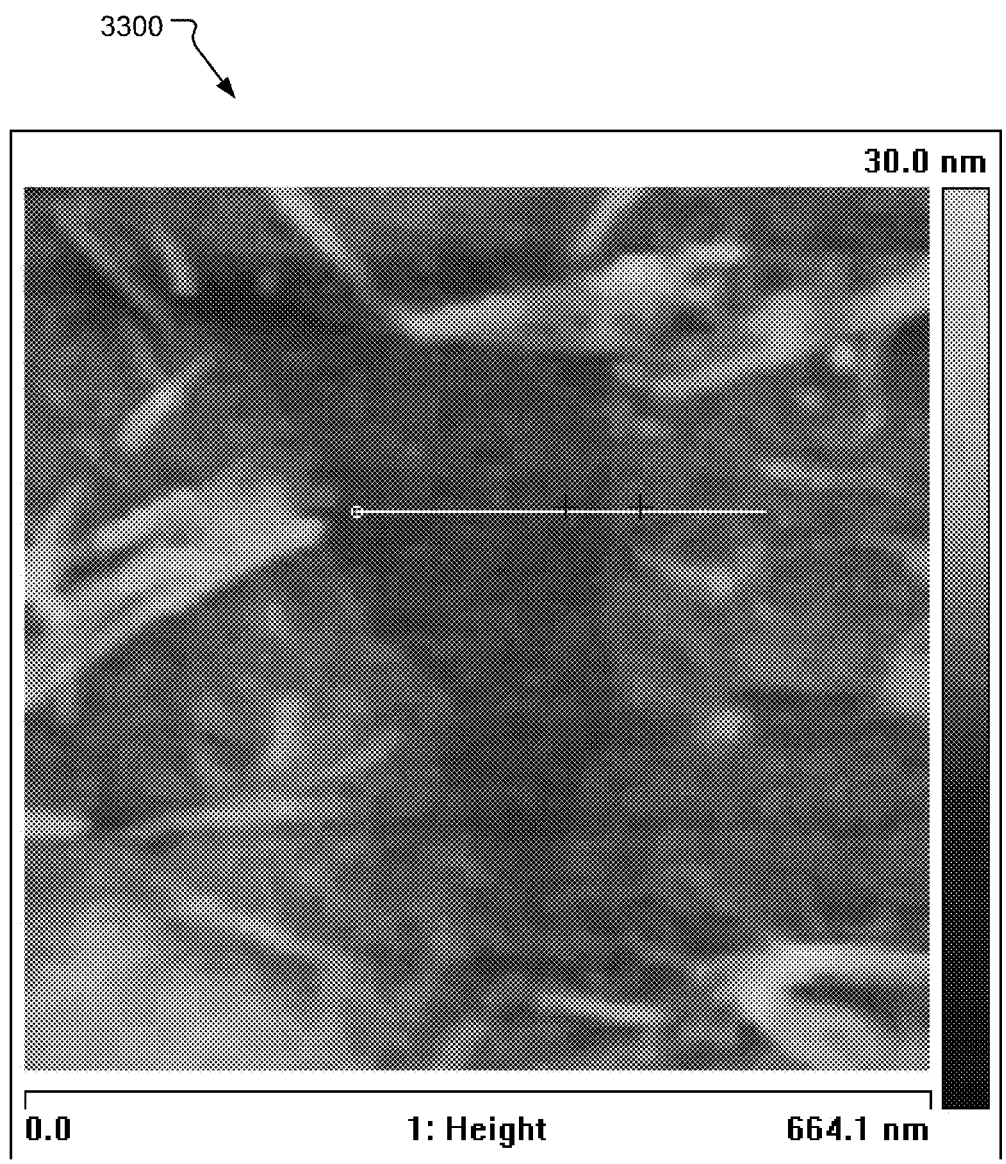
FIG. 33 shows an AFM image of a transferred CVD-G film onto glass substrate.
Figure 34:
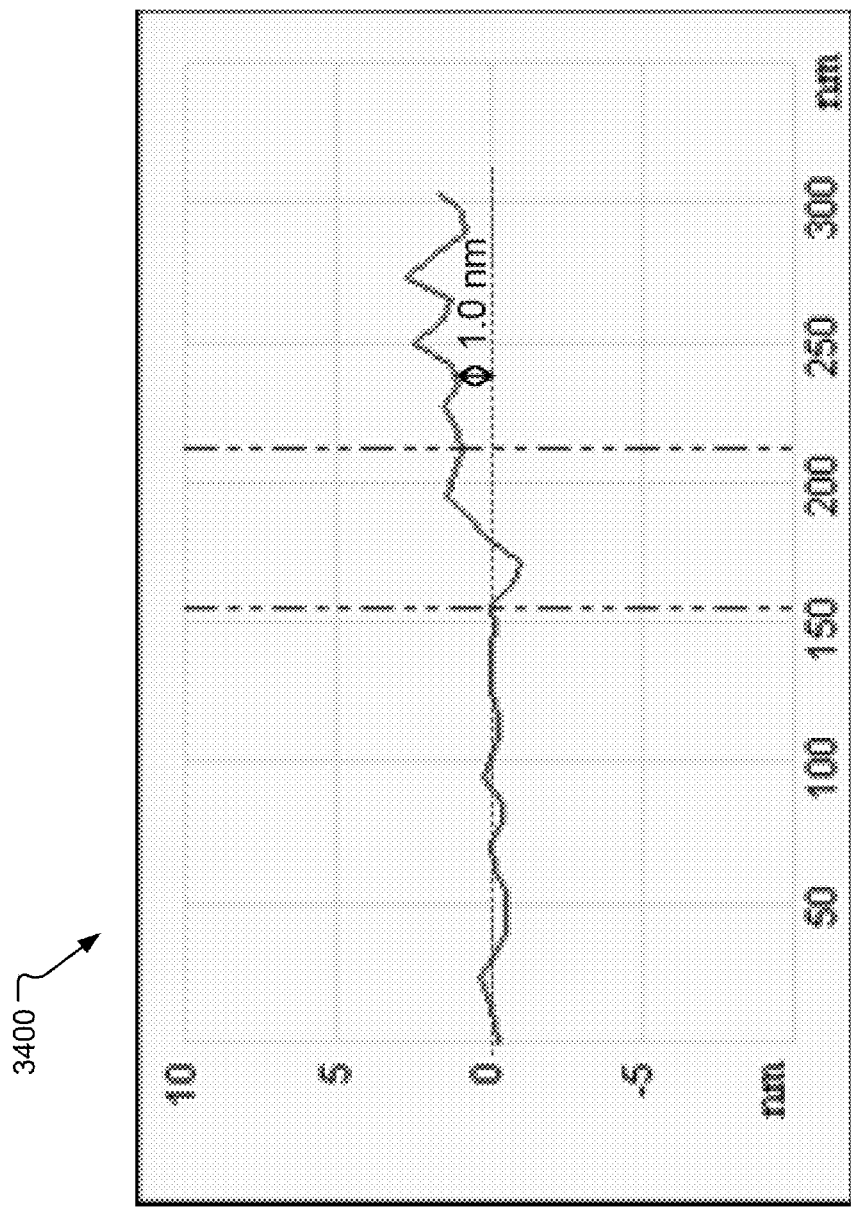
FIG. 34 shows a chart showing a cross section measurement of the height of the CVD-G.

FIG. 33 shows an AFM image (3300) of a transferred CVD-G film onto glass substrate. The AFM image of an opening in the graphene film has clear edges. FIG. 34 shows a chart (3400) showing a cross section measurement of the height of the CVD-G. Typical thickness exhibited by the transferred films is found within the range 1-3 nm. The height profile shown in FIG. 34 is along the straight line depicted in FIG. 33. A height step of ~1 nm can be clearly observed between the substrate surface and the graphene film. Larger vertical distances can be found between the substrate surface and the CVD-G edge step as well. However, due to irregularities on Ni surface, and as transferred graphene films may suffer from bending, folding and mechanical stress, they may not be lying fully extended and flattened on the receiving substrate. Thus, the lowest vertical distance within the profile edge steps can be regarded as a good estimate of the film thickness. In this case, a thickness of ~1 nm indicates the CVD-G can be as thin as bilayer graphene.

Figure 35:
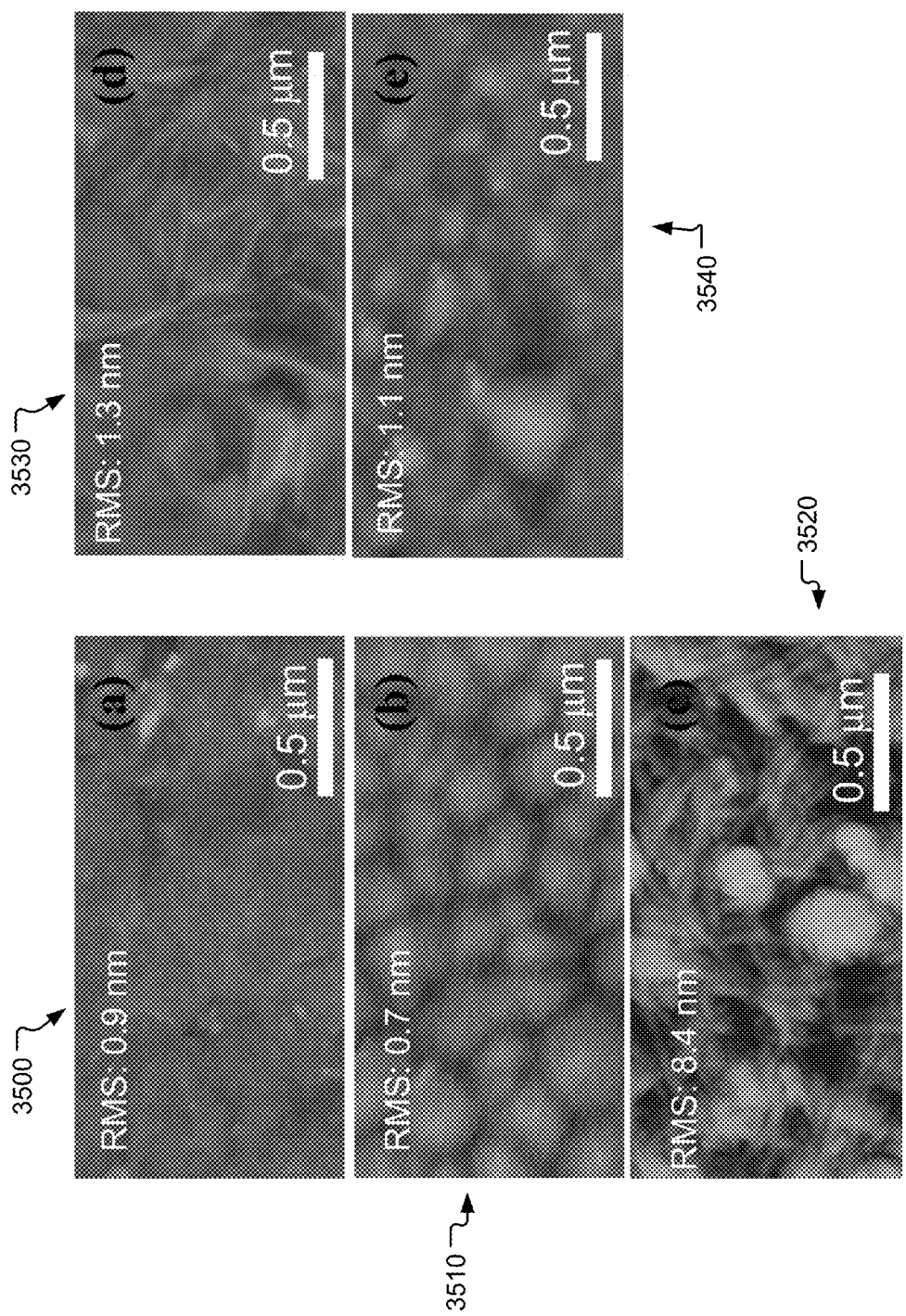
FIG. 35 shows AFM images from which r.m.s. surface roughness values can be obtained for CVD-G, ITO and SWNTs on different substrates.

One important parameter of CVD-G as transparent conductive electrode in photovoltaic devices is its surface smoothness. FIG. 35 shows AFM images (3500, 3510, 3520, 3530 and 3540) from which r.m.s. surface roughness values can be obtained for CVD-G, ITO and SWNTs on different substrates. The AFM images (3500, 3510 and 3520) depict the r.m.s. surface roughness of typical CVD-G, ITO, and SWNT films on glass substrates used as electrodes, respectively. AFM images (3530 and 3540) show r.m.s. surface roughness of CVD-G and ITO films on PET flexible substrates, respectively. All images have the same scale in the z-direction.

Surprisingly, CVD-G has the ability to form continuous films over large areas while maintaining an outstanding smoothness. Such smoothness is substantially higher than that of a percolating nanotube network and similar to that of ITO on glass and PET substrates.

CVD Graphene Organic Photovoltaic Cells on Rigid Substrates

Figure 36:
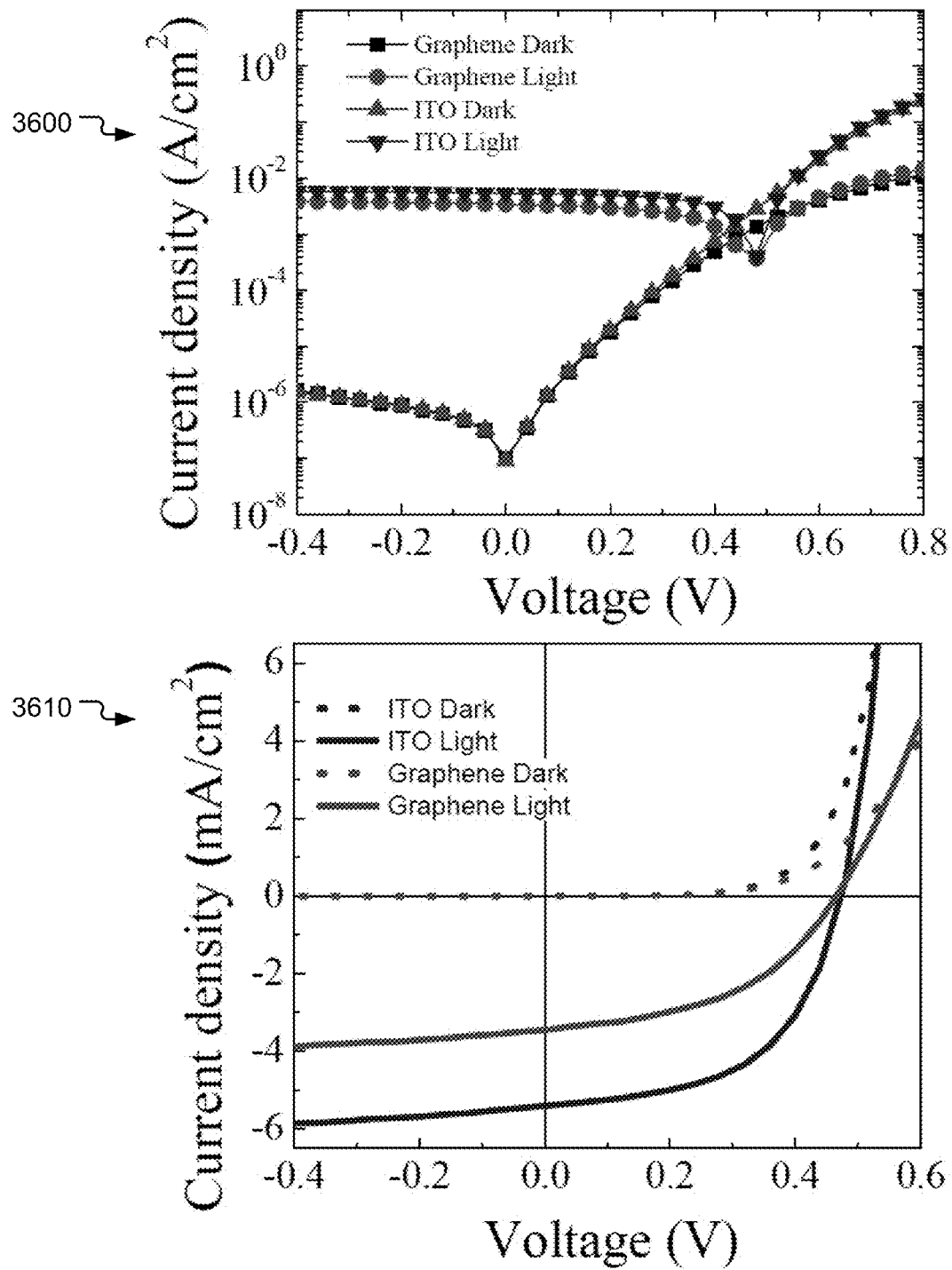
FIG. 36 shows a logarithmic (3600) and linear (3610) current density vs voltage characteristics of CVD-G and ITO photovoltaic cells on glass under 100 mW/cm$^2$ AM1.5 spectral illumination.

Solar cells can be fabricated on CVD-G films transferred on glass ($R_{Sheet}$: 1.2 T: 82% at 550 nm) and glass substrates coated with ITO (Thickness: 150 nm, $R_{sheet}$: 20 $\Omega\square^{-1}$, T: 84% at 550 nm). J(V) characteristics of the fabricated devices can be plotted in semi-log (see chart 3600) and linear (see chart 3610) scale for both devices as shown in FIG. 36. FIG. 36 shows a logarithmic (3600) and linear (3610) current density vs voltage characteristics of CVD-G and ITO photovoltaic cells on glass under 100 mW/cm² AM1.5 spectral illumination. Structure of the devices is given by [CVD-G/PEDOT/CuPc/C$_{60}$/BCP/Al] and [ITO/CuPc/C$_{60}$/BCP/Al] for CVD-G and ITO OPVs, respectively.

Again, CVD-G solar cells on rigid transparent substrate show distinct diode behavior with little leakage current at reverse bias in the dark, while exhibiting high dark current under forward bias. Under illumination, the ITO device gives $J_{sc}$ of 5.41 mA/cm², $V_{oc}$ of 0.47 V, FF of 0.54 and power conversion efficiency ($\eta$) of 1.39%. On the other hand, the CVD graphene device exhibited $J_{sc}$ of 3.45 mA/cm², $V_{oc}$ of 0.47 V, FF of 0.47 and ($\eta$) of 0.75%.

Comparison of these devices shows that even though conversion efficiency of the CVD-G device is lower, the overall performance of the CVD-G photovoltaic cell is competitive, with FF comparable to that of the control ITO device. Higher transparency of the ITO film may lead to a higher exciton generation rate, which in turn is reflected in higher $J_{sc}$ values. However, smoothness and thickness of the graphene film may favor charge injection and transport. The disparate power conversion efficiency observed between the two cells can be attributed to the higher sheet resistance and lower transparency of the graphene electrode in the G-OPV.

Table 2 summarizes representative solar cell performance parameters measured for the CVD graphene and ITO cells as well as reduced GO devices reported in the literature. The structure of the devices is given by [CVD-G/PEDOT/CuPc/C60/BCP/Al] and [ITO/CuPc/C60/BCP/Al] for CVD-G and ITO OPVs, respectively. Clearly, CVD graphene in all cases, on rigid or flexible substrates, compares favorably against reduced GO as transparent anode in OPV cells.

| Anode | Jsc (mA cm⁻²) | Voc | FF | % η |
|---|---|---|---|---|
| CVD Graphene | 3.45 | 0.47 | 0.47 | 0.75 |
| ITO | 5.41 | 0.47 | 0.54 | 1.39 |
| Red. GO (Wu et al.) | 2.10 | 0.48 | 0.34 | 0.40 |
| Red. GO (Wang et al.) | 1.00 | 0.70 | 0.36 | 0.26 |

Model Parameter Extraction for CVD-G and ITO Based OPVs.

The Shockley equation is given by:

$$J = J_s \left\{ \exp\left(\frac{V - JR_s}{nV_t}\right) - 1 \right\} - \frac{V - JR_s}{R_p} - J_{ph} \quad (4)$$

where $R_s$, $R_p$, $J_s$, $J_{ph}$, n, and $V_t$ are the lumped series resistance, lumped parallel resistance, reverse-bias saturation current-density, photocurrent-density, diode ideality factor, and thermal voltage respectively for a single diode circuit model. The transcendental nature of Eq. 4 limits optimization of the model parameters. Recently, it has been shown that an explicit solution may be obtained using the Lambert-W function. Rearranging Eq. 4 gives $$\left(J + \frac{(J_{ph} + J_s)R_p - V}{R_p + R_s}\right) \exp\left[\frac{R_s}{nV_t}\left(J - \frac{V}{R_p + R_s}\right)\right] = \quad (5)$$

$$\frac{J_s R_p}{R_p + R_s} \exp\left(\frac{R_p}{nV_t} \frac{V}{R_p + R_s}\right).$$

After multiply both sides of Eq 4 by $R_s/nV_t \exp(\alpha/\beta)$, where $\alpha = (J_{ph} + J_s)R_s R_p$ and $\beta = nV_t(R_s + R_p)$, we define the quantities $$w \equiv \frac{R_s}{nV_t}\left(J + \frac{(J_{ph} + J_s)R_p - V}{R_p + R_s}\right) \quad (6)$$

and $$x \equiv \frac{R_s}{nV_t} \frac{R_p}{R_p + R_s} J_s \exp\left[\frac{R_p}{nV_t} \frac{V + (J_{ph} + J_s)R_s}{R_p + R_s}\right]. \quad (7)$$

Since $w = W_0(x)$ and $W(x)e^{W(x)} = x(V)$, substituting and solving for J gives $$J = \frac{nV_t}{R_s} W_0 \left\{ \frac{J_s R_s R_p}{nV_t(R_s + R_p)} \exp\left[\frac{R_p}{nV_t} \frac{V + (J_{ph} + J_s)R_s}{(R_s + R_p)}\right] \right\} - \quad (8)$$

$$\frac{(J_{ph} + J_s)R_p - V}{(R_s + R_p)},$$

which expresses the measured current-density dependence on applied voltage in terms of the model parameters for a single diode equivalent circuit model. The ProductLog[z] implementation of the Lambert-W function in Mathematica 5.1 was used to perform nonlinear regression according to Eq. 8 to obtain the model parameters for CVD-G and ITO based OPV devices on PET substrates.

Conductance Vs. Bending Cycles of Flexible CVD-G Films.

Figure 37:
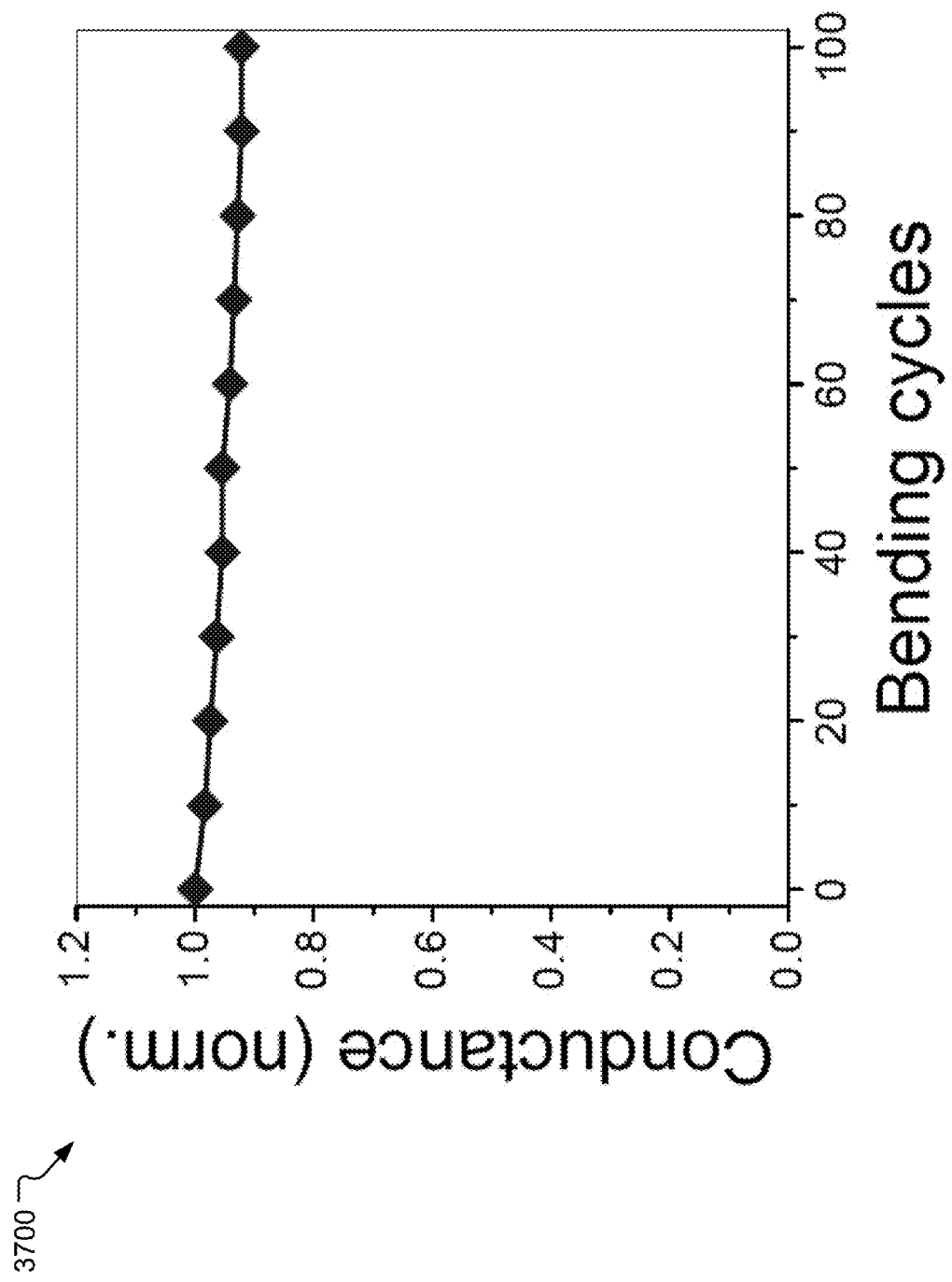
FIG. 37 shows a chart of the change in conductance vs. number of bending cycles for a CVD-G film on PET substrate.

Further evaluation of the flexibility of the synthesized CVD-G films can be conducted by transferring CVD-G films to transparent and flexible polyethylene therephthalate (PET) substrates. FIG. 37 shows a chart (3700) of the change in conductance vs. number of bending cycles for a CVD-G film on PET substrate. The conductance values have been normalized with respect to the conductance exhibited by the film before bending.

After CVD-G transfer to PET substrates, Palladium (Pd) electrodes can be deposited by e-beam evaporation through a shadow mask. Two terminal measurements can be used to monitor the change in conductance of the flexible CVD-G film with the number of bending cycles)(0°→150°→0°). The chart (3700) in FIG. 37 shows the normalized conductance vs. the number of bending cycles. After 100 bending cycles, the conductance of the CVD-G film decayed by only 7.9%. In other words, up to 92.1% of the conductance is retained.

This result shows excellent performance of a flexible, conducting film with potential use as transparent electrode in OPV cells; especially when considering that the ITO film on PET lost electrical conductance after 1 bending cycle. In conducted tests, cracks and fissures were developed on the Pd electrodes as a result of bending. It is possible that the observed drop in conductance with bending for the CVD-G film is in part due to the discontinuity of the metallic electrodes; and the decrease in conductance upon 100 bending cycles for the pristine CVD-G film may be even lower than 7.9%.

Process for Synthesis of a Monolayer or Few-Layers of Graphene

Figure 38:
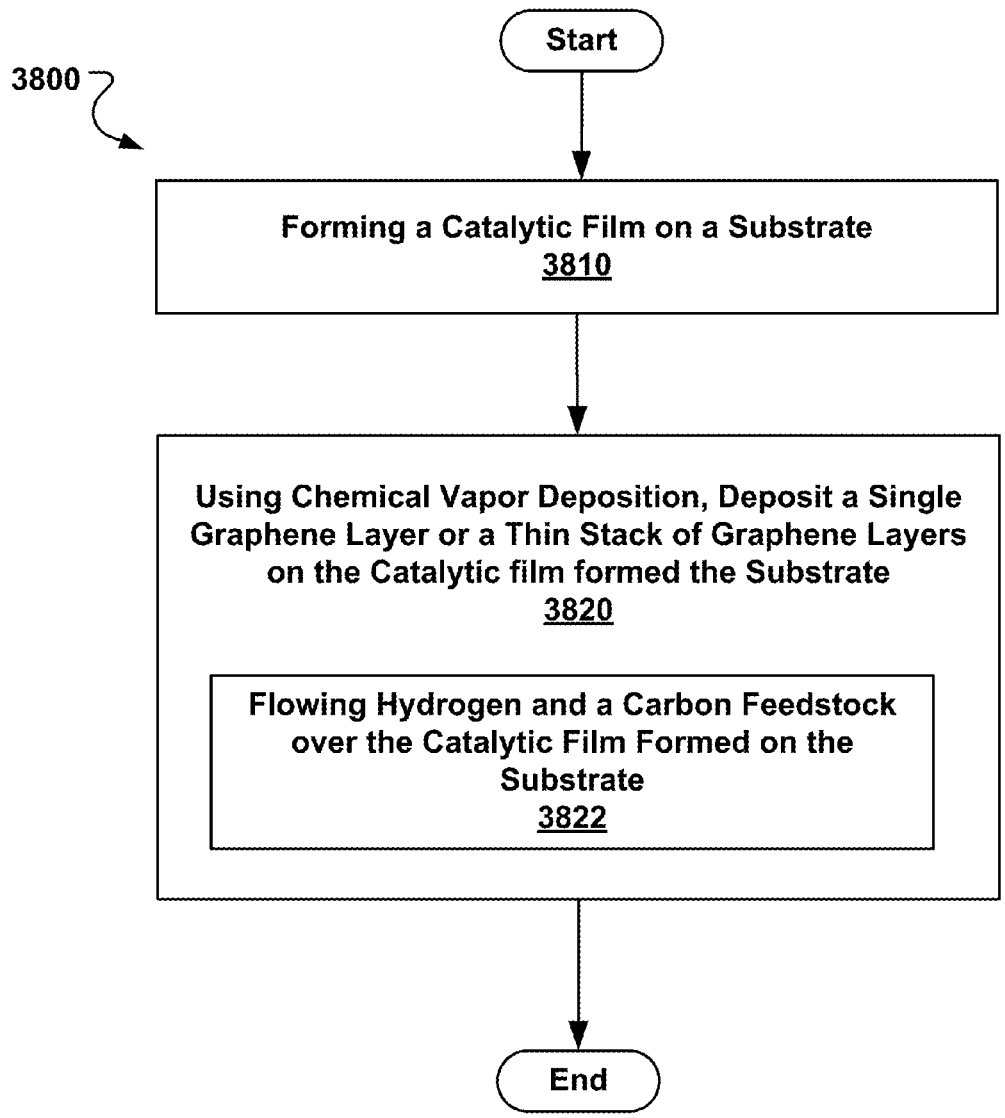
FIG. 38 is a process flow diagram describing a process for synthesizing a wafer scale graphene.

FIG. 38 is a process flow diagram describing a process (3800) for synthesizing a wafer scale graphene. A catalytic film can be formed on a substrate (3810). Using chemical vapor deposition, one graphene layer or a think stack of graphene layers (e.g., no more than twenty layers of graphene can be deposited on the catalytic film formed on the substrate (3820).

Figure 39:
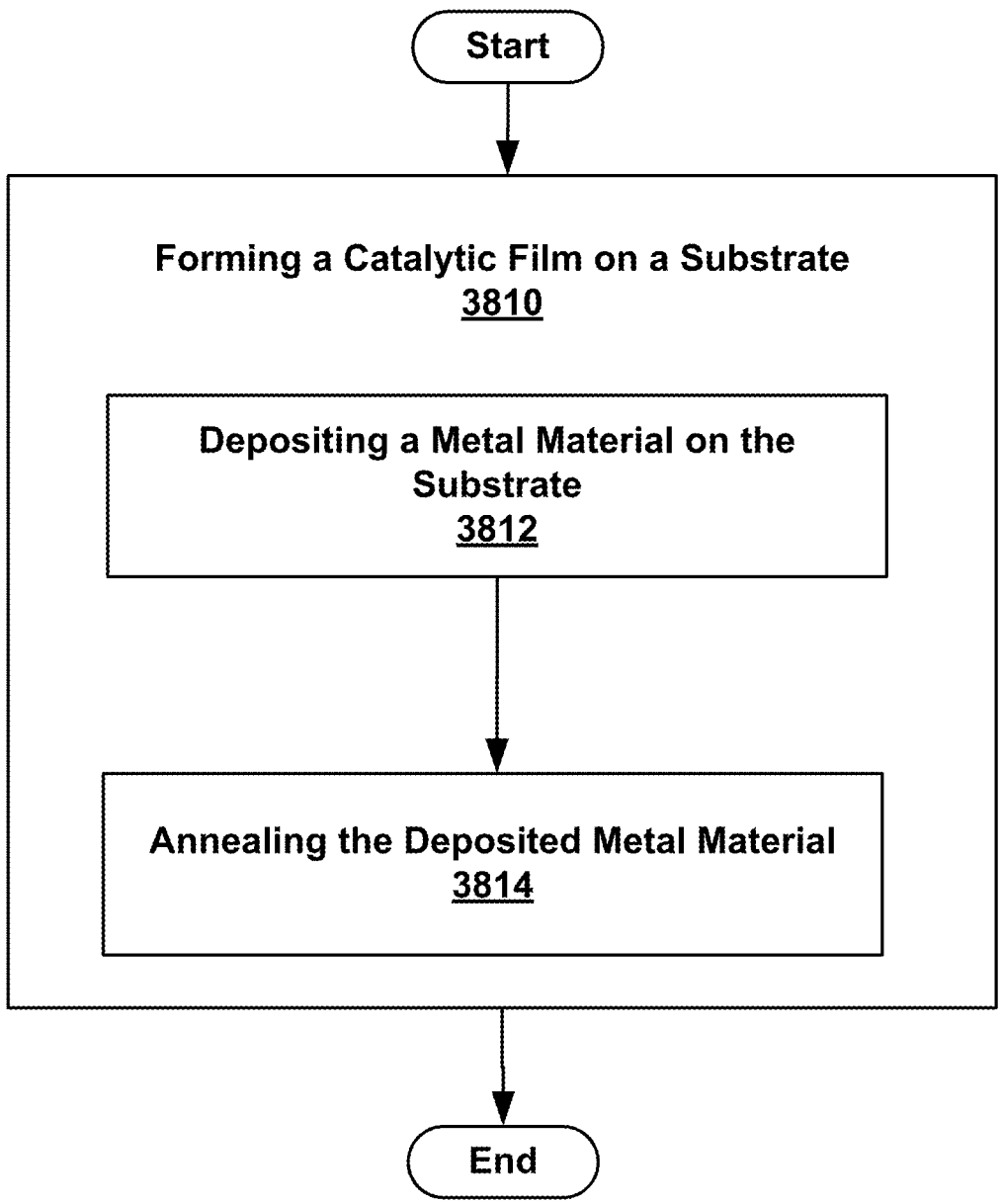
FIG. 39 is a process flow diagram showing a process for depositing the elemental metal material on the substrate.

FIG. 39 is a process flow diagram showing a process for forming the catalytic film on the substrate. Forming the catalytic film on the substrate (3810) can include depositing a metal material on the substrate (3812). For example, e-beam evaporation can be used. Also, forming the catalytic film on the substrate can include annealing the deposited metal material (3814). For example, the metal material can be annealed in a mixture of argon and hydrogen. Annealing deposited metal material can include heating and cooling the films at a predetermined rate. The method can include using the chemical vapor deposition at ambient pressure by varying at least one of temperature, gas composition, gas flow rate or deposition time. Using the chemical vapor deposition to deposit of the graphene on the catalytic film formed the substrate can include flowing hydrogen and a carbon feedstock over the catalytic film formed on the substrate to synthesize the graphene (3822). The carbon feedstock can include low molar hydrocarbons. The low molar hydrocarbons can include at least one of diluted methane, ethylene, acetylene, ethanol, or isopropanol. The catalytic film can include a metallic catalyst material. The metal material can include at least one of nickel, cobalt, iron, molybdenum, silver, gold, copper, palladium, platinum, iridium, manganese and lead. The catalytic metal film can be a polycrystalline metal film or a single crystalline metal film.

Figure 40:
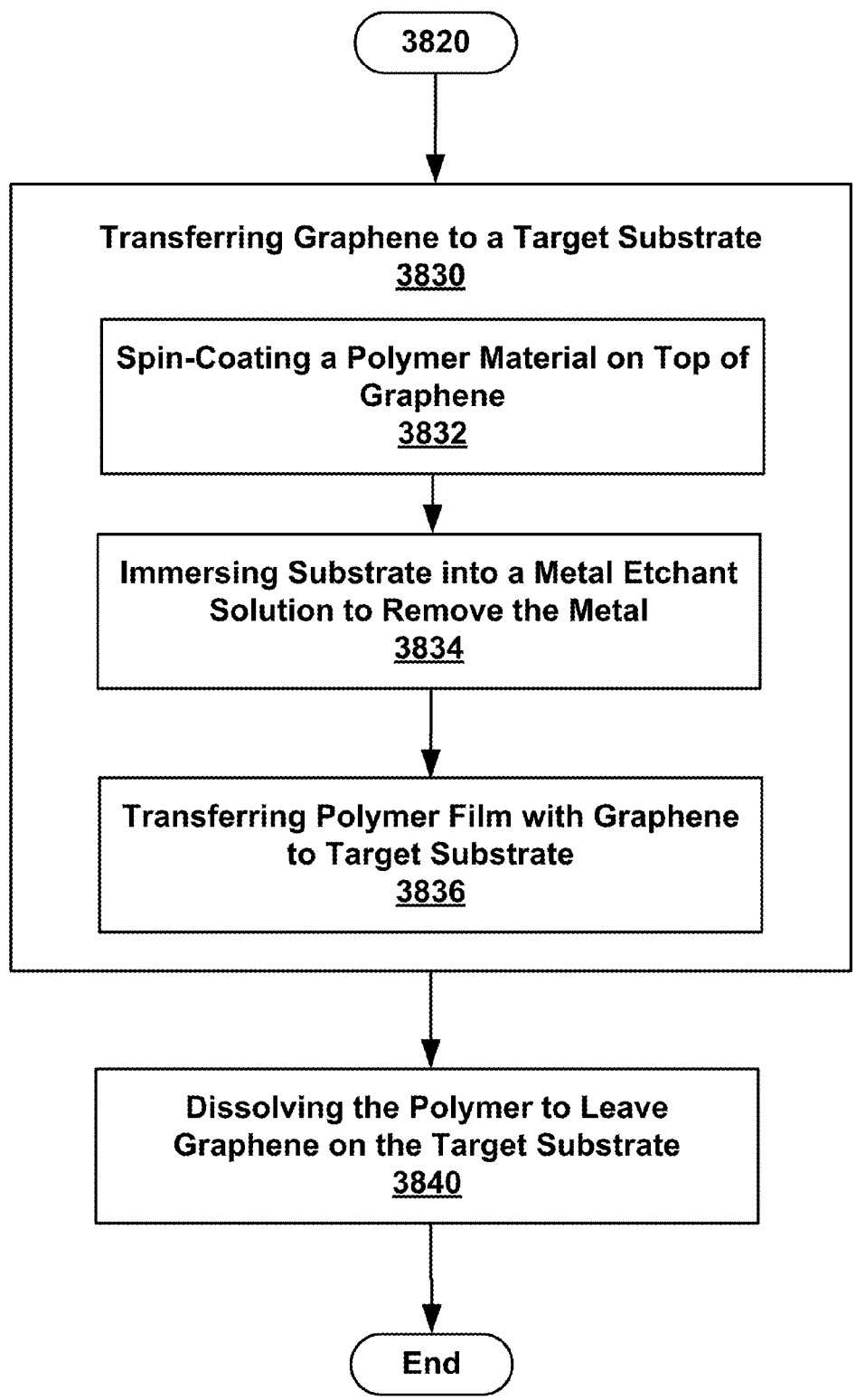
FIG. 40 is a process flow diagram showing a process for transferring synthesized graphene to a target substrate.

FIG. 40 is a process flow diagram showing a process for transferring synthesized graphene to a target substrate. The one graphene layer a thin stack of graphene layers (e.g., 20 layers or less) deposited on the catalytic film can be transferred to a target substrate (3830). The number of graphene layers is minimized as described to avoid growth of multilayer graphene that resembled bulk graphite. Transferring can include depositing (e.g., spin-coating) a polymer material on top of the single graphene or a thin stack of graphene layers deposited on the catalytic film (3832). Transferring can include immersing the substrate into an etchant solution to remove the metal (3834) and render a free-standing polymer film with the single graphene or a thin stack of graphene layers adhered to the polymer film. The polymer film can be transferred to the target substrate (3836). The polymer film can be removed (e.g., dissolved) to leave the single graphene layer or a thin stack of graphene layers on the target surface (3840). The polymer material can include poly (methyl methacrylate) (PMMA).

Figure 41:
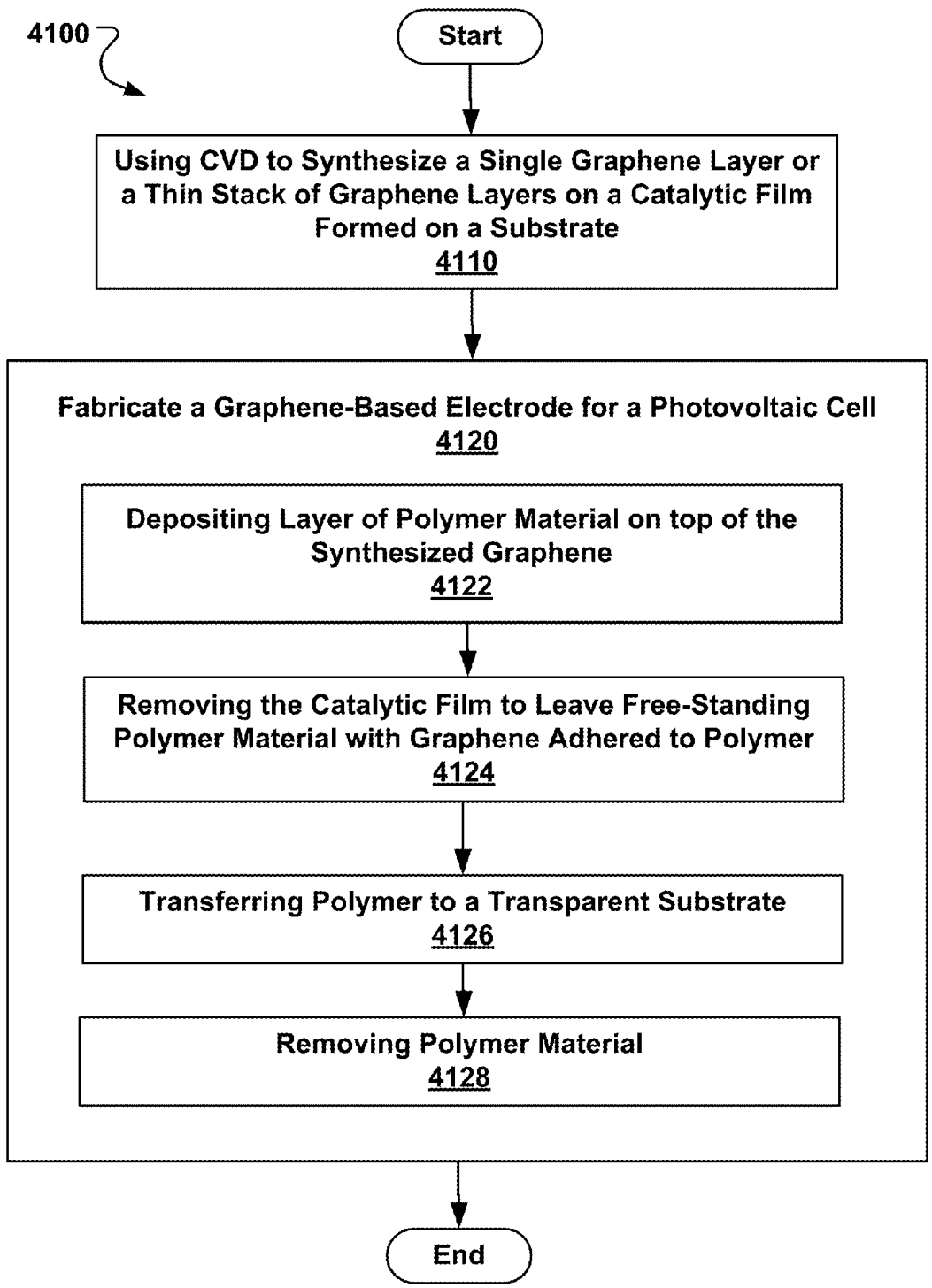
FIG. 41 is a process flow diagram describing a process for fabricating an electrode for a photovoltaic cell.

FIG. 41 is a process flow diagram describing a process (4100) for fabricating an electrode for a photovoltaic cell. The process (4100) can include using chemical vapor deposition to synthesize the single graphene or a thin stack of graphene layers on a catalytic film formed a substrate (4110). A graphene-based electrode is fabricated for a photovoltaic cell (4120). Fabricating the graphene-based electrode can include depositing a layer of polymer material on top of the synthesized the single graphene or a thin stack of graphene layers (4122). The catalytic film can be removed using an etchant solution to leave a free-standing polymer material with the synthesized graphene adhered to the free-standing polymer material (4124). The free-standing polymer material with synthesized graphene is transferred to the transparent substrate using direct graphene contact (4126). The polymer material can be removed to render the single graphene or a thin stack of graphene layers on the transparent substrate (4128). The polymer material can include poly (methyl methacrylate) (PMMA). The transparent substrate can include glass or polyethylene terephthalate (PET).

Synthesis of Single- and Few-Layer Graphene on Copper Surface

Graphene can be synthesized on Copper surface by chemical vapor deposition using hydrocarbons and derivatives as feed gas. Hydrocarbons can include molecules as methane, ethylene, acetylene, propane, butane, etc., and derivatives can include alcohols (methanol, ethanol, isopropanol, butanol, etc.), acetones, aldehydes, etc. Copper films can be formed by deposition of Copper on rigid or flexible substrates using vacuum deposition (thermal evaporation, e-beam evaporation, and sputtering) or electrochemical deposition. Specifically we can deposit copper films onto silicon wafers or silicon wafers coated with silicon oxide, and then carry out chemical vapor deposition to obtain single or a few layers of graphene with copper as the catalyst. We can then etch away the underlying copper films, and let graphene get deposited onto the substrate. Alternatively, after the graphene growth on copper film, we can coat the sample with an adhesive film such as a polymer, etch away the underlying copper, press the released adhesive film with graphene against a target substrate, and then remove the adhesive film, which would leave graphene transferred to the target substrate. The transferred graphene can then be used for various electronic, chemical sensing, and biosensing applications.

Synthesis of Single- and Few-Layer Graphene on Single Crystal Metal Surface: Ni (111)

Single- and Few-Layer graphene can be synthesized on single crystal metal surfaces. For example, chemical vapor deposition of graphene on the surface of Ni (111) can be a scalable method to produce large-area, continuous, single- and bi-layer graphene on Ni (111) substrate. The lattice matching between Ni (111) and graphene appears to help the formation of graphene on top of the Ni (111) surface. Also the surface of single crystal metal can yield more uniform graphene and with lower number of layers than polycrystalline metal. The scanning electron microscopy (SEM) and atomic force microscopy (AFM) images show that the graphene grown on Ni (111) is smoother than the one grown on polycrystalline nickel. The side-by-side Raman spectra clearly tell that the Ni (111) favors the growth of single- and bi-layer graphene much more than the polycrystalline nickel. Both the Raman spectroscopy and the optical image reveal that the region of single- and bi-layer graphene can be up to 70% over the entire substrate and the domain size of single grains can reach to tens to hundreds of μm². The as-grown graphene can be transferred to other substrates for device fabrication or further applications.

In implementations, Ni (111) instead of polycrystalline Ni film can be used as substrate for the synthesis of graphene, which highly increase the yield of single- or bi-layer graphene up to 70% over the entire substrate. Transfer of the as-grown graphene is applicable, which enables the further study of electrical properties and various applications of graphene.

Figure 42:
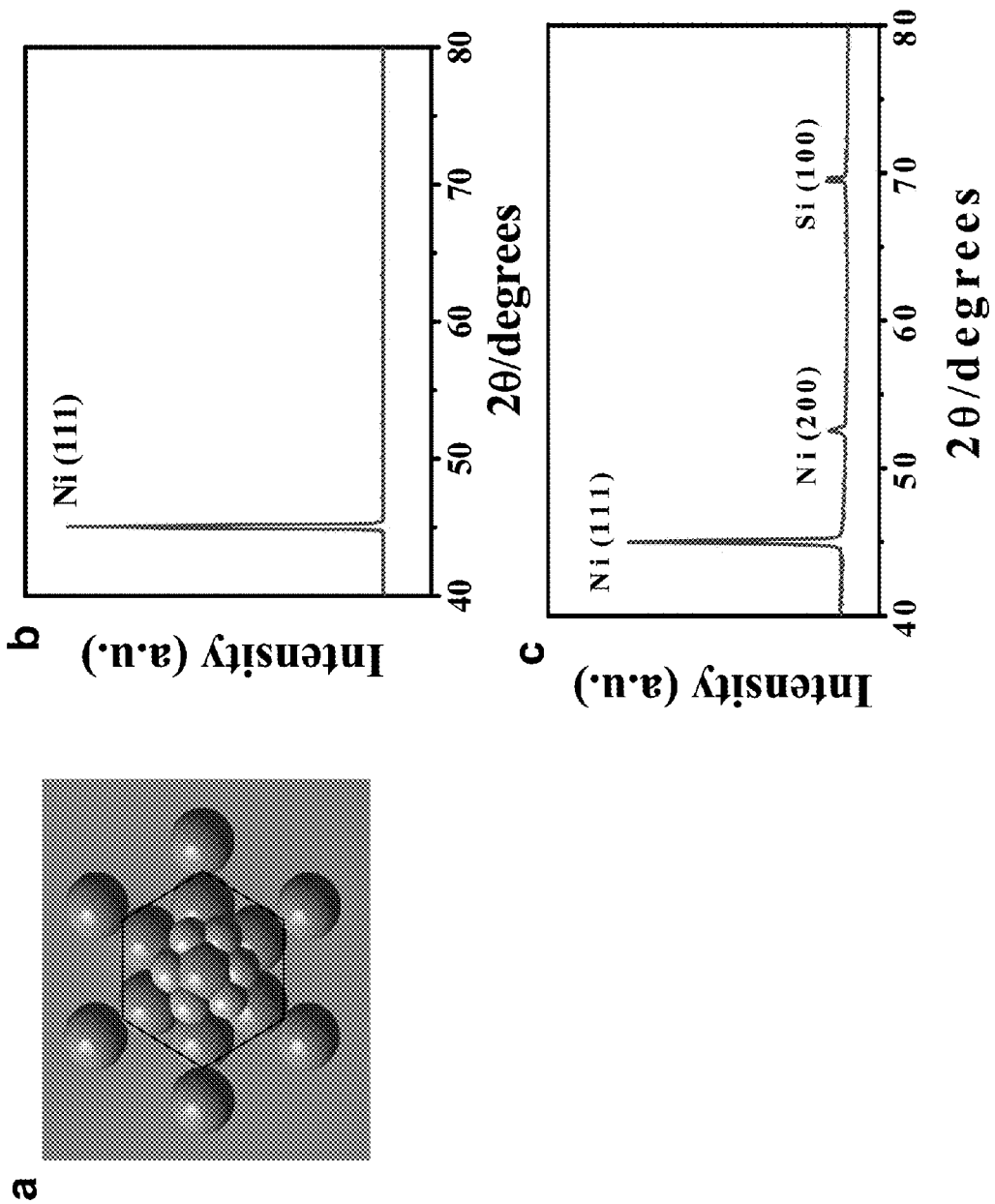
Figure 43:
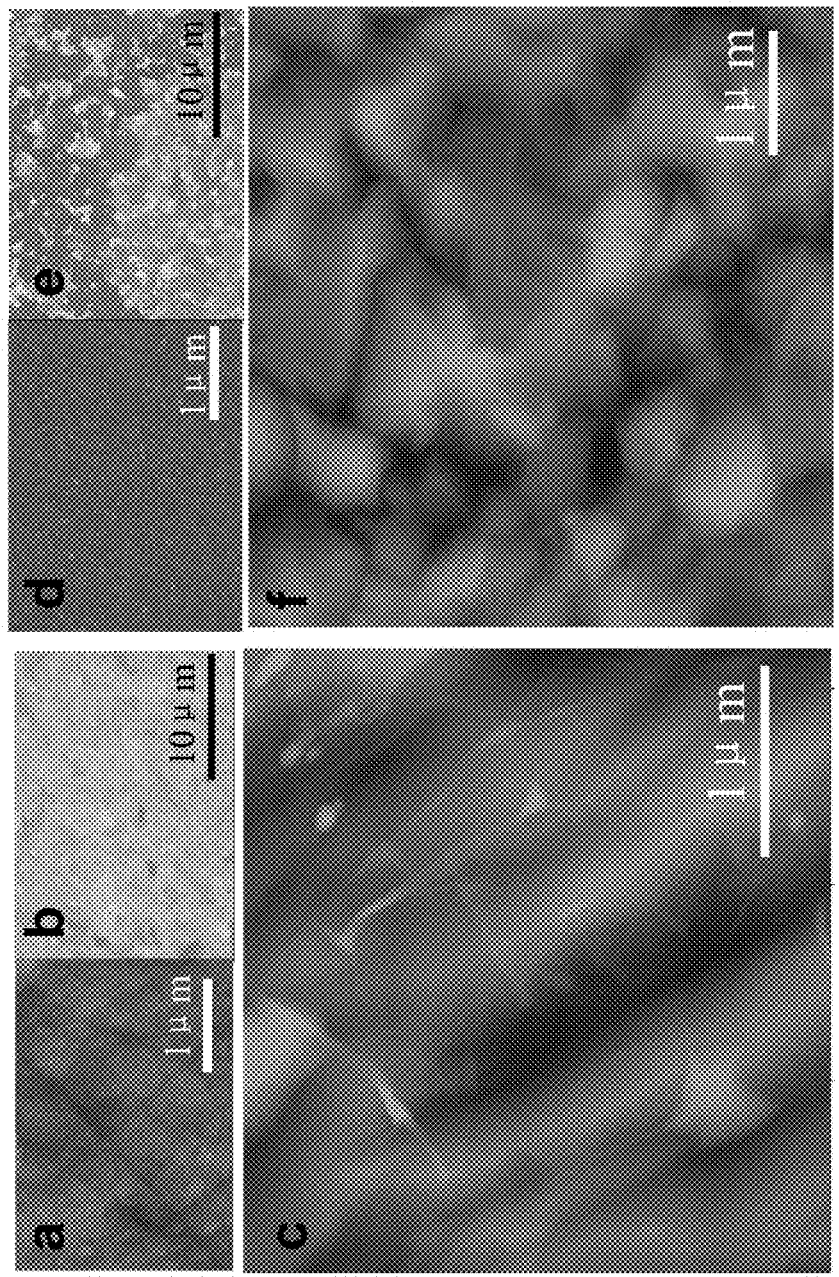

The preparation of single- or multiple-layer graphene on Ni has been widely reported. Ni is known as a good substrate for graphene synthesis due to the excellent geometrical fit of the ordered graphene/graphite honey combs to the crystalline metal surface[16]. The best-fit crystalline Ni to ordered graphene carbon is Ni (111) which has a FCC structure that makes the (111) surface hexagonal. The lattice constant of Ni (111) is 2.49 Å which almost perfectly matches the lattice constant of bulk graphite which is 2.46 Å. Studies of graphene on Ni (111) surface have been done by many researchers and several possible structures of graphene on Ni (111) have been reported. Here we give a possible model as shown on FIG. 42a, which is known as hcp-fcc structure and is a stable structure. In addition, a bridge structure for the graphene/Ni (111) system can also be energetically stable.

According to the temperature-dependent solubility of interstitial carbon in transition metals, we assume that the carbon atoms will be absorbed into the Ni bulk under high temperature. While the temperature decreased, a significant amount of carbon will be driven to the surface of Ni (111) to form the graphene. Previous work shows that the formation of Ni (111) after the annealing of polycrystalline Ni film enables the formation of single- or few-layer graphene.

The X-ray diffraction (XRD) spectra were taken on Ni (111) and polycrystalline Ni substrates respectively. 300 nm elemental Ni was deposited on Si/SiO₂ wafer by e-beam evaporation. The substrate was then loaded into a CVD chamber and heated to 900° C. under 600 sccm $H_2$ flow rate for 15 min. XRD spectrum was taken after the thermal annealing. We can see from FIG. 42b that there are both Ni (111) and Ni (200) formed during the annealing process. However, the thermal annealing process cannot help to form the entire surface as well-ordered Ni (111) lattice structure, but only small grains of Ni (111), which hampers the formation of continuous, single- or bi-layer graphene over entire substrate. Ni (111) substrate, however, gives a pure Ni (111) lattice structure which has a single peak from XRD spectrum as shown on FIG. 42c, as well a much higher intensity of Ni (111) peak than the one from annealed polycrystalline Ni.

The CVD process was carried on both Ni (111) substrate and the polycrystalline Ni substrate. 600 sccm $H_2$ was introduced to the furnace for 20 min during the temperature increasing from room temperature to 900° C. Then 100 sccm $CH_4$ was flown into the furnace for 10 min. The furnace was cooled down to room temperature after the CVD growth process with a rate of ~18° C./min.

Figure 44:
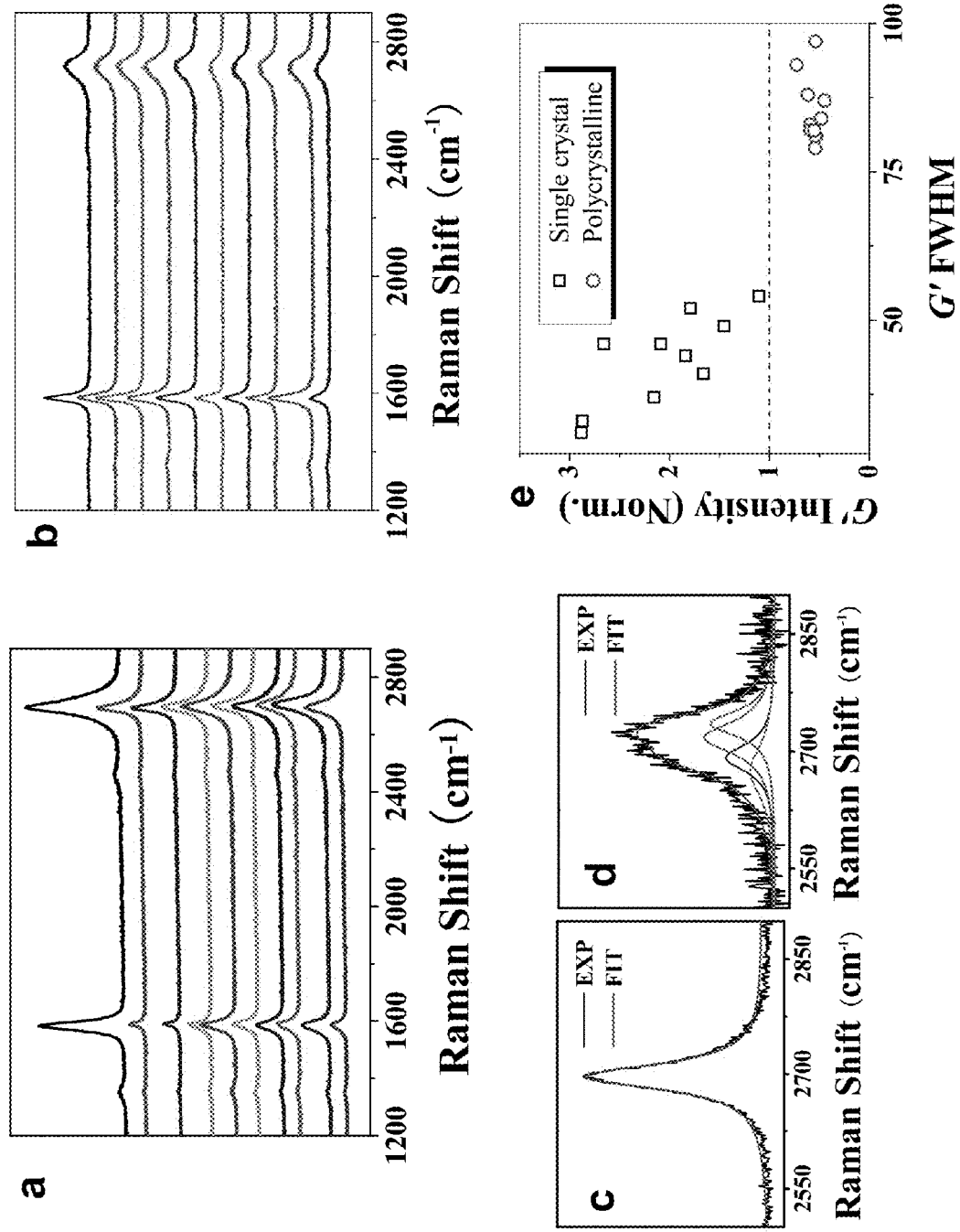

Referring to images in FIGS. 43a-43e, AFM images before growth show that the surface of Ni (111) substrate is smooth but with some mechanical scratches. The polycrystalline Ni substrate is also smooth but with some small particles. The SEM images after graphene deposition suggest that the surface of Ni (111) is much smoother than the polycrystalline Ni surface. Also, judging from the AFM images after graphene deposition, the domain size on the polycrystalline Ni substrate are around 1-2 micron, which are very small. On the contrary, the domain size of Ni (111) is much larger than polycrystalline Ni. The formation of graphene layers on Ni surface was confirmed by micro-Raman analysis after the CVD process and the quality and number of layers of graphene were also derived from Raman spectra. Raman spectra were collected over the entire substrate of Ni (111) and polycrystalline Ni, respectively. Ten typical Raman spectra from graphene on Ni (111) are showed in FIG. 44a, which have G band 2700 cm⁻¹ and G' brand is ~1590 cm⁻¹. The G' band can be fitted to a single Lorentzian, which always has a linewidth of 25-55 cm⁻¹. As for the graphene on polycrystalline Ni, the stack of Raman spectra showed on FIG. 44b, which has similar frequency of G and G' band, however, which is different is that the G' band cannot be fitted to a single Lorentzian but can always be fitted to four Lorentzians. Therefore, we can tell from the typical Raman spectra that Ni (111) always give a growth of single- or bi-layer graphene[23] but polycrystalline Ni, on the contrary, always have more than two layer but less than ten layer graphene according to the Raman spectra. The full width at half-maximum (FWHM) is another finger print in Raman spectroscopy to identify the number of graphene layers. For all the ten spectra we collected from Ni (111) (FIG. 44b), the FWHM lies in the range 25-55 cm⁻¹, while the FWHM is larger than 80 cm⁻¹ from the polycrystalline Ni. We can clearly tell a broadening of G' band from graphene grown on the polycrystalline Ni due to the interlayer coupling, which indicates that the layer of graphene grown on the polycrystalline Ni is more than two.

Figure 45:
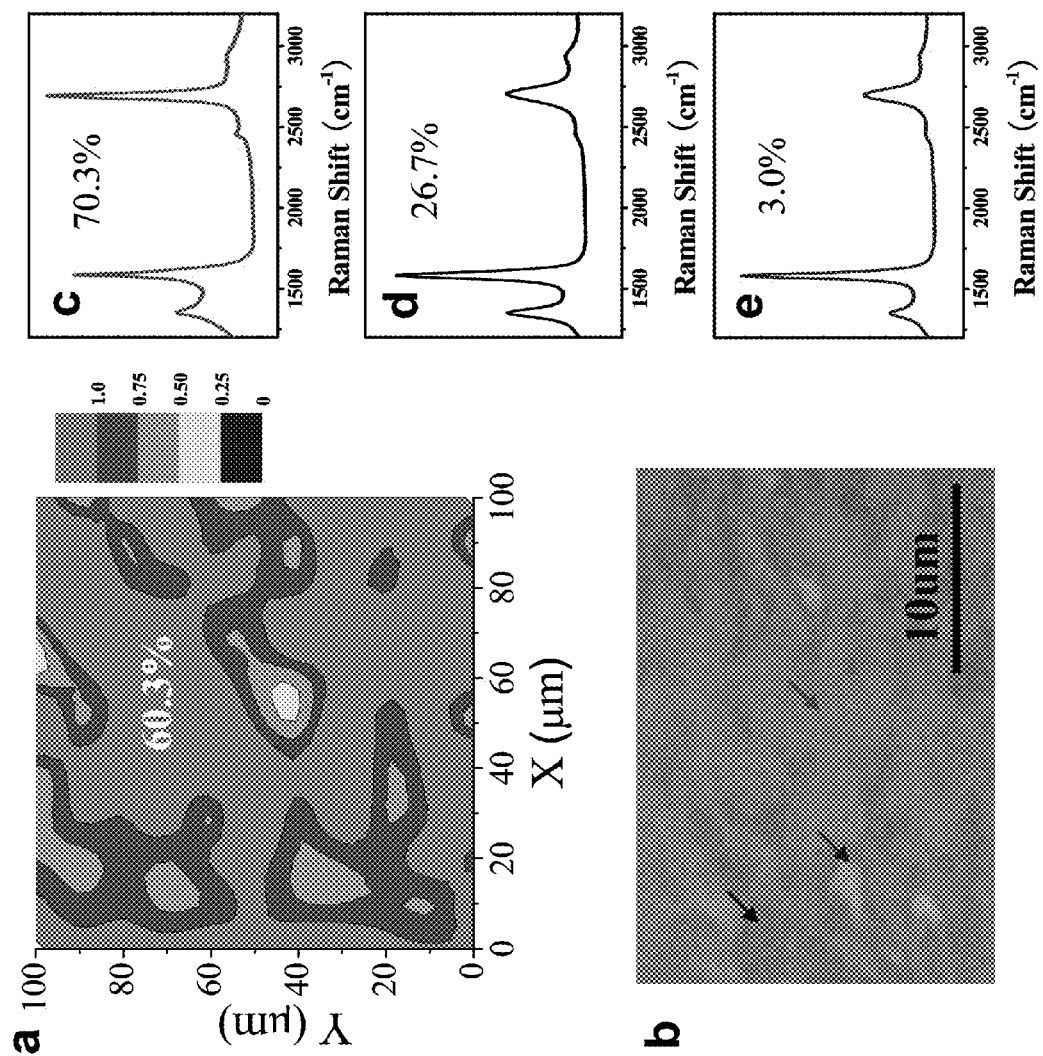

The G'-to-G intensity ratios were also collected over 100 μm² region. 100 Raman signals were collected with a space of 10 μm. FIG. 45a shows the map of the intensity ratios, from which we can see that 60.3% of the 100 μm² has a G'-to-G intensity ratio larger than one, which is another finger print of single- or bi-layer graphene. Optical image was taken to confirm the layers of graphene. Graphene was transferred to 300 nm SiO₂/Si substrate using PMMA transfer method[14]. FIG. 45b is a typical optical image for graphene grown on Ni (111) after transferring on 300 nm SiO₂/Si substrate. Most of the area has a light grey color as pointed by a red arrow, which has a corresponding Raman spectra shown on FIG. 45c, suggesting that the number of layers of graphene in this region is one or two. More than ten Raman spectra were taken at different locations which share the same light grey color and they all turn out to be the same as FIG. 45c in terms of G' to G ratio and FWHM. Therefore, we can claim that we have approximately up to 70.3% single- or bi-layer graphene. The dark grey region pointed by a black arrow which represents the multiple-layer graphene takes approximately 26.7% of the entire area while the white region pointed by a blue arrow which represents graphite only takes about 3.0%. FIGS. 45d and 45e are corresponding Raman spectra of dark grey region and white region, respectively, which indicate that they are multi-layer graphene.

Hence, the above provides a method to synthesize graphene on Ni (111) surface, which gives up to 70% single- or bi-layer graphene.

Only a few example implementations are described for a simple, scalable and effective method to synthesize monolayer and few-layer graphene films by using methane-based CVD on nickel films, transfer of the synthesized films to different target substrates and their evaluation as transparent conducting films. Graphene produced over Si/SiO₂ wafers can be very useful for device fabrication, and the described approach may serve as the foundation for the growth of single-domain graphene over macro-scale areas such as complete wafers. The described techniques can be used to develop various graphene-related electronic devices.

Also, only a few example implementations are described for a feasible, scalable and effective method to employ CVD-G as highly transparent, continuous and flexible electrodes for OPVs. This approach constitutes a significant advance towards the production of transparent conductive electrodes in solar cells. CVD graphene meets the most important criteria of abundance, low cost, conductivity, stability, electrode/organic film compatibility and flexibility that are necessary to replace ITO in organic photovoltaics, which will have important implications for future organic optoelectronic devices.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the embodiments described above should not be understood as requiring such separation in all embodiments.

Only a few implementations and examples are described and other implementations, enhancements and variations can be made based on what is described and illustrated in this application.

What is claimed is:

1. A method for synthesizing graphene, the method comprising:
   providing a substrate having a catalytic surface; and
   flowing a dilute carbon feedstock over the catalytic surface of the substrate at a pressure equal to atmospheric pressure or lower to deposit a single planar layer of graphene or a thin stack of planar graphene layers on the catalytic surface of the substrate, the planar layer of graphene or the thin stack of planar graphene layers being parallel to the catalytic surface of the substrate, wherein the dilute carbon feedstock has more than 2% and less than 15% by volume carbon feedstock and comprises at least one of hydrogen, helium, and argon, the thin stack of planar graphene layers comprises five or fewer layers of graphene, wherein the single planar layer of graphene or the thin stack of planar graphene layers, when disposed on a polyethylene terephthalate (PET) substrate, has a conductance that is unperturbed after complete bending cycles, wherein the graphene is synthesized without the use of any plasma discharge.

2. The method of claim 1, further comprising depositing a film comprising a catalytic material on the substrate to form the catalytic surface.

3. The method of claim 1, wherein the substrate comprises a silicon wafer or a silicon wafer having a layer of silicon oxide thereon.

4. The method of claim 1, wherein the substrate and the catalytic surface are formed of the same material.

5. The method of claim 4, wherein the substrate is in the form of a foil or a plate.

6. The method of claim 4, wherein the substrate and the catalytic surface are single crystalline nickel (111).

7. The method of claim 4, wherein the substrate is sapphire.

8. The method of claim 4, wherein the substrate is quartz.

9. The method of claim 1, wherein the carbon feedstock comprises at least one of methane, ethylene, acetylene, propane, butane, ethanol, methanol, isopropanol, butanol, acetone, and aldehydes.

10. The method of claim 1, wherein the catalytic surface comprises a metal.

11. The method of claim 10, wherein the metal comprises at least one of nickel, iron, cobalt, manganese, molybdenum, iridium, gold, copper, silver, palladium, platinum, and lead.

12. The method of claim 10, wherein the metal is in the form of a film deposited on the substrate.

13. The method of claim 1, wherein the catalytic surface comprises a metal oxide.

14. The method of claim 13, wherein the metal oxide comprises aluminum oxide or silicon oxide.

15. The method of claim 1, further comprising:
    transferring the single layer of graphene or the thin stack of graphene layers from the substrate to a target substrate, wherein the thin stack of graphene layers includes up to twenty graphene layers.

16. The method of claim 15, wherein transferring the single layer of graphene or the thin stack graphene layers from the substrate to the target substrate comprises immersing the substrate into an etchant solution to remove the catalytic surface from the substrate, thereby yielding a free-standing catalytic film comprising the single layer of graphene or the thin stack of graphene layers.

17. The method of claim 16, wherein the etchant solution is a nickel etchant solution.

18. The method of claim 15, wherein transferring the single layer of graphene or the thin stack graphene layers from the substrate to the target substrate comprises:
    depositing a polymer material on the single graphene layer or the thin stack of graphene layers;
    immersing the substrate into an etchant solution to remove the polymer material from the substrate, thereby yielding a free-standing polymer film comprising the single graphene layer or the thin stack of graphene layers;
    transferring the polymer film to the target substrate; and
    dissolving the polymer film to leave the single graphene layer or the thin stack of graphene layers on the target surface.

19. The method of claim 18, wherein the polymer material comprises poly (methyl methacrylate) (PMMA).

* * * * *